(12) United States Patent
Ichikawa

(10) Patent No.: US 9,134,517 B2
(45) Date of Patent: Sep. 15, 2015

(54) ZOOM LENS AND IMAGE PICKUP APPARATUS USING THE SAME

(71) Applicant: OLYMPUS CORPORATION, Tokyo (JP)

(72) Inventor: Keisuke Ichikawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/478,891

(22) Filed: Sep. 5, 2014

(65) Prior Publication Data

US 2014/0376102 A1 Dec. 25, 2014

Related U.S. Application Data

(63) Continuation of application No. PCT/JP2013/070143, filed on Jul. 25, 2013.

(30) Foreign Application Priority Data

Jul. 25, 2012 (JP) .................................. 2012-164909
Jul. 25, 2012 (JP) .................................. 2012-164914

(51) Int. Cl.
*G02B 15/14* (2006.01)
*G02B 15/20* (2006.01)
*G02B 15/173* (2006.01)

(52) U.S. Cl.
CPC .............. *G02B 15/20* (2013.01); *G02B 15/173* (2013.01)

(58) Field of Classification Search
CPC ...... G02B 15/163; G02B 15/16; G02B 15/20; G02B 15/173
USPC .......................................... 359/676, 683–685
See application file for complete search history.

(56) References Cited

U.S. PATENT DOCUMENTS 4,749,265 A 6/1988 Hattori et al.
4,896,950 A 1/1990 Endo et al.
(Continued)

FOREIGN PATENT DOCUMENTS

JP Sho 60-021019 2/1985
JP Sho 63-266414 11/1988
(Continued)

OTHER PUBLICATIONS

International Search Report dated Nov. 5, 2013 for PCT/JP2013/070143.

(Continued)

*Primary Examiner* — Zachary Wilkes
(74) *Attorney, Agent, or Firm* — Kenyon & Kenyon LLP

(57) ABSTRACT

A zoom lens includes a first lens unit having a positive refractive power, a second lens unit having a negative refractive power, third lens unit having a positive refractive power, a fourth lens unit having a negative refractive power, a fifth lens unit having a positive refractive power, and an aperture stop disposed between the second lens unit and the third lens unit. At the time of zooming, the aperture stop moves and the fifth lens unit is fixed. At the time of zooming from a wide angle end to a telephoto end, a distance between the first lens unit and the second lens unit widens, a distance between the second lens unit and the third lens unit narrows, a distance between the third lens unit and the fourth lens unit fluctuates, and a distance between the fourth lens unit and the fifth lens unit fluctuates.

11 Claims, 30 Drawing Sheets

(56) References Cited

U.S. PATENT DOCUMENTS

| | | |
|---|---|---|
| 6,404,561 B1 | 6/2002 | Isono et al. |
| 6,449,433 B2 | 9/2002 | Hagimori et al. |
| 7,187,504 B2 | 3/2007 | Horiuchi |
| 7,593,165 B2 | 9/2009 | Souma |
| 7,679,837 B2 | 3/2010 | Souma |
| 7,864,442 B2 | 1/2011 | Yamashita |
| 8,203,799 B2 | 6/2012 | Mihara et al. |
| 2001/0046383 A1 | 11/2001 | Hagimori |
| 2006/0279850 A1 | 12/2006 | Horiuchi |
| 2008/0285150 A1 | 11/2008 | Souma |
| 2008/0304161 A1 | 12/2008 | Souma |
| 2009/0290228 A1 | 11/2009 | Yamashita |
| 2011/0102660 A1 | 5/2011 | Mihara et al. |
| 2012/0026600 A1 | 2/2012 | Matsumura |

FOREIGN PATENT DOCUMENTS

| | | |
|---|---|---|
| JP | 2001-194590 | 7/2001 |
| JP | 2001-350093 | 12/2001 |
| JP | 2006-337745 | 12/2006 |
| JP | 2007-047538 | 2/2007 |
| JP | 2008-281927 | 11/2008 |
| JP | 2008-304708 | 12/2008 |
| JP | 2009-282429 | 12/2009 |
| JP | 2011-095488 | 5/2011 |
| JP | 2012-048199 | 3/2012 |

OTHER PUBLICATIONS

International Preliminary Report on Patentability, dated Feb. 5, 2015, issued in corresponding International Application No. PCT/JP2013/070143.

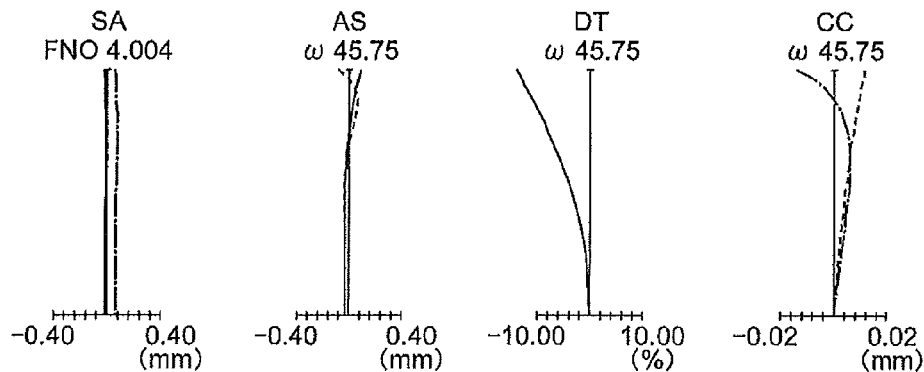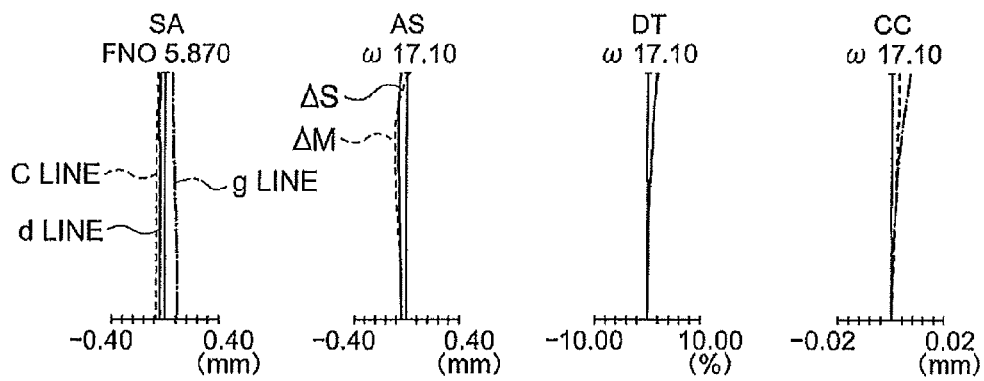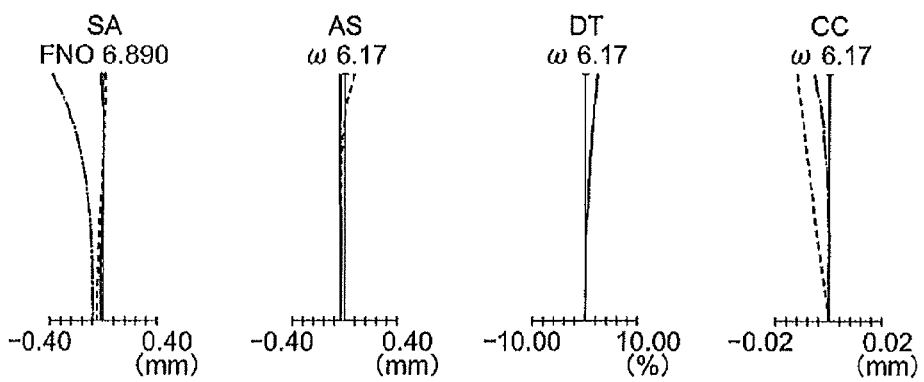

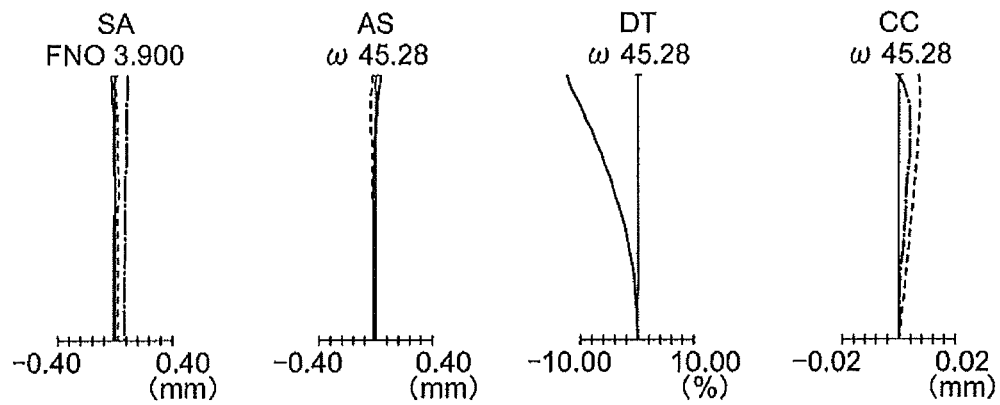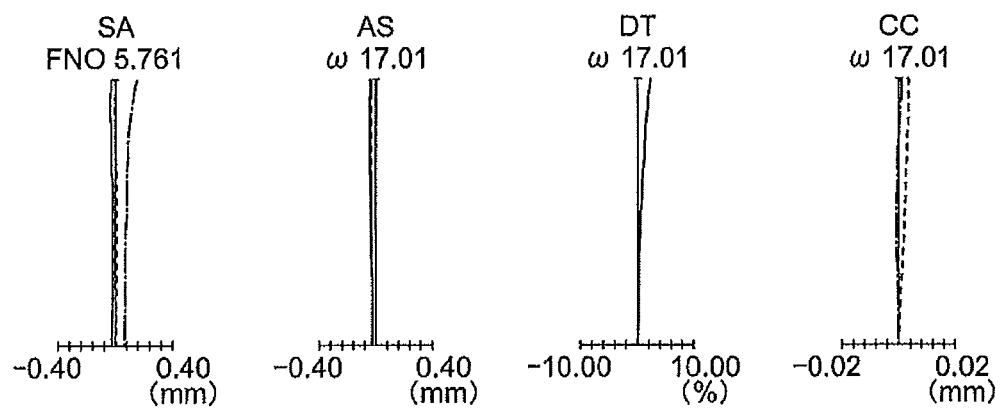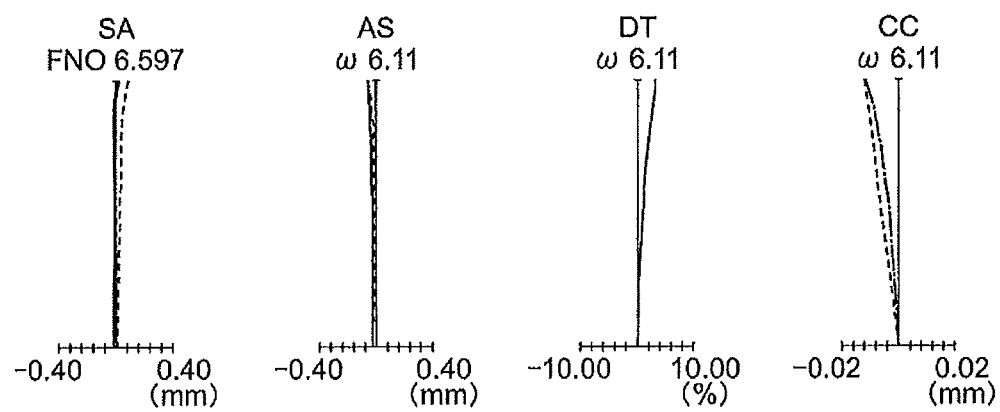

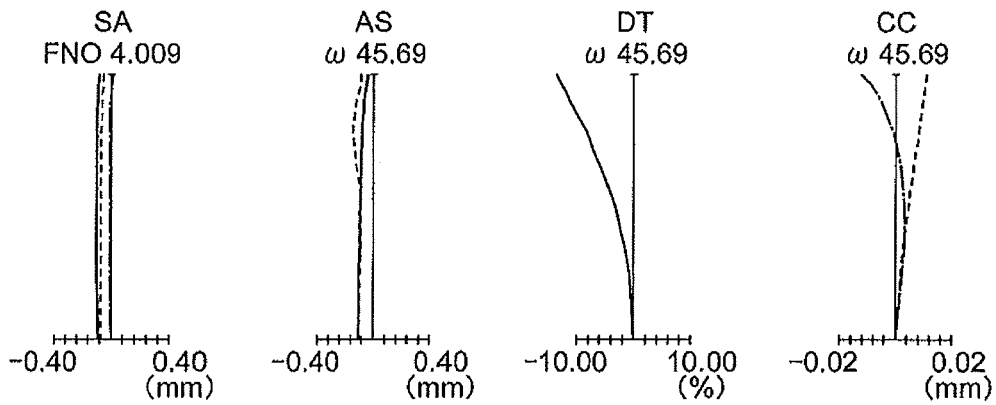
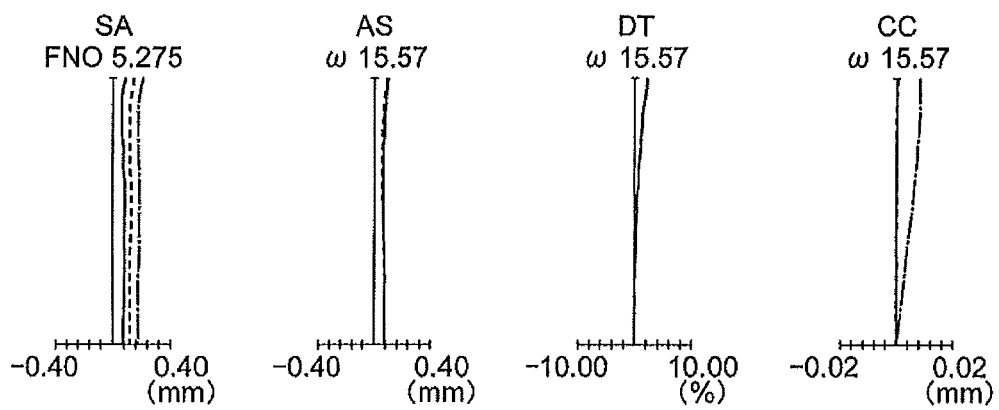
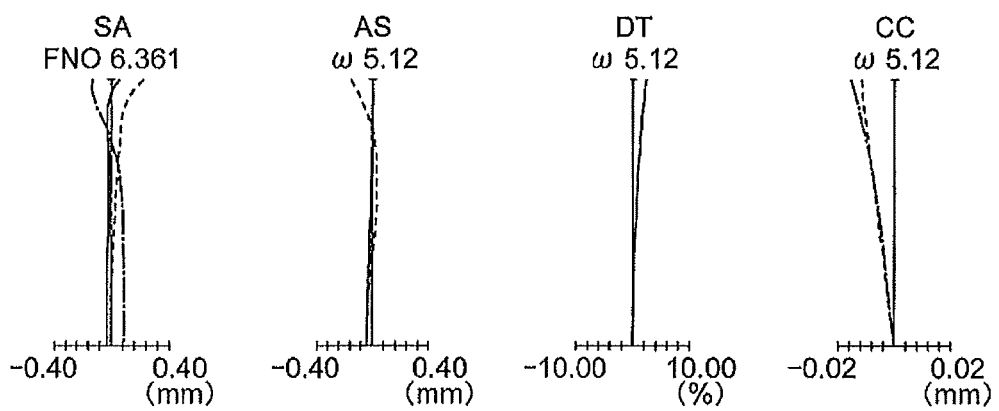

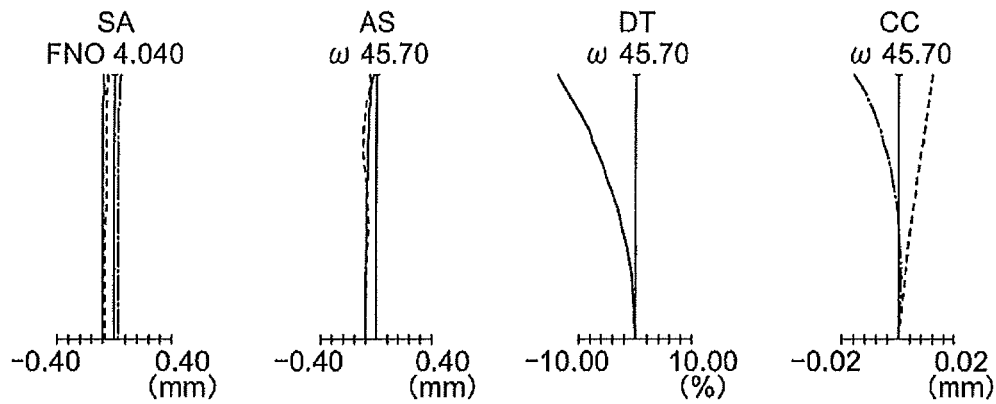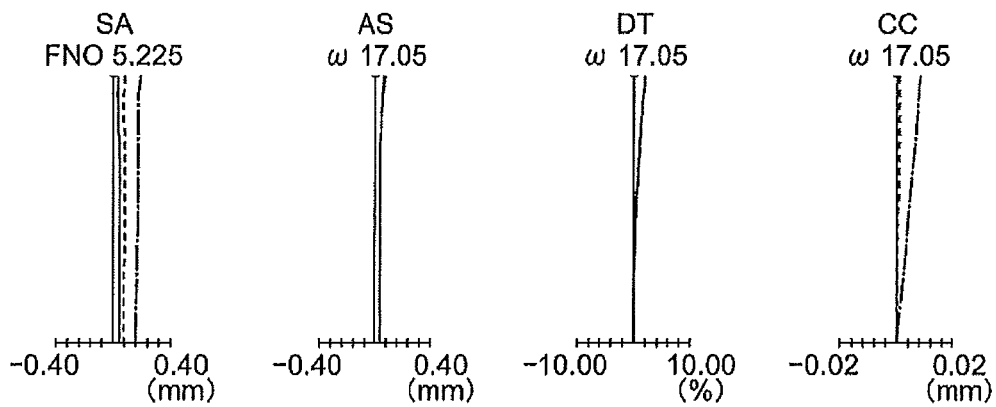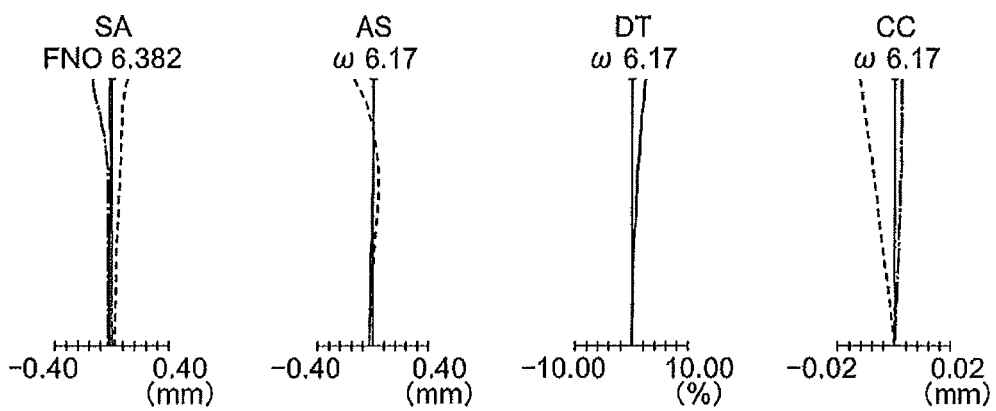

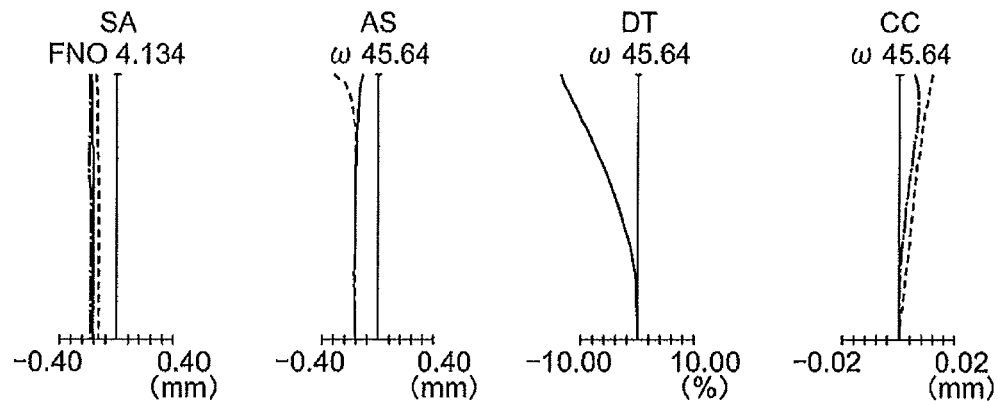
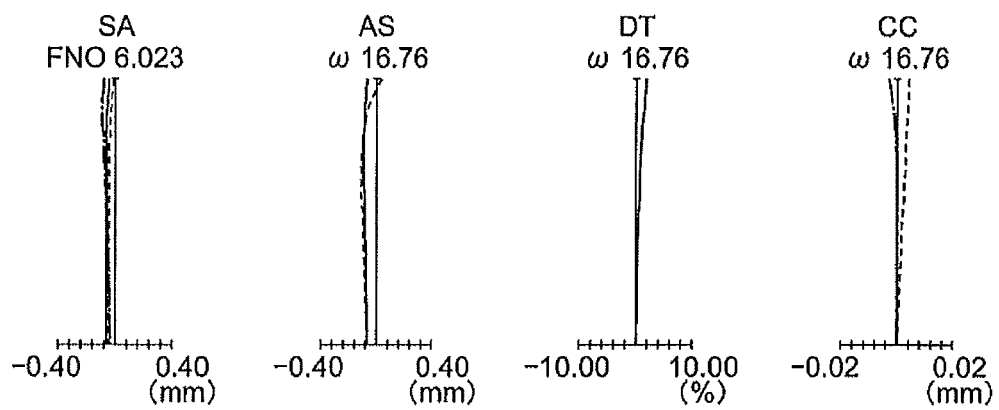
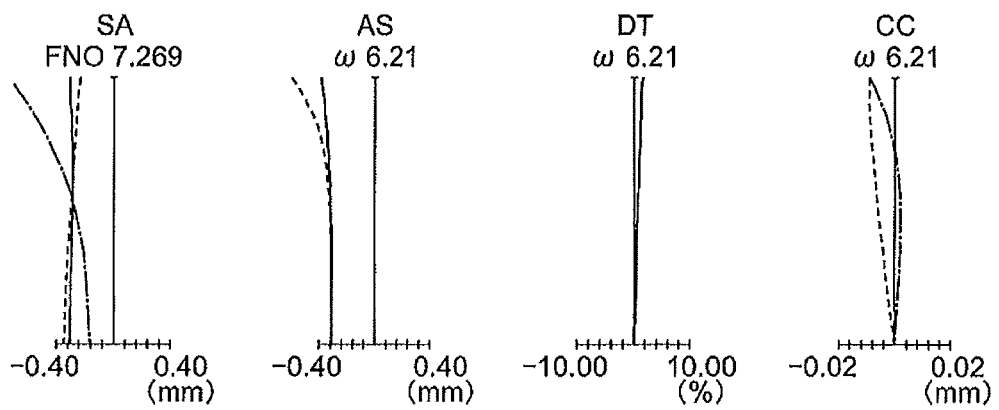

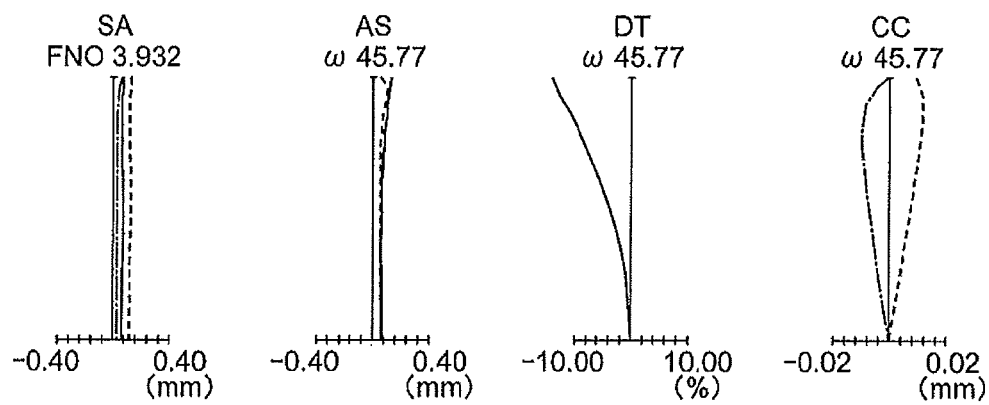
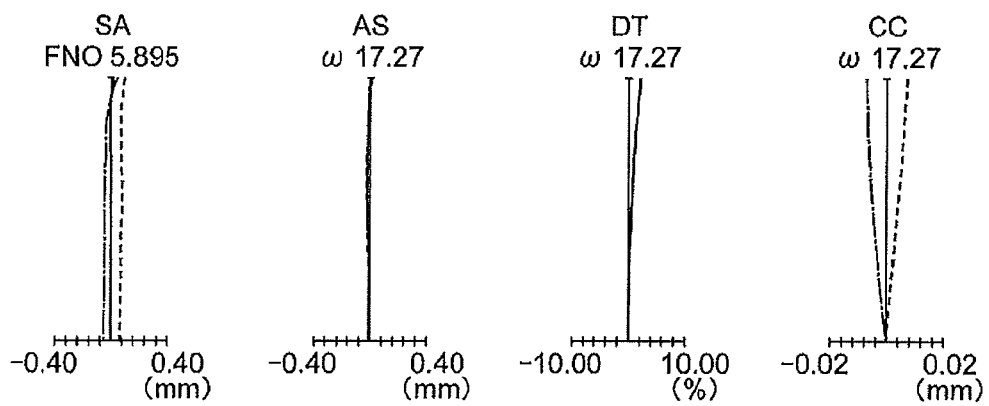
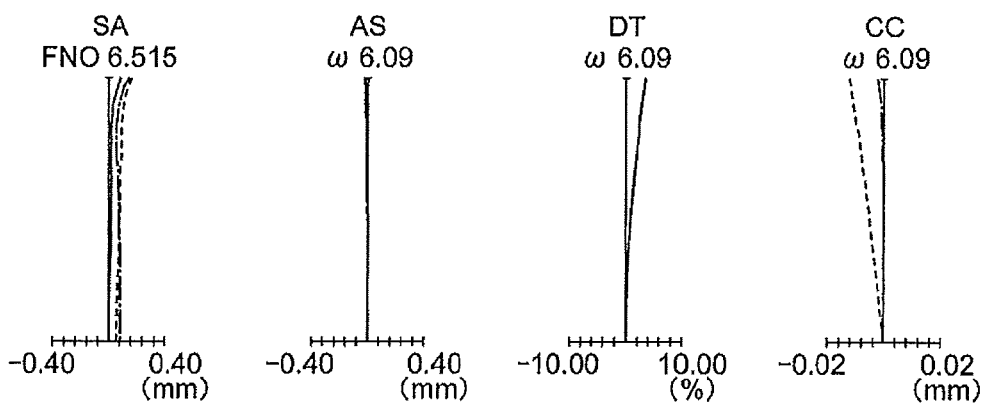

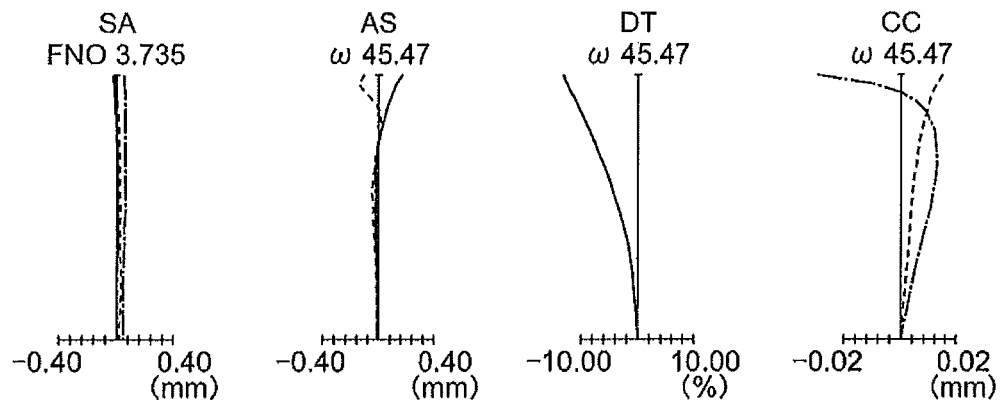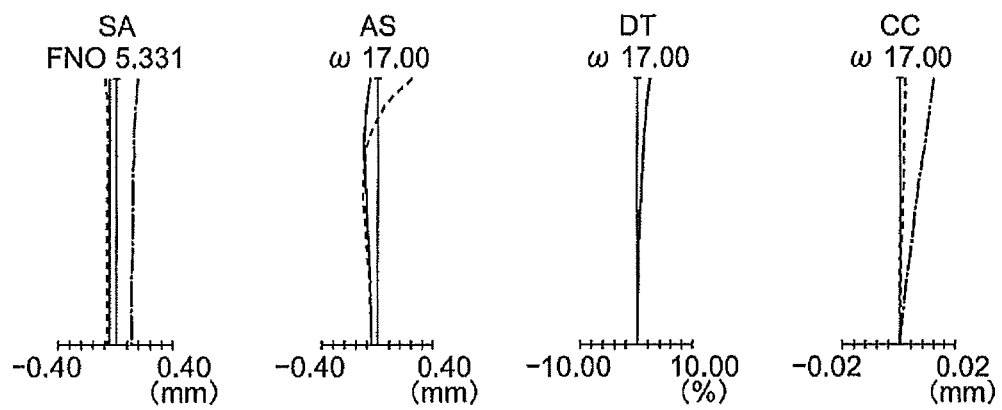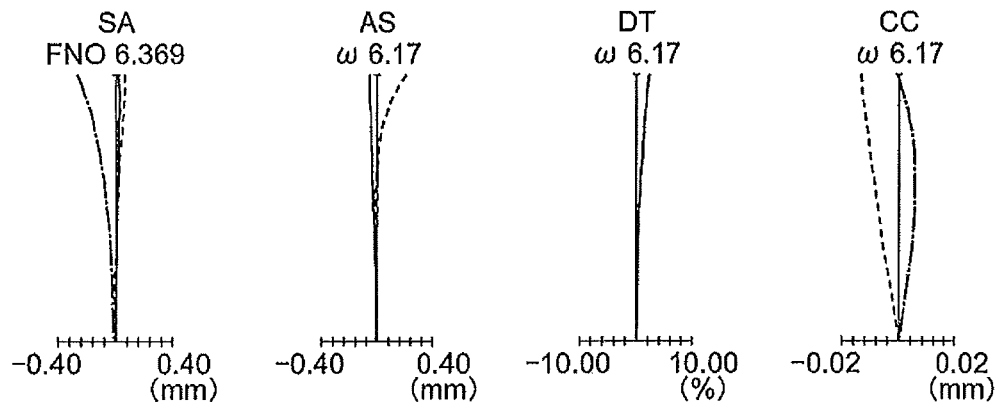

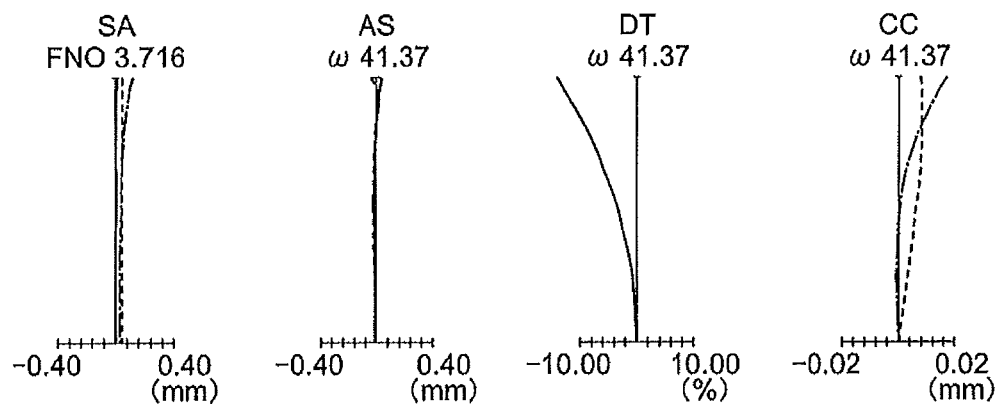
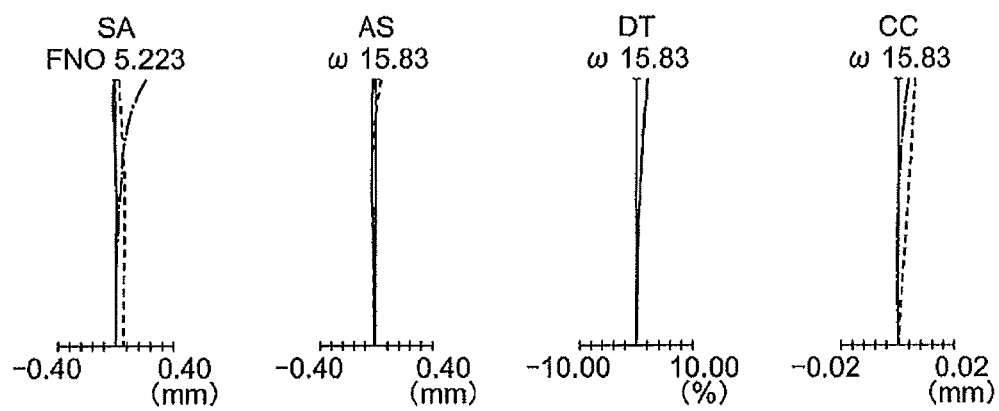
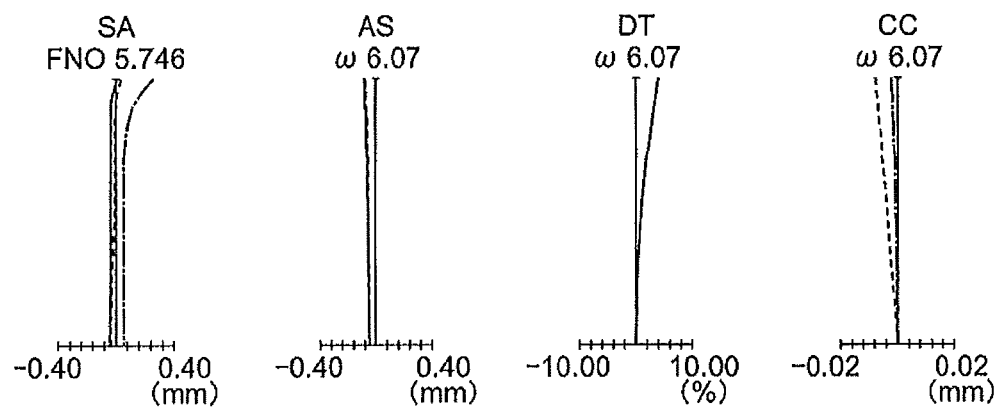

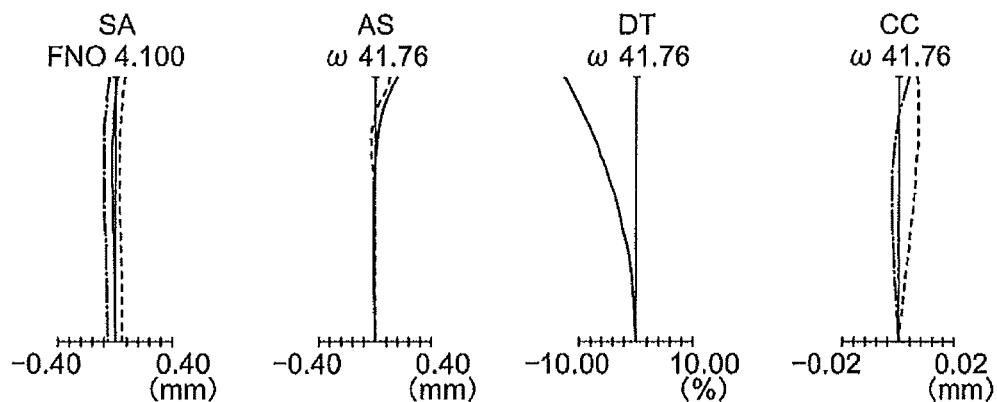
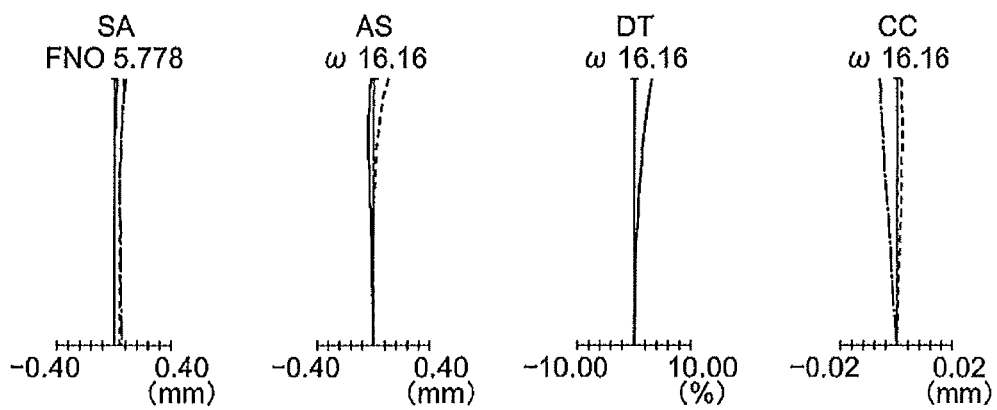
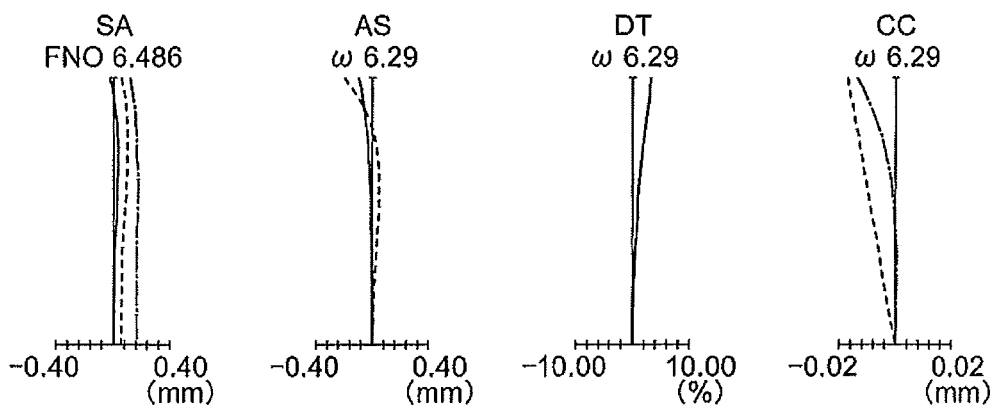

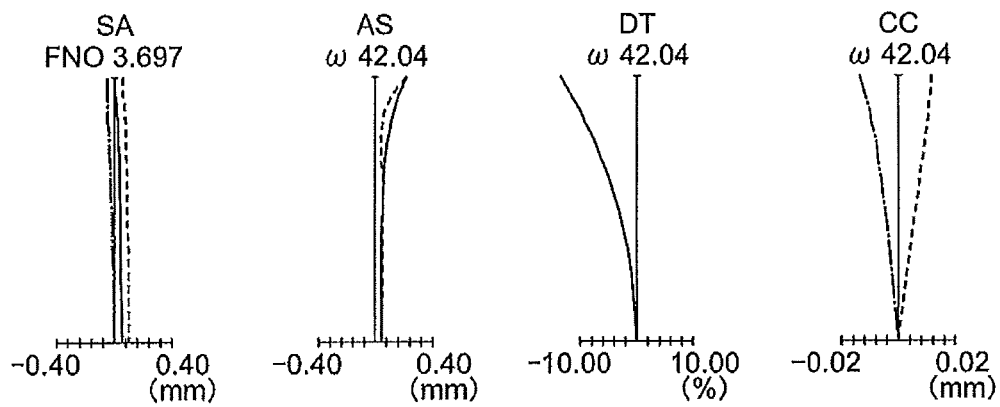
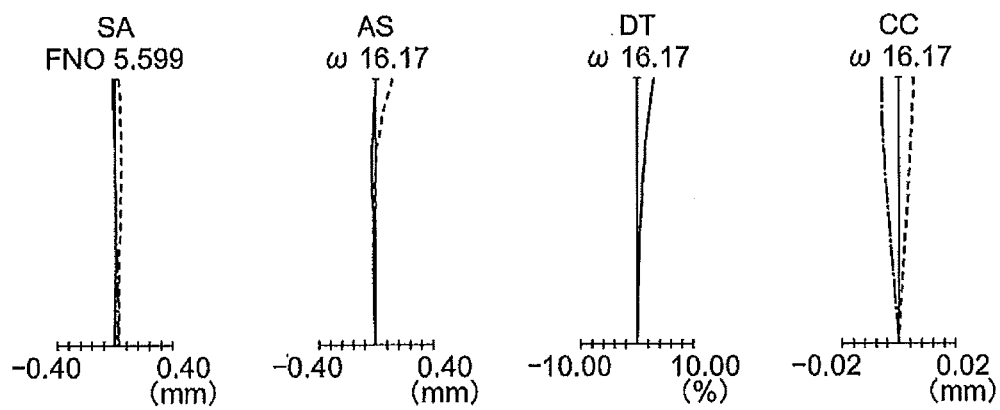
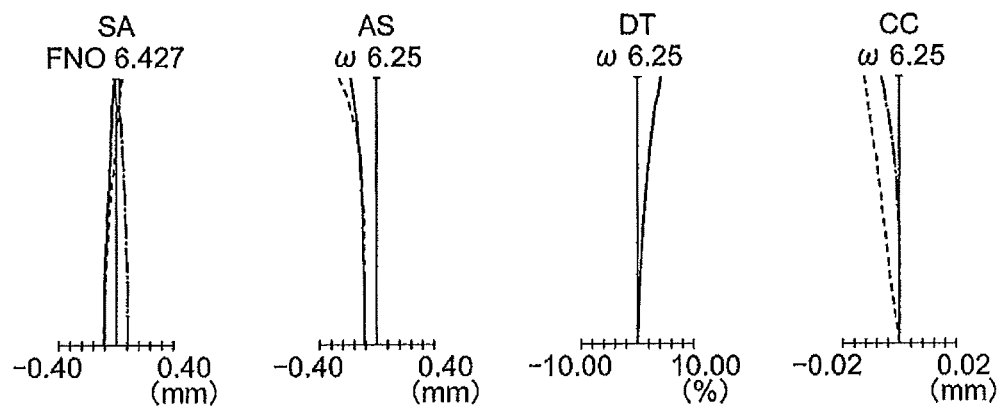

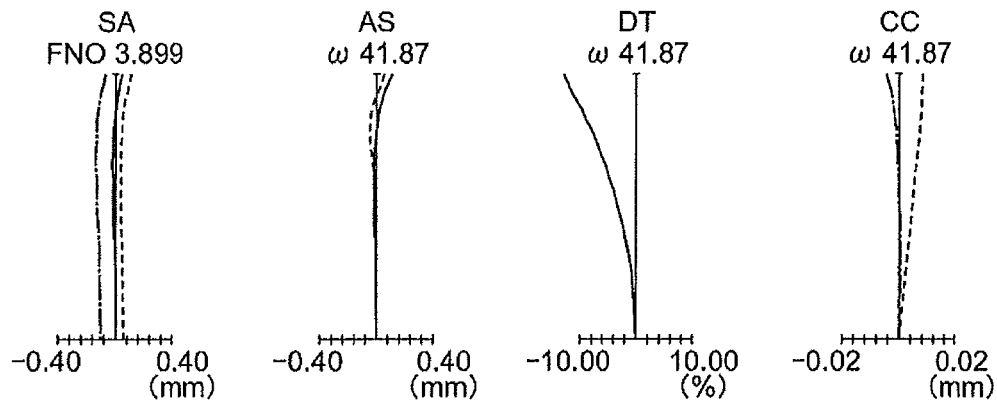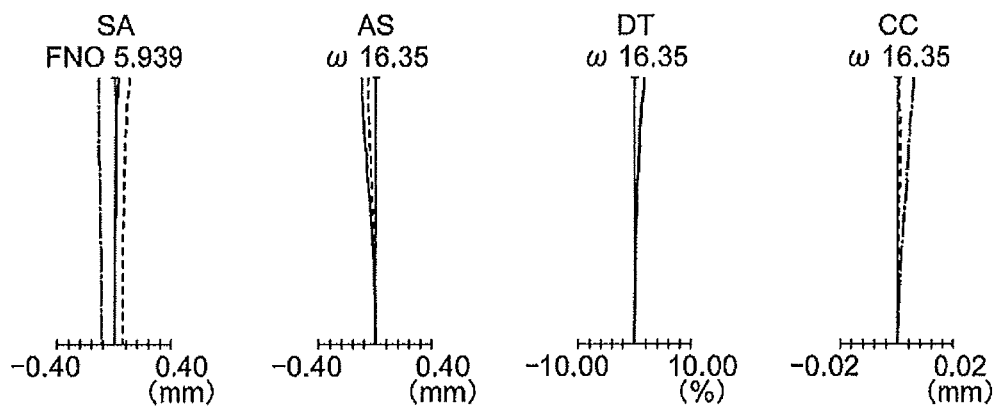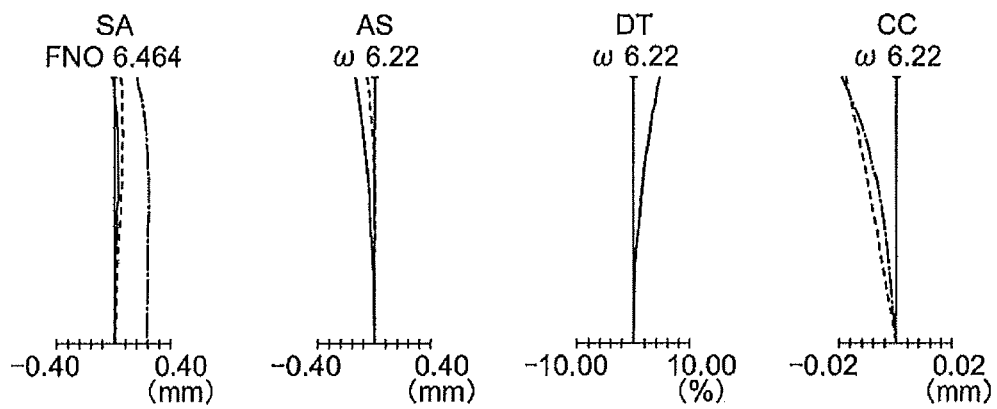

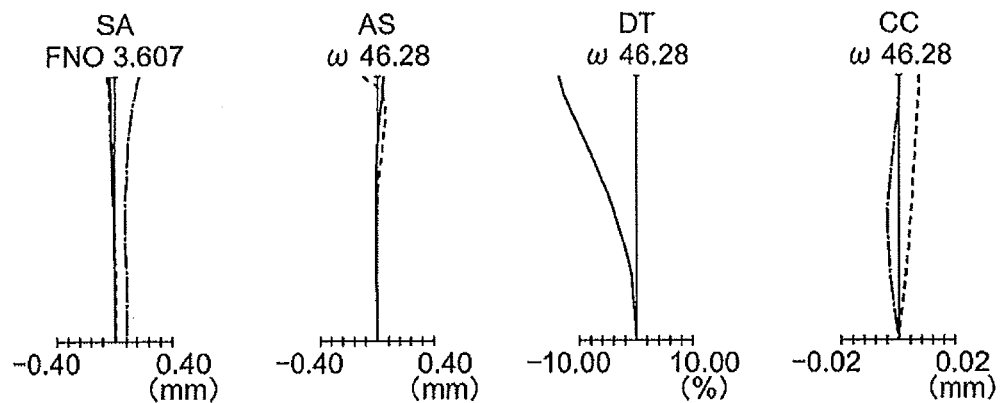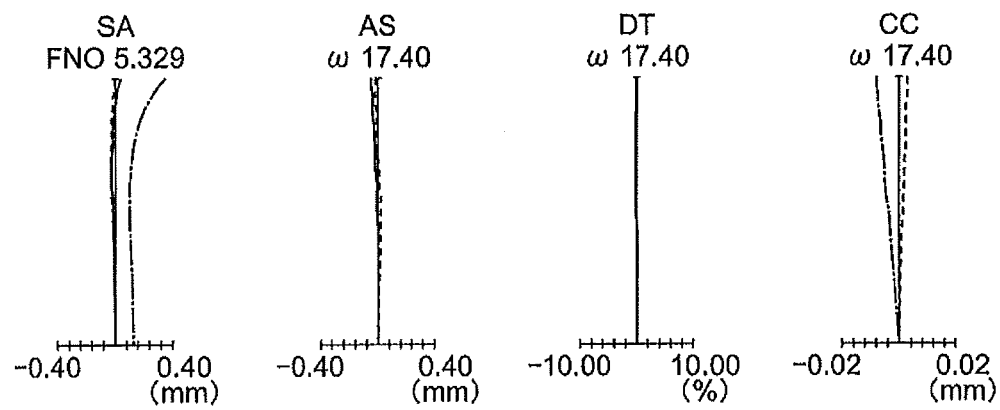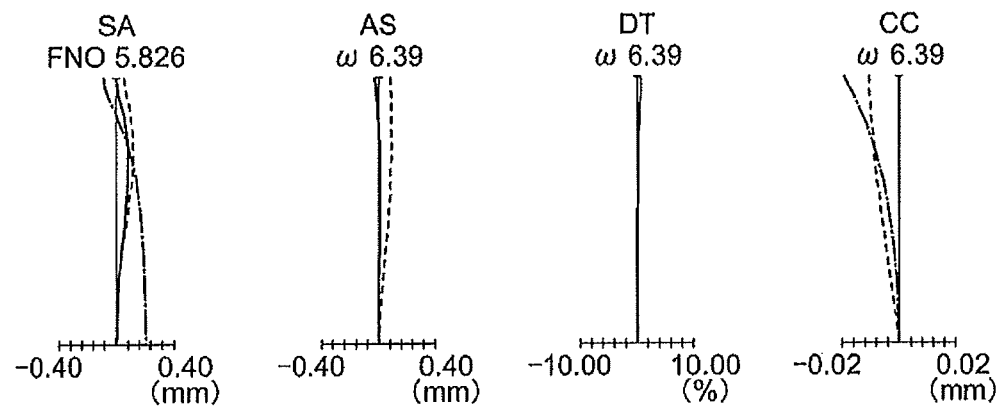

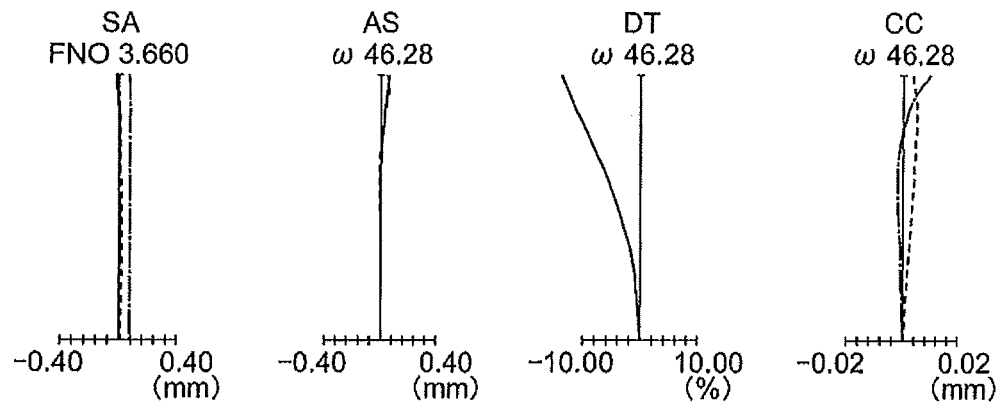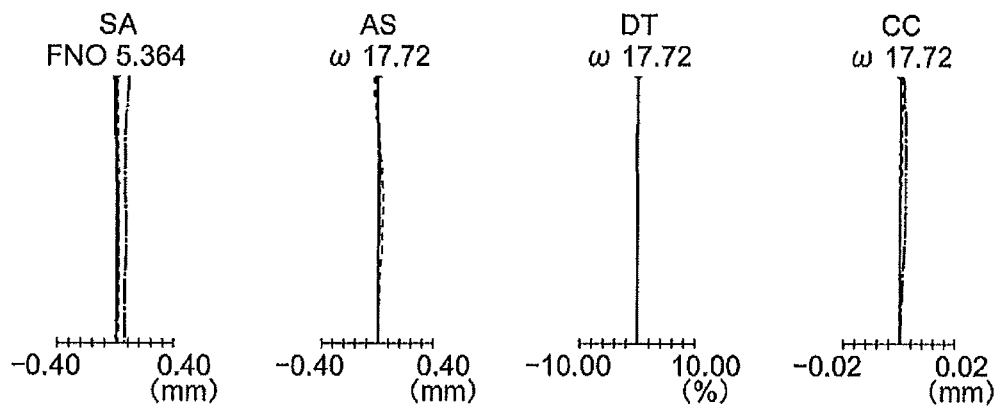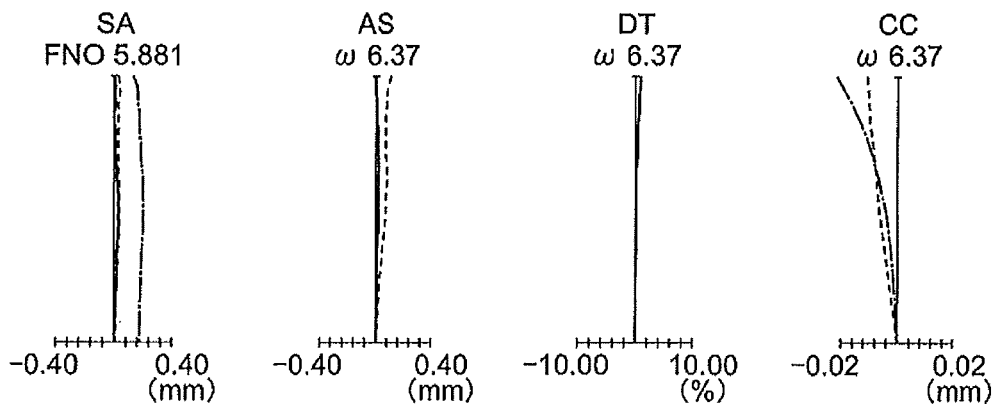

ZOOM LENS AND IMAGE PICKUP APPARATUS USING THE SAME

CROSS-REFERENCE TO RELATED APPLICATION

The present application is a continuation application of PCT/JP2013/070143, filed on Jul. 25, 2013 which is based upon and claims the benefit of priority from Japanese Patent Application Nos. 2012-164909 filed on Jul. 25, 2012 and 2012-164914 filed on Jul. 25, 2012; the entire contents of which are incorporated herein by reference.

BACKGROUND OF THE INVENTION

1. Field of the Invention

The present invention relates to a zoom lens and an image pickup apparatus using the same.

2. Description of the Related Art

In recent years, with a use of the large number of pixels in an image pickup element and a progress in a technology of digital image processing, a digital camera has substituted a silver salt 35 mm film camera. Moreover, since the number of pixels of a small-size liquid-crystal panel has also increased, it has been made possible to use the small-size liquid-crystal panel as a finder. Therefore, there has been a shift in an interchangeable lens camera from a so-called single lens reflex type to a camera with a new concept in which, a quick-return mirror is eliminated.

In the camera with a new concept, there is no quick-return mirror. Therefore, regarding an image pickup optical system to be used in such camera, designing of the optical system in which, a back focus is short to some extent, and which has a high imaging performance, has become possible.

In the single lens reflect type, a size of a finder image achieved by the image pickup optical system has been dependent on an imaging size (image-circle diameter) of the image pickup optical system. Whereas, in the camera with a new concept, such constraint will cease to exist. Therefore, even if a format size of the image pickup element is small, a large finder image is achieved. Moreover, designing of an image pickup optical system with a small size and high performance has become possible.

On the other hand, as a camera in which, the back focus is short and the format size of the image pickup element is small, a small-size camera (commonly called as a compact camera) in which, the image pickup optical system is fixed to a camera main-body has been used widely. As a zoom lens appropriate for such small-size camera, zoom lenses disclosed in Japanese Patent Application Laid-open Publication Nos. 2007-47538 and 2008-304708 are available. Zoom lenses disclosed in Japanese Patent Application Laid-open Publication Nos. 2007-47538 and 2008-304708 include in order from an object side five lens units namely, a positive lens unit, a negative lens unit, a positive lens unit, a negative lens unit, and a positive lens unit.

In an arrangement in which, refractive power arrangement (arrangement of refractive power of lens units) is in order of a positive refractive power, a negative refractive power, a positive refractive power, a negative refractive power, and a positive refractive power, is a one of arrangements called as a positive-lead type. The most basic arrangement as a zoom lens of the positive-lead type is a four-unit zoom lens (zoom lens which includes four lens units in order of a positive lens unit, a negative lens unit, a positive lens unit, and a positive lens unit). The refractive power arrangement in order of a positive refractive power, a negative refractive power, a positive refractive power, a negative refractive power, and a positive refractive power is an arrangement in which, a lens unit having a negative refractive power is added to this four-unit zoom lens, between the third lens unit and the fourth lens unit. By doing so, a zooming ratio is made high at a telephoto end at which, an overall optical length of the zoom lens is prone to increase, while shortening the overall optical length of the zoom lens.

Incidentally, in a zoom lens of an interchangeable lens camera, it is important to achieve a balance of the overall optical length of the zoom lens and a sum total of thickness of lenses. Moreover, there is a restriction on an amount sticking out from a camera installation flange surface. Therefore, in the zoom lens of the replaceable lens camera, a length of some extent is necessary for the back focus. On the other hand, a level of image quality sought in the lens replaceable camera is higher than a level of image quality in a compact camera. Therefore, it is necessary to use an image pickup element having a format size of certain extent in the replaceable lens camera, upon securing even larger number of pixels (However, a pixel size of a fixed image pickup element of recent years being smaller than silver salt particles, even when the size is made smaller than a 135 format or an APS-C, a satisfactory image quality is achieved).

SUMMARY OF THE INVENTION

A zoom lens according to the present invention comprises in order from an object side to an image side,
a first lens unit having a positive refractive power,
a second lens unit having a negative refractive power,
a third lens unit having a positive refractive power,
a fourth lens unit having a negative refractive power, and
a fifth lens unit having a positive refractive power, wherein
the zoom lens has an aperture stop, which is disposed between a surface nearest to an image plane side of the second lens unit and a surface nearest to the image plane side of the third lens unit, and
the zoom lens has a negative lens, which is disposed nearest to the image plane side of the second lens unit, and
at the time of zooming,
the aperture stop moves together with the third lens unit and
the fifth lens unit is fixed, and
at the time of zooming from a wide angle end to a telephoto end,
a distance between the first lens unit and the second lens unit widens,
a distance between the second lens unit and the third lens unit narrows,
a distance between the third lens unit and the fourth lens unit fluctuates, and
a distance between the fourth lens unit and the fifth lens unit fluctuates.

Moreover, another zoom lens according to the present invention comprises in order from an object side to an image side,
a first lens unit having a positive refractive power,
a second lens unit having a negative refractive power,
a third lens unit having a positive refractive power,
a fourth lens unit having a negative refractive power, and
a fifth lens unit having a positive refractive power, wherein
the zoom lens has an aperture stop, which is disposed between a surface nearest to an image plane side of the second lens unit and a surface nearest to the image plane side of the third lens unit, and
at the time of zooming, the aperture stop moves together with the third lens unit, and the fifth lens unit is fixed, and at the time of zooming from a wide angle end to a telephoto end, a distance between the first lens unit and the second lens unit widens, a distance between the second lens unit and the third lens unit narrows, a distance between the third lens unit and the fourth lens unit fluctuates, and a distance between the fourth lens unit and the fifth lens unit fluctuates, and the following conditional expressions (1) and (2) are satisfied:

$$-1.3 < \beta_{2t} < -0.4 \qquad (1)$$

$$-1.6 < \beta_{3t} < -0.6 \qquad (2)$$

where, $\beta_{2t}$ denotes a magnification of the second lens unit at the telephoto end, and $\beta_{3t}$ denotes a magnification of the third lens unit at the telephoto end, and both $\beta_{2t}$ and $\beta_{3t}$ are magnification at the time of infinite object point focusing.

Furthermore, still another zoom lens according to the present invention comprises in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, wherein the zoom lens has an aperture stop, which is disposed between a surface nearest to an image plane side of the second lens unit and a surface nearest to the image plane side of the third lens unit, and at the time of zooming, the aperture stop moves together with the third lens unit, and the fifth lens unit is fixed, and at the time of zooming from a wide angle end to a telephoto end, a distance between the first lens unit and the second lens unit widens, a distance between the second lens unit and the third lens unit narrows, a distance between the third lens unit and the fourth lens unit fluctuates, and a distance between the fourth lens unit and the fifth lens unit fluctuates, and the following conditional expression (3) is satisfied:

$$0.35 < \beta_{2t}/\beta_{3t} < 1.05 \qquad (3)$$

where, $\beta_{2t}$ denotes a magnification of the second lens unit at the telephoto end, and $\beta_{3t}$ denotes a magnification of the third lens unit at the telephoto end, and both $\beta_{2t}$ and $\beta_{3t}$ are magnification at the time of infinite object point focusing.

Still another zoom lens according to the present invention comprises in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, wherein at the time of zooming from a wide angle end to a telephoto end, a distance between the first lens unit and the second lens unit widens, a distance between the second lens unit and the third lens unit narrows, a distance between the third lens unit and the fourth lens unit fluctuates, and a distance between the fourth lens unit and the fifth lens unit fluctuates, and the fifth lens unit is fixed with respect to zooming from the wide angle end to the telephoto end, and the zoom lens has an aperture stop, which is disposed between a surface nearest to an image plane side of the second lens unit and a surface nearest to the image plane side of the third lens unit, and the aperture stop fluctuates together with the third lens unit, and the zoom lens has at least a negative lens and a positive lens in the second lens unit, and the zoom lens has at least one aspheric surface in the second lens unit, and in a rectangular coordinate system in which, a horizontal axis is let to be Nd and a vertical axis is let to be vd, when a straight line expressed by $Nd_p = \alpha \times vd_p + \beta$ (where, $\alpha = -0.017$) is set, a lens in the second lens unit is included in both of an area determined by a straight line, when it is a lower limit value of a range of the following conditional expression (10) and a straight line, when it is an upper limit value of a range of the following conditional expression (10), and an area determined by the following conditional expressions (11) and (12):

$$1.45 < \beta < 2.15 \qquad (10)$$

$$1.50 < Nd_p < 1.70 \qquad (11)$$

$$5 < vd_p < 40 \qquad (12)$$

$$1.4 < Nd_n < 1.65 \qquad (13)$$

$$45 < vd_n < 95 \qquad (14)$$

where, $Nd_p$ denotes an average of refractive indices of positive lenses in the second lens unit, $vd_p$ denotes an average of Abbe numbers for positive lenses in the second lens unit, $Nd_n$ denotes an average of refractive indices of the negative lenses other than the negative lens nearest to the object side in the second lens unit, and $vd_n$ denotes an average of Abbe numbers for the negative lenses other than the negative lens nearest to the object side in the second lens unit.

Moreover, an image pickup apparatus according to the present invention comprises the abovementioned zoom lens, and an image pickup element which has an image pickup surface.

BRIEF DESCRIPTION OF THE DRAWINGS

FIG. 1A is a cross-sectional view at a wide angle end, FIG. 1B is a cross-sectional view in an intermediate focal length state, and FIG. 1C is a cross-sectional view at a telephoto end;

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are diagrams showing a spherical aberration (SA), an astigmatism (AS), a distortion (DT), and a chromatic aberration of magnification (CC) at the time of infinite object point focusing of the zoom lens according to the example 1, where, FIG. 2A, FIG. 2B, FIG. 2C, and FIG. 2D show a state at the wide angle end, FIG. 2E, FIG. 2F, FIG. 2G, and FIG. 2H show an intermediate focal length state, and FIG. 2I, FIG. 2J, FIG. 2K, and FIG. 2L show a state at the telephoto end;

FIG. 3A is a cross-sectional view at a wide angle end, FIG. 3B is a cross-sectional view in an intermediate focal length state, and FIG. 3C is a cross-sectional view at a telephoto end;

FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are diagrams showing a spherical aberration (SA), an astigmatism (AS), a distortion (DT), and a chromatic aberration of magnification (CC) at the time of infinite object point focusing of the zoom lens according to the example 2, where, FIG. 4A, FIG. 4B, FIG. 4C, and FIG. 4D show a state at the wide angle end, FIG. 4E, FIG. 4F, FIG. 4G, and FIG. 4H show an intermediate focal length state, and FIG. 4I, FIG. 4J, FIG. 4K, and FIG. 4L show a state at the telephoto end;

FIG. 5A is a cross-sectional view at a wide angle end, FIG. 5B is a cross-sectional view in an intermediate focal length state, and FIG. 5C is a cross-sectional view at a telephoto end;

FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are diagrams showing a spherical aberration (SA), an astigmatism (AS), a distortion (DT), and a chromatic aberration of magnification (CC) at the time of infinite object point focusing of the zoom lens according to the example 3, where, FIG. 6A, FIG. 6B, FIG. 6C, and FIG. 6D show a state at the wide angle end, FIG. 6E, FIG. 6F, FIG. 6G, and FIG. 6H show an intermediate focal length state, and FIG. 6I, FIG. 6J, FIG. 6K, and FIG. 6L show a state at the telephoto end;

FIG. 7A is a cross-sectional view at a wide angle end, FIG. 7B is a cross-sectional view in an intermediate focal length state, and FIG. 7C is a cross-sectional view at a telephoto end;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are diagrams showing a spherical aberration (SA), an astigmatism (AS), a distortion (DT), and a chromatic aberration of magnification (CC) at the time of infinite object point focusing of the zoom lens according to the example 4, where, FIG. 8A, FIG. 8B, FIG. 8C, and FIG. 8D show a state at the wide angle end, FIG. 8E, FIG. 8F, FIG. 8G, and FIG. 8H show an intermediate focal length state, and FIG. 8I, FIG. 8J, FIG. 8K, and FIG. 8L show a state at the telephoto end;

FIG. 9A is a cross-sectional view at a wide angle end, FIG. 9B is a cross-sectional view in an intermediate focal length state, and FIG. 9C is a cross-sectional view at a telephoto end;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are diagrams showing a spherical aberration (SA), an astigmatism (AS), a distortion (DT), and a chromatic aberration of magnification (CC) at the time of infinite object point focusing of the zoom lens according to the example 5, where, FIG. 10A, FIG. 10B, FIG. 10C, and FIG. 10D show a state at the wide angle end, FIG. 10E, FIG. 10F, FIG. 10G, and FIG. 10H show an intermediate focal length state, and FIG. 10I, FIG. 10J, FIG. 10K, and FIG. 10L show a state at the telephoto end;

FIG. 11A is a cross-sectional view at a wide angle end, FIG. 11B is a cross-sectional view in an intermediate focal length state, and FIG. 11C is a cross-sectional view at a telephoto end;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are diagrams showing a spherical aberration (SA), an astigmatism (AS), a distortion (DT), and a chromatic aberration of magnification (CC) at the time of infinite object point focusing of the zoom lens according to the example 6, where, FIG. 12A, FIG. 12B, FIG. 12C, and FIG. 12D show a state at the wide angle end, FIG. 12E, FIG. 12F, FIG. 12G, and FIG. 12H show an intermediate focal length state, and FIG. 12I, FIG. 12J, FIG. 12K, and FIG. 12L show a state at the telephoto end;

FIG. 13A is a cross-sectional view at a wide angle end, FIG. 13B is a cross-sectional view in an intermediate focal length state, and FIG. 13C is a cross-sectional view at a telephoto end;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are diagrams showing a spherical aberration (SA), an astigmatism (AS), a distortion (DT), and a chromatic aberration of magnification (CC) at the time of infinite object point focusing of the zoom lens according to the example 7, where, FIG. 14A, FIG. 14B, FIG. 14C, and FIG. 14D show a state at the wide angle end, FIG. 14E, FIG. 14F, FIG. 14G, and FIG. 14H show an intermediate focal length state, and FIG. 14I, FIG. 14J, FIG. 14K, and FIG. 14L show a state at the telephoto end;

FIG. 15A is a cross-sectional view at a wide angle end, FIG. 15B is a cross-sectional view in an intermediate focal length state, and FIG. 15C is a cross-sectional view at a telephoto end;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are diagrams showing a spherical aberration (SA), an astigmatism (AS), a distortion (DT), and a chromatic aberration of magnification (CC) at the time of infinite object point focusing of the zoom lens according to the example 8, where, FIG. 16A, FIG. 16B, FIG. 16C, and FIG. 16D show a state at the wide angle end, FIG. 16E, FIG. 16F, FIG. 16G, and FIG. 16H show an intermediate focal length state, and FIG. 16I, FIG. 16J, FIG. 16K, and FIG. 16L show a state at the telephoto end;

FIG. 17A is a cross-sectional view at a wide angle end, FIG. 17B is a cross-sectional view in an intermediate focal length state, and FIG. 17C is a cross-sectional view at a telephoto end;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are diagrams showing a spherical aberration (SA), an astigmatism (AS), a distortion (DT), and a chromatic aberration of magnification (CC) at the time of infinite object point focusing of the zoom lens according to the example 9, where, FIG. 18A, FIG. 18B, FIG. 18C, and FIG. 18D show a state at the wide angle end, FIG. 18E, FIG. 18F, FIG. 18G, and FIG. 18H show an intermediate focal length state, and FIG. 18I, FIG. 18J, FIG. 18K, and FIG. 18L show a state at the telephoto end;

FIG. 19A is a cross-sectional view at a wide angle end, FIG. 19B is a cross-sectional view in an intermediate focal length state, and FIG. 19C is a cross-sectional view at a telephoto end;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are diagrams showing a spherical aberration (SA), an astigmatism (AS), a distortion (DT), and a chromatic aberration of magnification (CC) at the time of infinite object point focusing of the zoom lens according to the example 10, where, FIG. 20A, FIG. 20B, FIG. 20C, and FIG. 20D show a state at the wide angle end, FIG. 20E, FIG. 20F, FIG. 20G, and FIG. 20H show an intermediate focal length state, and FIG. 20I, FIG. 20J, FIG. 20K, and FIG. 20L show a state at the telephoto end;

FIG. 21A is a cross-sectional view at a wide angle end, FIG. 21B is a cross-sectional view in an intermediate focal length state, and FIG. 21C is a cross-sectional view at a telephoto end;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are diagrams showing a spherical aberration (SA), an astigmatism (AS), a distortion (DT), and a chromatic aberration of magnification (CC) at the time of infinite object point focusing of the zoom lens according to the example 11, where, FIG. 22A, FIG. 22B, FIG. 22C, and FIG. 22D show a state at the wide angle end, FIG. 22E, FIG. 22F, FIG. 22G, and FIG. 22H show an intermediate focal length state, and FIG. 22I, FIG. 22J, FIG. 22K, and FIG. 22L show a state at the telephoto end;

FIG. 23A is a cross-sectional view at a wide angle end, FIG. 23B is a cross-sectional view in an intermediate focal length state, and FIG. 23C is a cross-sectional view at a telephoto end;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are diagrams showing a spherical aberration (SA), an astigmatism (AS), a distortion (DT), and a chromatic aberration of magnification (CC) at the time of infinite object point focusing of the zoom lens according to the example 12, where, FIG. 24A, FIG. 24B, FIG. 24C, and FIG. 24D show a state at the wide angle end, FIG. 24E, FIG. 24F, FIG. 24G, and FIG. 24H show an intermediate focal length state, and FIG. 24I, FIG. 24J, FIG. 24K, and FIG. 24L show a state at the telephoto end;

FIG. 25A is a cross-sectional view at a wide angle end, FIG. 25B is a cross-sectional view in an intermediate focal length state, and FIG. 25C is a cross-sectional view at a telephoto end;

FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are diagrams showing a spherical aberration (SA), an astigmatism (AS), a distortion (DT), and a chromatic aberration of magnification (CC) at the time of infinite object point focusing of the zoom lens according to the example 13, where, FIG. 26A, FIG. 26B, FIG. 26C, and FIG. 26D show a state at the wide angle end, FIG. 26E, FIG. 26F, FIG. 26G, and FIG. 26H show an intermediate focal length state, and FIG. 26I, FIG. 26J, FIG. 26K, and FIG. 26L show a state at the telephoto end;

DETAILED DESCRIPTION OF THE INVENTION

Figure 1A:
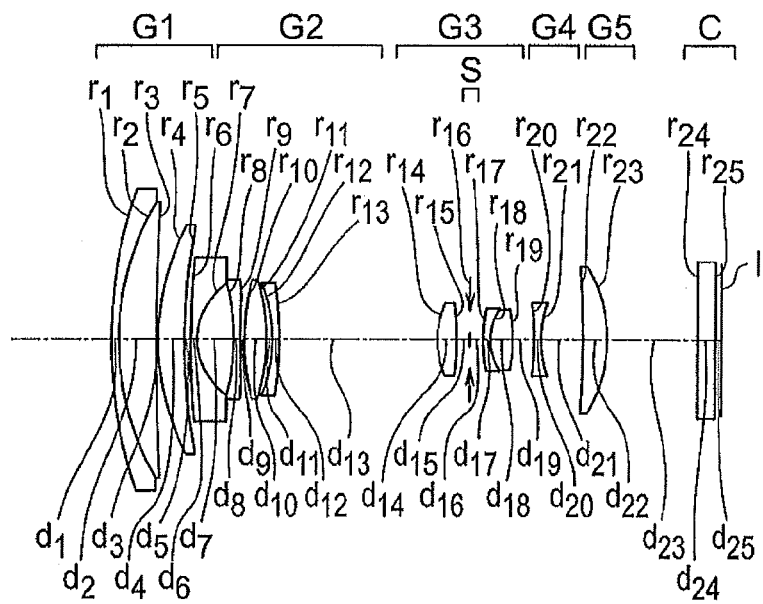
FIG. 1A, FIG. 1B, and FIG. 1C are cross-sectional views along an optical axis showing an optical arrangement at the time of infinite object point focusing of a zoom lens according to an example 1 of the present invention, where.

Prior to the description of examples, an action and effect of embodiments according to certain aspects of the present invention will be described below. For describing specifically the action and effect of the present embodiment, the description will be made by showing concrete examples. However, similarly as in cases of examples that will be described later, the aspects exemplified below are only some of the aspects that are included in the present invention, and there are a large number of variations of these aspects. Consequently, the present invention is not restricted to the aspects which are exemplified.

A zoom lens according to a first embodiment includes in order from an object to an image side, a first lens unit having a positive refractive power, a second lens unit having a negative refractive power, a third lens unit having a positive refractive power, a fourth lens unit having a negative refractive power, and a fifth lens unit having a positive refractive power, and the zoom lens has an aperture stop, which is disposed between a surface nearest to an image plane side of the second lens unit and a surface nearest to the image plane side of the third lens unit, and the zoom lens has a negative lens, which is disposed nearest to the image plane side of the second lens unit, and at the time of zooming, the aperture stop moves together with the third lens unit, and the fifth lens unit is fixed, and at the time of zooming from a wide angle end to a telephoto end, a distance between the first lens unit and the second lens unit widens, a distance between the second lens unit and the third lens unit narrows, a distance between the third lens unit and the fourth lens unit fluctuates, and a distance between the fourth lens unit and the fifth lens unit fluctuates.

The zoom lens according to the present embodiment includes in order from the object side to the image side, the first lens unit having a positive refractive power, the second lens unit having a negative refractive power, the third lens unit having a positive refractive power, the fourth lens unit having a negative refractive power, and the fifth lens unit having a positive refractive power. By letting a refractive power arrangement (order of arrangement of refractive power) to be a positive refractive power, a negative refractive power, a positive refractive power, a negative refractive power, and a positive refractive power, it is possible to achieve a back focus of a desired length. Moreover, it is possible to make a format size of an image pickup element large, and to realize a high imaging performance.

Moreover, even while securing the back focus of a desired length, it is necessary to shorten an overall optical length of the zoom lens, or in other words, to realize a thin zoom lens. For this, an increase in the overall optical length of the zoom lens at a telephoto end has to be suppressed. Moreover, it is also necessary to maintain a high imaging performance.

Therefore, the aperture stop is disposed between the surface nearest to the image plane side of the second lens unit and the surface nearest to the image plane side of the third lens unit. When such an arrangement is made, since it is possible to lower a height of a light ray, it becomes advantageous for favorable correction of aberrations such as a spherical aberration and a coma. Moreover, it is also advantageous for small-sizing of the zoom lens. The surface nearest to the image plane side of the second lens unit refers to a lens surface from among lens surfaces of the second lens unit, which is positioned nearest to the image side. Similarly, the surface nearest to the image plane side of the third lens unit refers to a lens surface from among lens surfaces of the third lens unit, which is positioned nearest to the image side. Moreover, the aperture stop is moved together with the third lens unit at the time of zooming.

Also, at the time of zooming, the fifth lens unit is let to be fixed. By doing so, since it becomes possible to simplify a mechanism of a lens barrel, it is advantageous for small-sizing of the zoom lens. Moreover, by letting the fifth lens unit to be fixed, it is advantageous with respect to manufacturing errors such as decentering. Even if the fifth lens unit is moved or even if the fifth lens unit is kept fixed, there is no change in a fact that the distance between the fourth lens unit and the fifth lens unit is variable, and there is no problem from a view point of aberration correction (favorable aberration correction is possible). From such view points, it is preferable that the fifth lens unit is fixed.

Moreover, even if a combined refractive power of the fourth lens unit and the fifth lens unit is small, since there is a correction effect with respect to off-axis aberrations such as a fluctuation in astigmatism, the fourth lens unit and the fifth lens unit have an important role from this perspective.

Moreover, at the time of zooming from the wide angle end to the telephoto end, the distance between the first lens unit and the second lens unit widens, the distance between the second lens unit and the third lens unit narrows, the distance between the third lens unit and the fourth lens unit fluctuates, and the distance between the fourth lens unit and the fifth lens unit fluctuates. By making such an arrangement, it is possible to suppress the increase in the overall optical length of the zoom lens at a telephoto side.

The fourth lens unit and the fifth lens unit may be moved such that the distance between the fourth lens unit and the fifth lens unit becomes large. By doing so, it is possible to suppress the increase in the overall optical length of the zoom lens at the telephoto side.

The zoom lens according to the present invention, while having the aforementioned basic arrangement, includes the negative lens which is disposed nearest to the image plane side of the second lens unit. Accordingly, since it is possible to have an optical path difference between a center and a periphery, it is advantageous for correction of the spherical aberration and the astigmatism. Moreover, since it is possible to make a lens diameter of the second lens unit small, it is advantageous also for small-sizing of the zoom lens.

Moreover, a zoom lens according to a second embodiment includes in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, and the zoom lens has an aperture stop, which is disposed between a surface nearest to an image plane side of the second lens unit and a surface nearest to the image plane side of the third lens unit, and at the time of zooming, the aperture stop moves together with the third lens unit, and the fifth lens unit is fixed, and at the time of zooming from a wide angle end to a telephoto end, a distance between the first lens unit and the second lens unit widens, a distance between the second lens unit and the third lens unit narrows, a distance between the third lens unit and the fourth lens unit fluctuates, and a distance between the fourth lens unit and the fifth lens unit fluctuates, and the following conditional expressions (1) and (2) are satisfied:

$$-1.3<\beta_{2t}<-0.4 \qquad (1)$$

$$-1.6<\beta_{3t}<-0.6 \qquad (2)$$

where, $\beta_{2t}$ denotes a magnification of the second lens unit at the telephoto end, and $\beta_{3t}$ denotes a magnification of the third lens unit at the telephoto end, and both $\beta_{2t}$ and $\beta_{3t}$ are magnification at the time of infinite object point focusing.

The zoom lens according to the present embodiment has the basic arrangement of the zoom lens according to the first embodiment. Since the basic arrangement of the zoom lens according to the first embodiment has already been explained, the description of the basic arrangement will be omitted here.

The zoom lens according to the second embodiment has the aforementioned basic arrangement, and the following conditional expressions (1) and (2) are satisfied:

$$-1.3<\beta_{2t}<\mathbf{-0.4} \qquad (1)$$

$$-1.6<\beta_{3t}<-0.6 \qquad (2)$$

where, $\beta_{2t}$ denotes the magnification of the second lens unit at the telephoto end, and $\beta_{3t}$ denotes the magnification of the third lens unit at the telephoto end, and both $\beta_{2t}$ and $\beta_{3t}$ are magnification at the time of infinite object point focusing.

The second lens unit and the third lens unit are lens units which control the zooming. By satisfying conditional expressions (1) and (2), it is possible to suppress an increase in an amount of movement of each of the second lens unit and the third lens unit. Accordingly, it is possible to suppress the overall optical length of the zoom lens at the telephoto end from being increased. Furthermore, it is possible to suppress a fluctuation at the time of zooming, in each of a longitudinal chromatic aberration, a chromatic aberration of magnification, the coma, and the astigmatism.

When exceeding both an upper limit value of conditional expression (1) and an upper limit value of conditional expression (2), the overall optical length of the zoom lens at the telephoto end is susceptible to increase. Moreover, at the time of zooming, suppressing the fluctuation in the aberrations such as the longitudinal chromatic aberration and the chromatic aberration of magnification in each lens unit becomes difficult. When falling below both a lower limit value of conditional expressions (1) and a lower limit value of conditional expression (2), even when the second lens unit and the third lens unit are moved in a range in which, the movement is permissible, it becomes difficult to achieve the desired zooming ratio. When an attempt is made to achieve the desired zooming ratio, the fluctuation in the coma and the astigmatism at the telephoto end in particular, is susceptible to become large.

It is preferable that the following conditional expressions (1') and (2') are satisfied instead of conditional expressions (1) and (2).

$$-1.2<\beta_{2t}<-0.45 \tag{1'}$$

$$-1.5<\beta_{3t}<-0.7 \tag{2'}$$

Furthermore, it is more preferable that the following conditional expressions (1") and (2") are satisfied instead of conditional expressions (1) and (2).

$$-1.1<\beta_{2t}<-0.5 \tag{1"}$$

$$-1.4<\beta_{3t}<-0.8 \tag{2"}$$

Moreover, a zoom lens according to a third embodiment includes in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, and the zoom lens has an aperture stop, which is disposed between a surface nearest to an image plane side of the second lens unit and a surface nearest to the image plane side of the third lens unit, and at the time of zooming, the aperture stop moves together with the third lens unit, and the fifth lens unit is fixed, and at the time of zooming from a wide angle end to a telephoto end, a distance between the first lens unit and the second lens unit widens, a distance between the second lens unit and the third lens unit narrows, a distance between the third lens unit and the fourth lens unit fluctuates, and a distance between the fourth lens unit and the fifth lens unit fluctuates, and the following conditional expression (3) is satisfied:

$$0.35<\beta_{2t}/\beta_{3t}<1.05 \tag{3}$$

where, $\beta_{2t}$ denotes a magnification of the second lens unit at the telephoto end, and $\beta_{3t}$ denotes a magnification of the third lens unit at the telephoto end, and both $\beta_{2t}$ and $\beta_{3t}$ are magnification at the time of infinite object point focusing.

The zoom lens according to the present embodiment has the basic arrangement of the zoom lens according to the first embodiment. Since the basic arrangement of the zoom lens according to the first embodiment has already been explained, the description of the basic arrangement will be omitted here.

The zoom lens according to the present embodiment has the aforementioned basic arrangement, and the following conditional expression (3) is satisfied:

$$0.35<\beta_{2t}/\beta_{3t}<1.05 \tag{3}$$

where, $\beta_{2t}$ denotes the magnification of the second lens unit at the telephoto end, and $\beta_{3t}$ denotes the magnification of the third lens unit at the telephoto end, and both $\beta_{2t}$ and $\beta_{3t}$ are magnification at the time of infinite object point focusing.

The zoom lens according to the present embodiment is a zoom lens in which, an arrangement is made such that the conditional expression (3) is satisfied instead of conditional expressions (1) and (2) in the zoom lens according to the second embodiment.

As aforementioned, the second lens unit and the third lens unit are lens units which control the zooming. By satisfying conditional expression (3), it is possible to suppress the increase in the amount of movement of each of the second lens unit and the third lens unit. Accordingly, it is possible to suppress the overall optical length of the zoom lens at the telephoto end from being increased. Furthermore, it is possible to suppress the fluctuation at the time of zooming, in each of the longitudinal chromatic aberration, the chromatic aberration, the coma, and the astigmatism.

When exceeding an upper limit value of conditional expression (3), since correction of the longitudinal chromatic aberration and the chromatic aberration of magnification in each lens unit at the telephoto end is not possible, securing a high imaging performance become difficult. When falling below a lower limit value of conditional expression (3), the overall optical length of the zoom lens at the telephoto end is susceptible to increase. When an attempt is made to suppress the increase in the overall optical length of the zoom lens, it becomes difficult to achieve the desired zooming ratio.

As already been explained, if the zoom lens according to the present embodiment has the aforementioned basic arrangement, and conditional expressions (1) and (2) are satisfied or conditional expression (3) is satisfied, an arrangement becomes a small-size and thin arrangement having a back focus of desired length and a wide angle of view, as well as high imaging performance.

It is preferable that the following conditional expression (3') is satisfied instead of conditional expression (3).

$$0.38<\beta_{2t}/\beta_{3t}<1.00 \tag{3'}$$

Moreover, it is more preferable that the following conditional expression (3") is satisfied instead of conditional expression (3).

$$0.40<\beta_{2t}/\beta_{3t}<0.95 \tag{3"}$$

Moreover, a zoom lens according to a fourth embodiment includes in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, and at the time of zooming from a wide angle end to a telephoto end, a distance between the first lens unit and the second lens unit widens, a distance between the second lens unit and the third lens unit narrows, a distance between the third lens unit and the fourth lens unit fluctuates, and a distance between the fourth lens unit and the fifth lens unit fluctuates, and the fifth lens unit is fixed with respect to zooming from the wide angle end to the telephoto end, and the zoom lens has an aperture stop, which is disposed between a surface nearest to an image plane side of the second lens unit and a surface nearest to the image plane side of the third lens unit, and the aperture stop fluctuates together with the third lens unit, and the zoom lens has at least a negative lens component and a positive lens component in the second lens unit, and the zoom lens has at least one aspheric surface in the second lens unit, and in a rectangular coordinate system in which, a horizontal axis is let to be Nd and a vertical axis is let to be vd, when a straight line expressed by $Nd_p = \alpha \times vd_p +$ (where, $\alpha = -0.017$) is set, a lens in the second lens unit is included in both of an area determined by a straight line, when it is a lower limit value of a range of the following conditional expression (10) and a straight line, when it is an upper limit value of a range of the following conditional expression (10) and an area determined by the following conditional expressions (11) and (12):

$$1.45 < \beta < 2.15 \quad (10)$$

$$1.50 < Nd_p < 1.70 \quad (11)$$

$$5 < vd_p < 40 \quad (12)$$

$$1.4 < Nd_n < 1.65 \quad (13)$$

$$45 < vd_n < 95 \quad (14)$$

where, $Nd_p$ denotes an average of refractive indices of positive lenses in the second lens unit, $vd_p$ denotes an average of Abbe numbers for positive lenses in the second lens unit, $Nd_n$ denotes an average of refractive indices of the negative lenses other than the negative lens nearest to the object side in the second lens unit, and $vd_n$ denotes an average of Abbe numbers for the negative lenses other than the negative lens nearest to the object side in the second lens unit.

Since an object being achieving a thin zoom lens in which the overall length of the optical system is shortened while securing the back focus to some extent, an issue here is to suppress a degradation of performance when the overall length of the optical system is shortened, which is an inherent point at issue. To resolve this issue, it is preferable that the abovementioned conditional expressions are satisfied.

By adopting a five-unit arrangement of a positive lens unit, a negative lens unit, a positive lens unit, a negative lens unit, and a positive lens unit, zooming (moving) the second lens unit and the third lens unit from the wide angle end to the telephoto end, and fluctuating the distance between fourth lens unit and fifth lens unit, the increase in the overall length of the optical system at the telephoto side is suppressed. Such five-unit arrangement of the positive lens unit, the negative lens unit, the positive lens unit, the negative lens unit, and the positive lens unit, is the most appropriate as an optical system in a case in which, there is a format size of the image pickup element to certain extent and the back focus to certain. extent. Even if a refractive power of a combined optical system from the fourth lens unit onward becomes small, there is an effect of correction of the off-axis aberration such as the fluctuation in the astigmatism.

Moreover, by letting the fifth lens unit to be fixed at the time of zooming, it is possible to simplify the mechanism of the lens frame, and it is advantageous for small-sizing. By letting the fifth lens unit to be fixed at the time of zooming and the distance between the fourth lens unit and the fifth lens unit to be variable, degradation of aberration due to decentering etc. becomes small, and by letting the distance between the fourth lens unit and the fifth lens unit to be variable, it is possible to achieve sufficient effect of aberration correction.

By including the aperture stop, which is disposed between the surface nearest to the image plane side of the second lens unit and the surface nearest to the image plane side of the third lens unit, and by moving the aperture stop together with the third lens unit, it is possible to lower the height of a light ray, and it is advantageous for correction of aberrations such as the spherical aberration and the coma. Lowering the height of a light ray is advantageous also for small-sizing.

Moreover, by imparting a main zooming function to the second lens unit, the coma, the curvature of field and the chromatic aberration of magnification, which are off-axis aberrations, are corrected at the wide angle end, and the spherical aberration and the longitudinal chromatic aberration, which are axial aberrations, are corrected at the telephoto end. By making an arrangement (of lenses) in the second lens unit satisfy conditional expressions (10), (11), (12), (13), and (14), and by using an aspheric surface, it is possible to achieve correction of aberration at both the wide angle end and the telephoto end, and to make the zoom lens small-size. A lens component is a single lens or a cemented lens, and has two surfaces in contact with air.

When falling below a lower limit value of conditional expression (10), correction of the spherical aberration, the coma, and distortion becomes difficult, and it is not possible to secure a high imaging performance. When an attempt is made to secure the high imaging performance, small-sizing becomes difficult. On the other hand, when exceeding an upper limit value of conditional expression (10), correction of chromatic aberration of higher order in particular becomes difficult, and it is not possible to secure a high imaging performance. When an attempt is made to secure a high imaging performance, small-sizing becomes difficult.

When falling below a lower limit value of conditional expression (11), correction of the spherical aberration, the coma, and the distortion becomes difficult, and it is not possible to secure a high imaging performance. When an attempt is made to secure the high imaging performance, small-sizing becomes difficult. On the other hand, when exceeding an upper limit value of conditional expression (11), correction of the chromatic aberration of higher order in particular becomes difficult, and it is not possible to secure a high imaging performance. When an attempt is made to secure a high imaging performance, small-sizing becomes difficult.

When falling below a lower limit value of conditional expression (12), or when exceeding an upper limit value of conditional expression (12), achieving both, that is, correction of the chromatic aberration of magnification at the wide angle end and correction of the longitudinal chromatic aberration at the telephoto end becomes difficult, and it is not possible to secure a high imaging performance. When an attempt is made to secure the high imaging performance, small-sizing becomes difficult.

When falling below a lower limit value of conditional expression (13), correction of the spherical aberration, the coma, and the distortion becomes difficult, and it is not possible to secure a high imaging performance. When an attempt is made to secure the high imaging performance, small-sizing becomes difficult. On the other hand, when exceeding an upper limit value of conditional expression (13), correction of the chromatic aberration of higher order in particular becomes difficult, and it is not possible to secure a high imaging performance. When an attempt is made to secure the high imaging performance, small-sizing becomes difficult.

When falling below a lower limit value of conditional expression (13), or when exceeding an upper limit value of conditional expression (13), achieving both, that is, correction of the chromatic aberration of magnification at the wide angle end and correction of the longitudinal chromatic aberration at the telephoto end becomes difficult, and it is not possible to achieve a high imaging performance. When an attempt is made to secure the high imaging performance, small-sizing becomes difficult.

It is preferable that the following conditional expression (10') is satisfied instead of conditional expression (10).

$$1.48<\beta<2.10 \tag{10'}$$

Moreover, it is more preferable that the following conditional expression (10") is satisfied instead of conditional expression (10).

$$1.50<\beta<2.07 \tag{10''}$$

It is preferable that the following conditional expression (11') is satisfied instead of conditional expression (11).

$$1.53<Nd_p<1.68 \tag{11'}$$

Moreover, it is more preferable that the following conditional expression (11") is satisfied instead of conditional expression (11).

$$1.55<Nd_p<1.65 \tag{11''}$$

It is preferable that the following conditional expression (12') is satisfied instead of conditional expression (12).

$$10<vd_p<38 \tag{12'}$$

Moreover, it is more preferable that the following conditional expression (12") is satisfied instead of conditional expression (12).

$$15<vd_p<35 \tag{12''}$$

It is preferable that the following conditional expression (13') is satisfied instead of conditional expression (13).

$$1.43<Nd_n<1.63 \tag{13'}$$

Moreover, it is more preferable that the following conditional expression (13") is satisfied instead of conditional expression (13).

$$1.45<Nd_n<1.6 \tag{13''}$$

It is preferable that the following conditional expression (14') is satisfied instead of conditional expression (14).

$$48<vd_n<93 \tag{14'}$$

Moreover, it is more preferable that the following conditional expression (14") is satisfied instead of conditional expression (14).

$$50<vd_n<91 \tag{14''}$$

In the zoom lens according to embodiments from the first embodiment to the fourth embodiments (hereinafter, called as 'the zoom lens according to the present embodiment'), it is preferable that the following conditional expression (4) is satisfied:

$$0.9<L_t/f_t<1.30 \tag{4}$$

where, $L_t$ denotes an overall optical length of the zoom lens at the telephoto end, and is an overall optical length at the time of infinite object point focusing, and $f_t$ denotes a focal length of the overall zoom lens system at the telephoto end.

By making so as to fall below an upper limit value of conditional expression (4), it is possible to shorten the overall optical length of the zoom lens at the telephoto end, and to carry out further small-sizing of the zoom lens. When exceeding a lower limit value of conditional expression (4), it is possible to correct aberrations such as the longitudinal chromatic aberration and the chromatic aberration of magnification favorably, and to secure a high imaging performance.

The overall optical length of the zoom lens is a distance from a lens surface nearest to the object of the zoom lens up to an image position, and this distance is a distance which is not subjected to air conversion.

It is more preferable that the following conditional expression (4') is satisfied instead of conditional expression (4).

$$0.95<L_t/f_t<1.29 \tag{4'}$$

Moreover, it is even more preferable that satisfy the following conditional expression (4") is satisfied instead of conditional expression (4).

$$1<L_t/f_t<1.28 \tag{4''}$$

In the zoom lens according to the present embodiment, it is preferable that the following conditional expression (5) is satisfied:

$$-0.27<\beta_{2w}<-0.18 \tag{5}$$

where, $\beta_{2w}$ denotes a magnification of the second lens unit at the wide angle end, and is a magnification at the time of infinite object point focusing.

When falling below an upper limit value of conditional expression (5), since the longitudinal chromatic aberration at the telephoto end is not deteriorated, it is possible to secure a high imaging performance. Moreover, since the magnification of the second lens unit at the wide angle end does not become excessively large, there is no need to shorten a focal length of the first lens unit. In this case, since a radius of curvature of a lens in the first lens unit does not become small, a thickness of the first lens unit does not increase. Moreover, a diameter of a lens in the first lens unit does not become large. Accordingly, small-sizing of the zoom lens becomes easy. When exceeding a lower limit value of conditional expression (5), the overall optical length of the zoom lens at the telephoto end is not susceptible to increase. Since this increase need not be suppressed, it becomes easy to achieve a desired zooming ratio.

It is more preferable that the following conditional expression (5') is satisfied instead of conditional expression (5).

$$-0.26<\beta_{2w}<-0.19 \tag{5'}$$

Moreover, it is even more preferable that satisfy the following conditional expression (5") is satisfied instead of conditional expression (5).

$$-0.25<\beta_{2w}<-0.2 \tag{5''}$$

In the zoom lens according to the present embodiment, it is preferable that the following conditional expression (6) is satisfied:

$$0.35<f_{1G}/L_t<0.75 \tag{6}$$

where, $L_t$ denotes the overall optical length of the zoom lens at the telephoto end, and is the overall optical length at the time of infinite object point focusing, and $f_{1G}$ denotes a focal length of the first lens unit.

When falling below an upper limit value of conditional expression (6), since the focal length of the first lens unit does not become excessively large (the refractive power of the first lens unit does not become excessively small), the overall optical length of the zoom lens at the telephoto end is not susceptible to increase. Since this increase need not be suppressed, it becomes easy to achieve a desired zooming ratio. When exceeding a lower limit value of conditional expression (6), since the focal length of the first lens unit does not become excessively small (the refractive power of the first lens unit does not become excessively large), it becomes easy to correct favorably the longitudinal chromatic aberration and the chromatic aberration of magnification at both the wide angle end and the telephoto end.

It is more preferable that the following conditional expression (6') is satisfied instead of conditional expression (6).

$$0.4 < f_{1G}/L_t < 0.7 \quad (6')$$

Moreover, it is even more preferable that the following conditional expression (6") is satisfied instead of conditional expression (6).

$$0.45 < f_{1G}/L_t < 0.65 \quad (6'')$$

Moreover, in the zoom lens according to the present embodiment, it is preferable that the fourth lens unit includes at least one aspheric surface.

By making such an arrangement, it is possible to correct favorably the spherical aberration at the telephoto end, and the coma aberration occurring in the fourth lens unit. Moreover, since it is possible to shorten the overall optical length of the zoom lens while securing the back focus of a desired length, it is possible to achieve a thin zoom lens.

Moreover, in the zoom lens according to the present embodiment, it is preferable that an air space in the third lens unit is larger than a lens thickness of the negative lens in the third lens unit.

By making this arrangement, it is possible to correct the astigmatism at the telephoto end favorably. Moreover, since it is possible to shorten the overall optical length of the zoom lens while securing the back focus of a desired length, it is possible to achieve a thin zoom lens. The lens thickness refers to a thickness on an optical axis.

Moreover, in the zoom lens according to the present embodiment, it is preferable that the following conditional expression (7) is satisfied:

$$-14 < (r_{11F} + r_{11R})/(r_{11F} - r_{11R}) < -1.5 \quad (7)$$

where, $r_{11F}$ denotes a radius of curvature of a surface nearest to the object side of the first lens unit, and $r_{11R}$ denotes a radius of curvature of a surface nearest to the image plane side of the first lens unit.

When falling below an upper limit value of conditional expression (7), since it becomes easy to correct favorably the spherical aberration and the longitudinal chromatic aberration at the telephoto end, it is possible to secure a high imaging performance. When exceeding a lower limit value of conditional expression (7), the overall optical length of the zoom lens at the telephoto end is not susceptible to increase. Since this increase need not be suppressed, it becomes easy to achieve a desired zooming ratio. The radius of curvature of the surface nearest to the object side of the first lens unit refers to a radius of curvature of a lens surface positioned nearest to the object side, from among the lens surfaces of the first lens unit. Similarly, the radius of curvature of the surface nearest to the image plane side of the first lens unit refers to a radius of curvature of a lens surface positioned nearest to the image side, from among the lens surfaces of the first lens unit.

It is more preferable that the following conditional expression (7') is satisfied instead of conditional expression (7).

$$-13.5 < (r_{11F} + r_{11R})/(r_{11F} - r_{11R}) < -1.7 \quad (7')$$

Moreover, it is even more preferable that the following conditional expression (7") is satisfied instead of conditional expression (7).

$$-13 < (r_{11F} + r_{11R})/(r_{11F} - r_{11R}) < -1.9 \quad (7'')$$

An image pickup apparatus according to the present embodiment includes one of the aforementioned zoom lenses, and an image pickup element which has an image pickup surface. By making such an arrangement, it is possible to realize an image pickup apparatus which includes a thin and small-size zoom lens having a high imaging performance.

For shortening the overall optical length of the zoom lens, it is effective to have an aperture stop in the third lens unit. Moreover, when correcting favorably various aberrations such as the spherical aberration, the coma, and the astigmatism, is taken into consideration, it is desirable to dispose the aperture stop in the third lens unit such that an arrangement is in order of a positive lens and the aperture from the object side.

For securing a high imaging performance at the telephoto end, it is effective to have an aperture stop between the second lens unit and the third lens unit. When such an arrangement is made, since symmetry (refractive power arrangement) of the overall optical system at the telephoto end becomes favorable, it is possible to correct favorably various aberrations such as the spherical aberration, the coma, and the astigmatism.

When carrying out focusing by using the fourth lens unit is taken into consideration, it is effective that the fourth lens unit includes two lens components. For suppressing fluctuation in various aberrations at the time of focusing, or in other words, fluctuation in the astigmatism, the spherical aberration, and the coma, it is effective to let the fourth lens unit have a two-lens arrangement of a negative lens and a negative lens, or a negative lens and a positive lens.

In the zoom lens according to the present embodiment, it is preferable that the following conditional expression (8) is satisfied:

$$-150 \text{ mm} < L_{EXPt} < -50 \text{ mm} \quad (8)$$

where, $L_{EXPt}$ denotes a distance from an image plane at the telephoto end up to a position of an exit pupil of the zoom lens.

When falling below an upper limit value of conditional expression (8), a diameter of a lens in the fifth lens unit becomes somewhat large, but the fifth lens unit is positioned further toward image side. Therefore, the overall optical length of the zoom lens at the telephoto end does not increase. When exceeding a lower limit value of conditional expression (8), the fifth lens unit is positioned further toward the object side. Therefore, the diameter of a lens in the fifth lens unit does not become large.

In the zoom lens according to the first embodiment, it is preferable that the following conditional expression (9) is satisfied:

$$-5 < (r_{21F} + r_{21R})/(r_{21F} - r_{21R}) < 0.5 \quad (9)$$

where, $r_{21F}$ denotes a radius of curvature of an object-side surface of the negative lens which is nearest to the image side of the second lens unit, and $r_{21R}$ denotes a radius of curvature of an image-side surface of the negative lens which is nearest to the image side of the second lens unit.

By satisfying conditional expression (9), it is possible to suppress an amount of movement of the second lens unit at the time of zooming. Moreover, it is possible to correct favorably the astigmatism, the spherical aberration, the longitudinal chromatic aberration, and the chromatic aberration of magnification. Furthermore, since it is possible to shorten the overall optical length of the zoom lens while securing the back focus of a desired length, it is possible to achieve a thin zoom lens.

When falling below an upper limit value of conditional expression (9), since correction of aberrations such as the longitudinal chromatic aberration and the chromatic aberration of magnification becomes easy, it is possible to secure a high imaging performance. When exceeding a lower limit value of conditional expression (9), since the overall optical length of the zoom lens at the telephoto end does not increase, small-sizing of the zoom lens becomes easy.

It is more preferable that the following conditional expression (9') is satisfied instead of conditional expression (9).

$$-4.8 < (r_{21F} + r_{21R})/(r_{21F} - r_{21R}) < 0.4 \quad (9')$$

Moreover, it is even more preferable that the following conditional expression (9") is satisfied instead of conditional expression (9).

$$-4.6 < (r_{21F} + r_{21R})/(r_{21F} - r_{21R}) < 0.3 \quad (9'')$$

In the zoom lens according to the first embodiment, it is preferable that a total of the number of lenses in the first lens unit and in the fourth lens unit is not less than five.

By making such an arrangement, it is possible to correct favorably the spherical aberration, the longitudinal chromatic aberration, and the chromatic aberration of magnification at the telephoto end. Since it is possible to shorten the overall optical length of the zoom lens while securing the back focus of a desired length, it is possible to achieve a thin zoom lens.

The zoom lenses described above may satisfy the aforementioned arrangements simultaneously. Making such an arrangement is preferable for achieving a favorable zoom lens. Moreover, combinations of the preferable arrangements are arbitrary.

Regarding each conditional expression, restricting one of the lower limit value and the upper limit value, or both, is preferable, as that function becomes more assured. Moreover, regarding each conditional expression, only the upper limit value or the lower limit value of a numerical range of a conditional expression which is restricted, may be restricted. For restricting the numerical range of a conditional expression, the upper limit value or the lower limit value of each conditional expression may be let to be an upper limit value or a lower limit value of the other conditional expression.

Examples of zoom lenses according to certain aspects of the present invention will be described below in detail by referring to the accompanying diagrams. However, the present invention is not restricted to the examples described below.

Figure 1B:
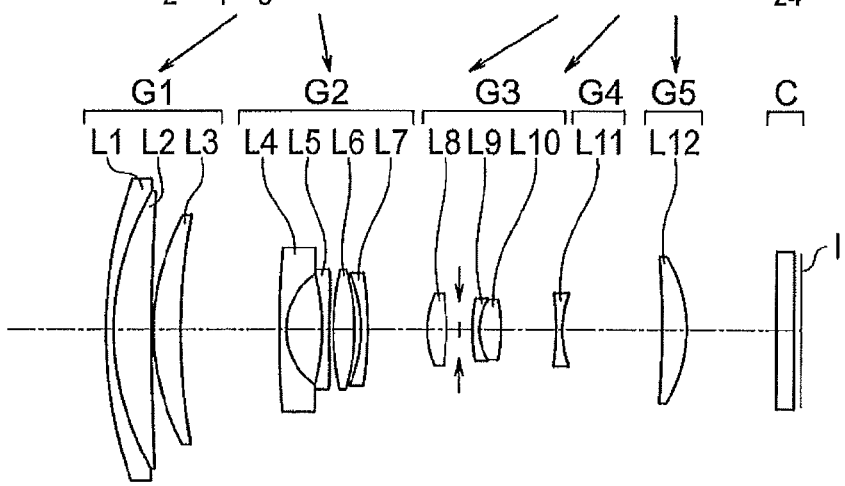
Figure 1C:
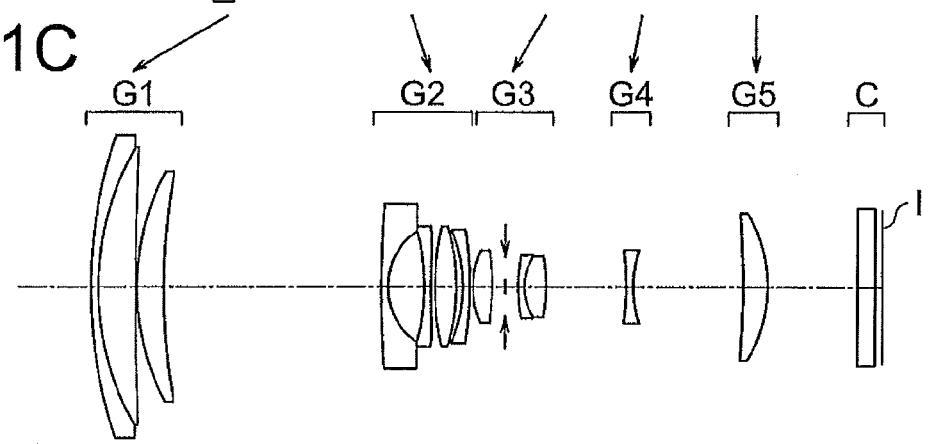

A zoom lens according to an example 1 will be described below. FIG. 1A, FIG. 1B, and FIG. 1C are cross-sectional views along an optical axis showing an optical arrangement at the time of infinite object point focusing of the zoom lens according to the example 1, where, FIG. 1A is a cross-sectional view at a wide angle end, FIG. 1B is a cross-sectional view in an intermediate focal length state, and FIG. 1C is a cross-sectional view at a telephoto end. In all the examples described below, in lens cross-sectional views, C denotes a cover glass, and I denotes an image pickup surface of an image pickup element.

FIG. 2A, FIG. 2B, FIG. 2C, FIG. 2D, FIG. 2E, FIG. 2F, FIG. 2G, FIG. 2H, FIG. 2I, FIG. 2J, FIG. 2K, and FIG. 2L are aberrations diagrams at the time of infinite object point focusing of the zoom lens according to the example 1, and ω denotes a half angle of view. Symbols in the aberration diagrams are common also in the examples that will be described later.

In these aberration diagrams, FIG. 2A, FIG. 4A, FIG. 6A, FIG. 8A, FIG. 10A, FIG. 12A, FIG. 14A, FIG. 16A, FIG. 18A, FIG. 20A, FIG. 22A, FIG. 24A, and FIG. 26A show a spherical aberration (SA) at the wide angle end, FIG. 2B, FIG. 4B, FIG. 6B, FIG. 8B, FIG. 10B, FIG. 12B, FIG. 14B, FIG. 16B, FIG. 18B, FIG. 20B, FIG. 22B, FIG. 24B, and FIG. 26B show an astigmatism (AS) at the wide angle end, FIG. 2C, FIG. 4C, FIG. 6C, FIG. 8C, FIG. 10C, FIG. 12C, FIG. 14C, FIG. 16C, FIG. 18C, FIG. 20C, FIG. 22C, FIG. 24C, and FIG. 26C show a distortion (DT) at the wide angle end, and FIG. 2D, FIG. 4D, FIG. 6D, FIG. 8D, FIG. 10D, FIG. 12D, FIG. 14D, FIG. 16D, FIG. 18D, FIG. 20D, FIG. 22D, FIG. 24D, and FIG. 26D show a chromatic aberration of magnification (CC) at the wide angle end.

Moreover, FIG. 2E, FIG. 4E, FIG. 6E, FIG. 8E, FIG. 10E, FIG. 12E, FIG. 14E, FIG. 16E, FIG. 18E, FIG. 20E, FIG. 22E, FIG. 24E, and FIG. 26E show a spherical aberration (SA) in an intermediate focal length state, FIG. 2F, FIG. 4F, FIG. 6F, FIG. 8F, FIG. 10F, FIG. 12F, FIG. 14F, FIG. 16F, FIG. 18F, FIG. 20F, FIG. 22F, FIG. 24F, and FIG. 26F show an astigmatism (AS) in the intermediate focal length state, FIG. 2G, FIG. 4G, FIG. 6G, FIG. 8G, FIG. 10G, FIG. 12G, FIG. 14G, FIG. 16G, FIG. 18G, FIG. 20G, FIG. 22G, FIG. 24G, and FIG. 26G show a distortion (DT) in the intermediate focal length state, and FIG. 2H, FIG. 4H, FIG. 6H, FIG. 8H, FIG. 10H, FIG. 12H, FIG. 14H, FIG. 16H, FIG. 18H, FIG. 20H, FIG. 22H, FIG. 24H, and FIG. 26H show a chromatic aberration of magnification (CC) in the intermediate focal length state.

Furthermore, FIG. 2I, FIG. 4I, FIG. 6I, FIG. 8I, FIG. 10I, FIG. 12I, FIG. 14I, FIG. 16I, FIG. 18I, FIG. 20I, FIG. 22I, FIG. 24I, and FIG. 26I show a spherical aberration (SA) at the telephoto end, FIG. 2J, FIG. 4J, FIG. 6J, FIG. 8J, FIG. 10J, FIG. 12J, FIG. 14J, FIG. 16J, FIG. 18J, FIG. 20J, FIG. 22J, FIG. 24J, and FIG. 26J show an astigmatism (AS) at the telephoto end, FIG. 2K, FIG. 4K, FIG. 6K, FIG. 8K, FIG. 10K, FIG. 12K, FIG. 14K, FIG. 16K, FIG. 18K, FIG. 20K, FIG. 22K, FIG. 24K, and FIG. 26K show a distortion (DT) at the telephoto end, and FIG. 2L, FIG. 4L, FIG. 6L, FIG. 8L, FIG. 10L, FIG. 12L, FIG. 14L, FIG. 16L, FIG. 18L, FIG. 20L, FIG. 22L, FIG. 24L, and FIG. 26L show a chromatic aberration of magnification (CC) at the telephoto end.

The zoom lens according to the example 1, as shown in FIG. 1A, FIG. 1B, and FIG. 1C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, the aperture stop S, a negative meniscus lens L9 having a convex surface directed toward the object side, and a biconvex positive lens L10. Here, the negative meniscus lens L9 and the biconvex positive lens L10 are cemented.

The fourth lens unit G4 includes a biconcave negative lens L11.

The fifth lens unit G5 includes a positive meniscus lens L12 having a convex surface directed toward the image side.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed (stationary).

An aspheric surface is provided to a total of five surfaces namely, both surfaces of the biconcave negative lens L5, both surfaces of the biconvex positive lens L8, and an image-side surface of the biconcave negative lens L11.

Figure 3A:
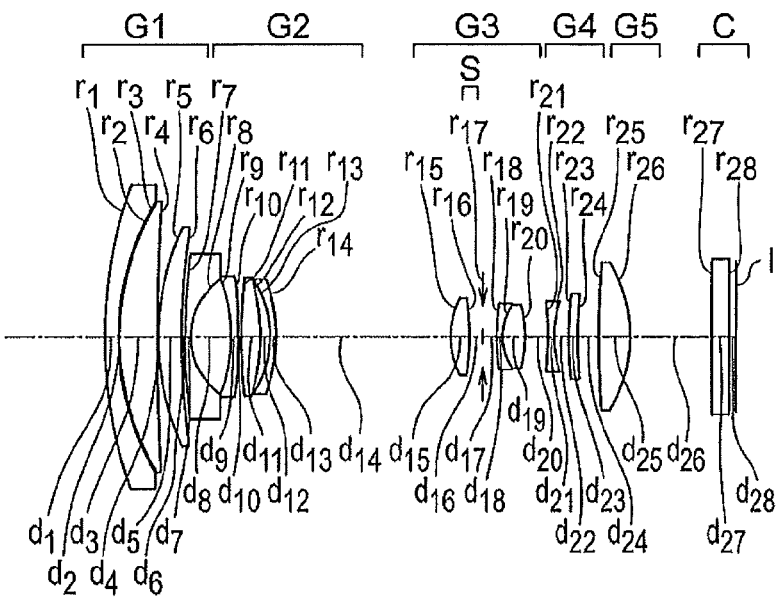
FIG. 3A, FIG. 3B, and FIG. 3C are cross-sectional views along an optical axis showing an optical arrangement at the time of infinite object point focusing of a zoom lens according to an example 2 of the present invention, where.
Figure 3B:
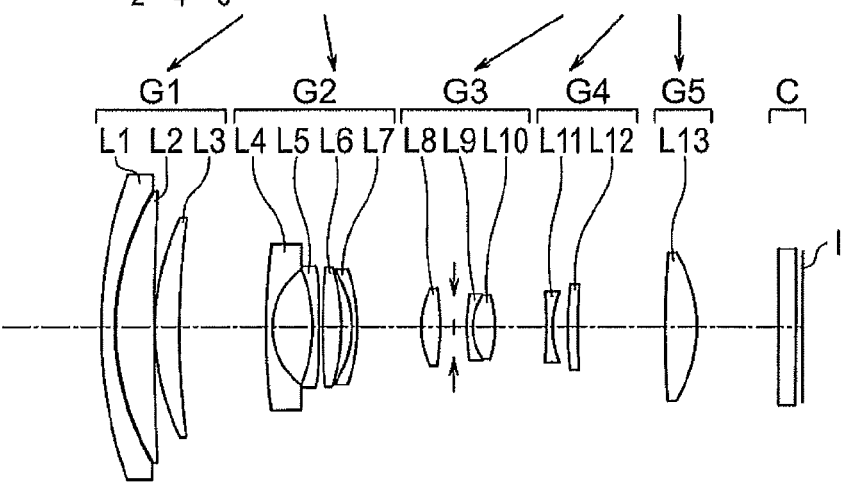
Figure 3C:
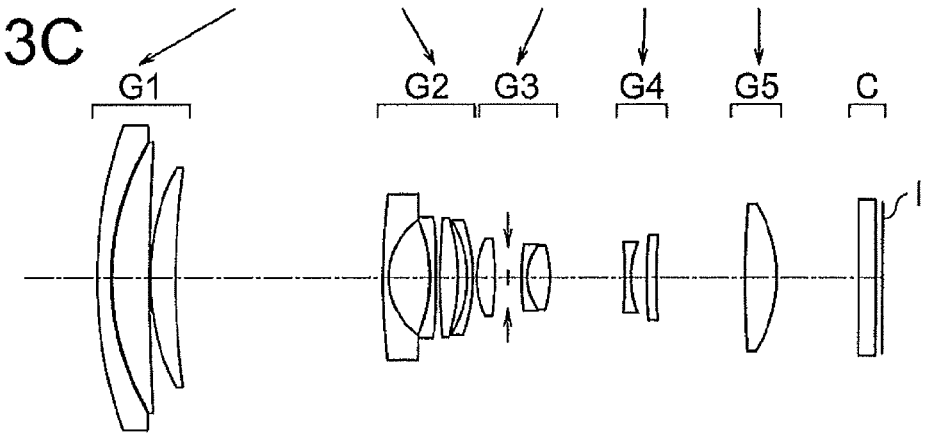

Next, a zoom lens according to an example 2 of the present invention will be described below. FIG. 3A, FIG. 3B, and FIG. 3C are cross-sectional views along an optical axis showing an optical arrangement at the time of infinite object point focusing of the zoom lens according to the example 2, and FIG. 4A, FIG. 4B, FIG. 4C, FIG. 4D, FIG. 4E, FIG. 4F, FIG. 4G, FIG. 4H, FIG. 4I, FIG. 4J, FIG. 4K, and FIG. 4L are aberration diagrams at the time of infinite object point focusing of the zoom lens according to the example 2.

The zoom lens according to the example 2, as shown in FIG. 3A, FIG. 3B, and FIG. 3C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, a negative meniscus lens L5 having a convex surface directed toward an image side, a biconvex positive lens L6, and a negative meniscus lens L7 having a convex surface directed toward the image side.

The third lens unit G3 includes a biconvex positive lens L8, the aperture stop S, a negative meniscus lens L9 having a convex surface directed toward the object side, and a biconvex positive lens L10. Here, the negative meniscus lens L9 and the biconvex positive lens L10 are cemented.

The fourth lens unit G4 includes a biconcave negative lens L11 and a positive meniscus lens L12 having a convex surface directed toward the object side.

The fifth lens unit G5 includes a biconvex positive lens L13.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed (stationary).

An aspheric surface is provided to a total of five surfaces namely, both surfaces of the negative meniscus lens L5, both surfaces of the biconvex positive lens L8, and an object-side surface of the negative meniscus lens L12.

Figure 5A:
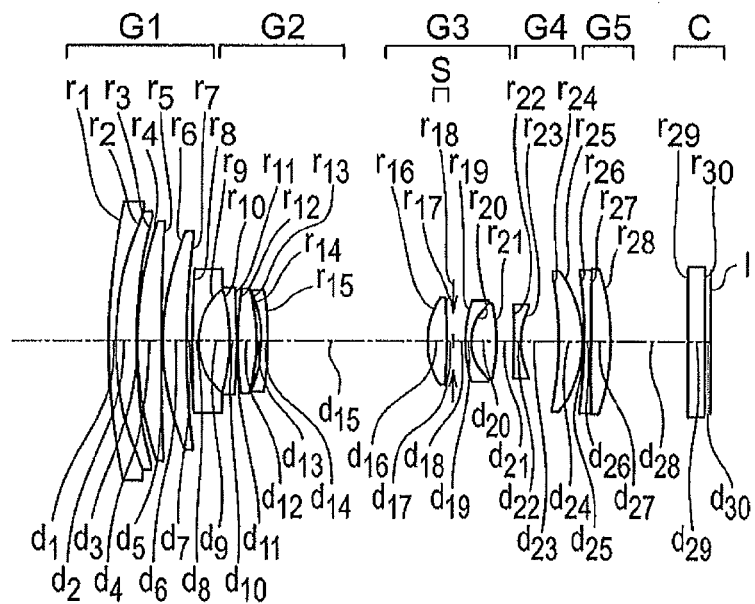
FIG. 5A, FIG. 5B, and FIG. 5C are cross-sectional views along an optical axis showing an optical arrangement at the time of infinite object point focusing of a zoom lens according to an example 3 of the present invention, where.
Figure 5B:
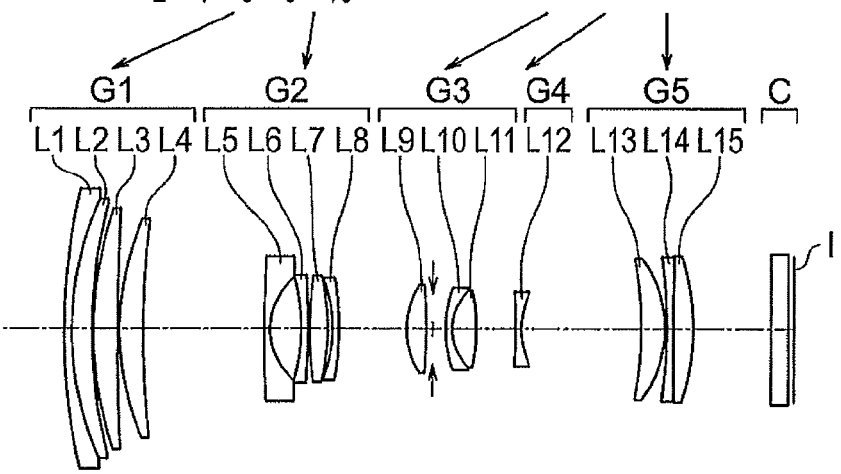
Figure 5C:
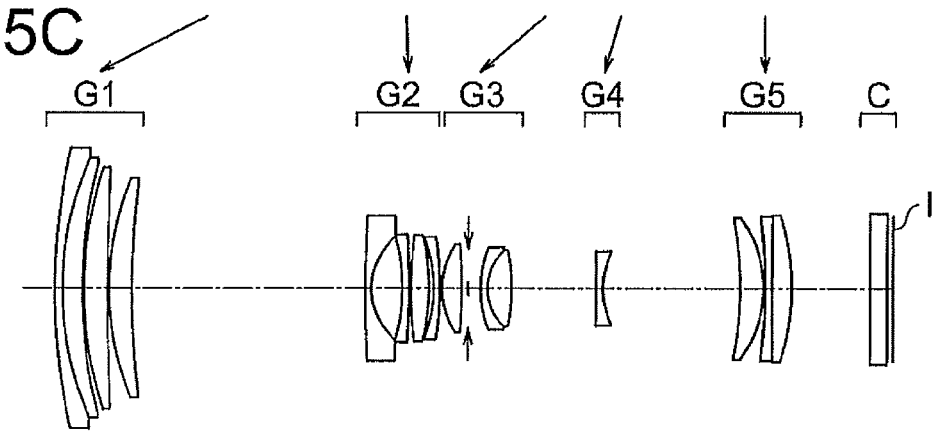

Next, a zoom lens according to an example 3 of the present invention will be described below. FIG. 5A, FIG. 5B, and FIG. 5C are cross-sectional views along an optical axis showing an optical arrangement at the time of infinite object point focusing of the zoom lens according to the example 3, and FIG. 6A, FIG. 6B, FIG. 6C, FIG. 6D, FIG. 6E, FIG. 6F, FIG. 6G, FIG. 6H, FIG. 6I, FIG. 6J, FIG. 6K, and FIG. 6L are aberration diagrams at the time of infinite object point focusing of the zoom lens according to the example 3.

The zoom lens according to the example 3, as shown in FIG. 5A, FIG. 5B, and FIG. 5C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, a positive meniscus lens L3 having a convex surface directed toward the object side, and a positive meniscus lens L4 having a convex surface directed toward the object side. Here, the negative meniscus lens L1 and the positive meniscus lens L2 are cemented.

The second lens unit G2 includes a negative meniscus lens L5 having a convex surface directed toward the object side, a negative meniscus lens L6 having a convex surface directed toward an image side, a biconvex positive lens L7, and a negative meniscus lens L8 having a convex surface directed toward the image side.

The third lens unit G3 includes a biconvex positive lens L9, the aperture stop S, a negative meniscus lens L10 having a convex surface directed toward the object side, and a biconvex positive lens L11. Here, the negative meniscus lens L10 and the biconvex positive lens L11 are cemented.

The fourth lens unit G4 includes a negative meniscus lens L12 having a convex surface directed toward the object side.

The fifth lens unit G5 includes a positive meniscus lens L13 having a convex surface directed toward the image side, a biconcave negative lens L14, and a biconvex positive lens L15. Here, the biconcave negative lens L14 and the biconvex positive lens L15 are cemented.

At the time of zooming from a wide angle end to a telephoto end, the first lens unit G1 moves toward the object side, the second lens unit G2, after moving toward the object side, moves toward the image side, the third lens unit G3 moves toward the object side, the fourth lens unit G4 moves toward the object side, and the fifth lens unit G5 is fixed (stationary).

An aspheric surface is provided to a total of seven surfaces namely, both surfaces of the negative meniscus lens L5, an image-side surface of the negative meniscus lens L8, both surfaces of the biconvex positive lens L9, and both surfaces of the negative meniscus lens L12.

Figure 7A:
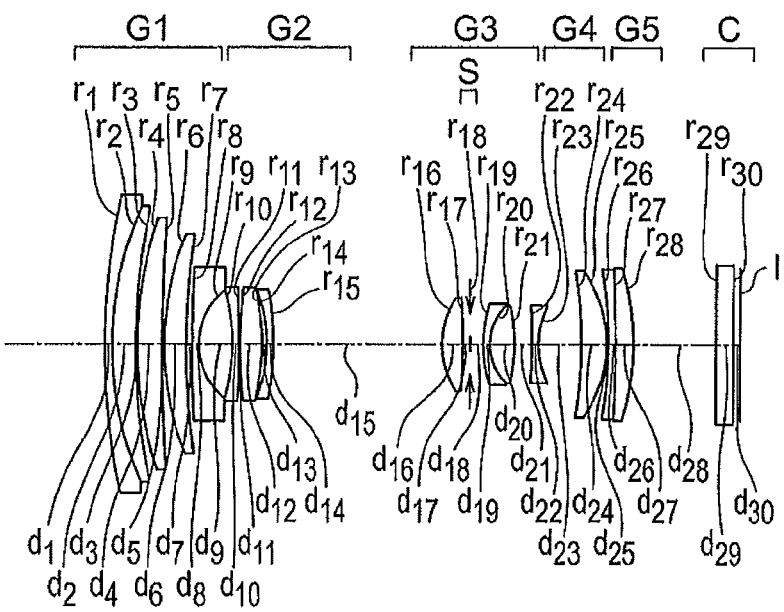
FIG. 7A, FIG. 7B, and FIG. 7C are cross-sectional views along an optical axis showing an optical arrangement at the time of infinite object point focusing of a zoom lens according to an example 4 of the present invention, where.
Figure 7B:
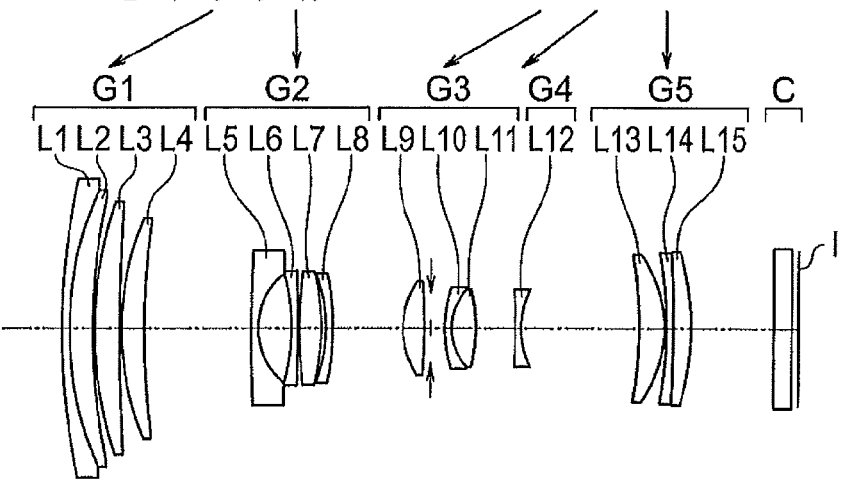
Figure 7C:
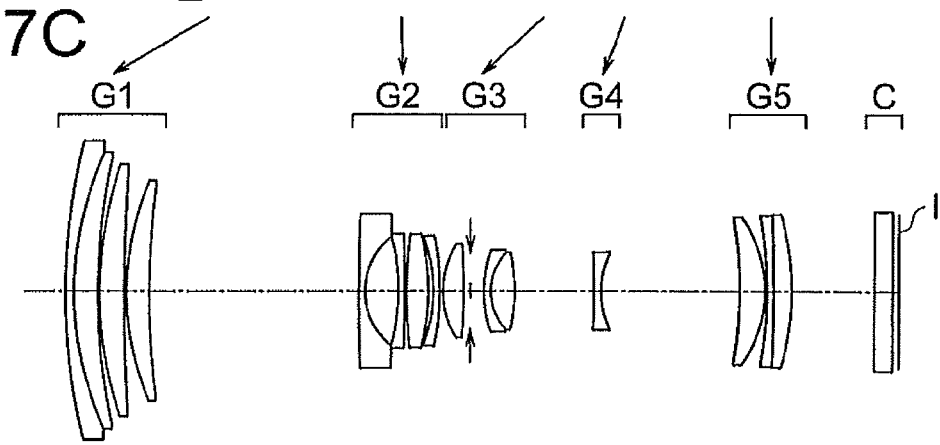

Next, a zoom lens according to an example 4 of the present invention will be described below. FIG. 7A, FIG. 7B, and FIG. 7C are cross-sectional views along an optical axis showing an optical arrangement at the time of infinite object point focusing of the zoom lens according to the example 4, and FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the zoom lens according to the example 4.

The zoom lens according to the example 4, as shown in FIG. 7A, FIG. 7B, and FIG. 7C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, a positive meniscus lens L3 having a convex surface directed toward the object side, and a positive meniscus lens L4 having a convex surface directed toward the object side. Here, the negative meniscus lens L1 and the positive meniscus lens L2 are cemented.

The second lens unit G2 includes a negative meniscus lens L5 having a convex surface directed toward the object side, a negative meniscus lens L6 having a convex surface directed toward an image side, a biconvex positive lens L7, and a negative meniscus lens L8 having a convex surface directed toward the image side.

The third lens unit G3 includes a biconvex positive lens L9, the aperture stop S, a negative meniscus lens L10 having a convex surface directed toward the object side, and a biconvex positive lens L11. Here, the negative meniscus lens L10 and the biconvex positive lens L11 are cemented.

The fourth lens unit G4 includes a negative meniscus lens L12 having a convex surface directed toward the object side.

The fifth lens unit G5 includes a positive meniscus lens L13 having a convex surface directed toward the image side, a negative meniscus lens L14 having a convex surface directed toward the image side, and a positive meniscus lens L15 having a convex surface directed toward the image side. Here, the negative meniscus lens L14 and the positive meniscus lens L15 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed (stationary).

An aspheric surface is provided to a total of seven surfaces namely, both surfaces of the negative meniscus lens L5, an image-side surface of the negative meniscus lens L8, both surfaces of the biconvex positive lens L9, and both surfaces of the negative meniscus lens L12.

Figure 9A:
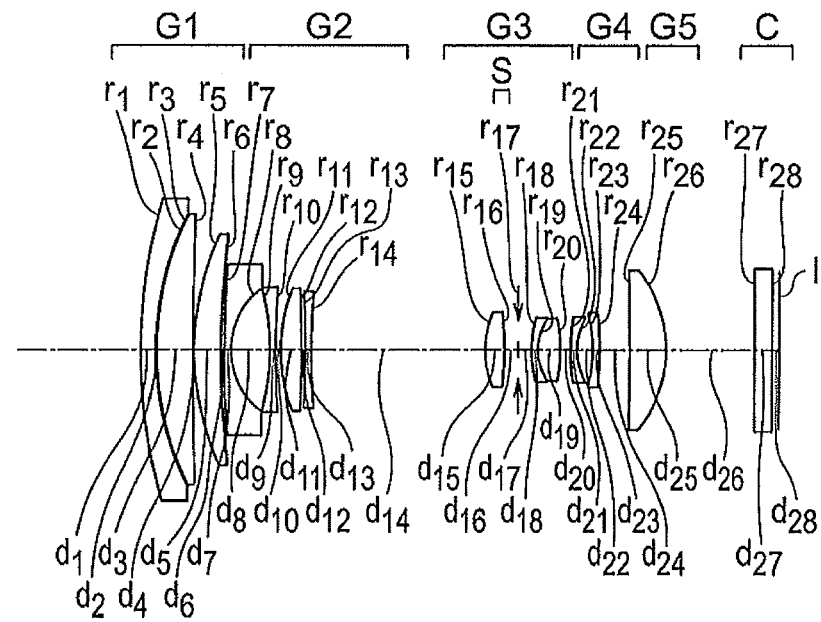
FIG. 9A, FIG. 9B, and FIG. 9C are cross-sectional views along an optical axis showing an optical arrangement at the time of infinite object point focusing of a zoom lens according to an example 5 of the present invention, where.
Figure 9B:
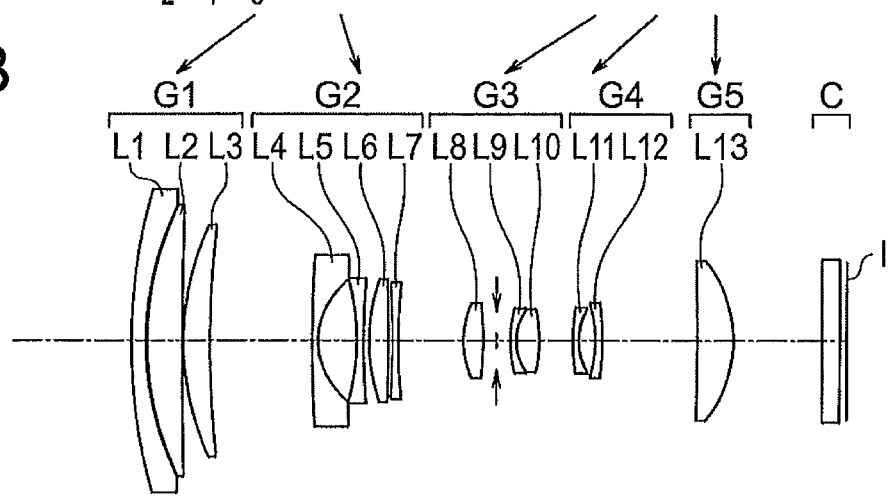
Figure 9C:
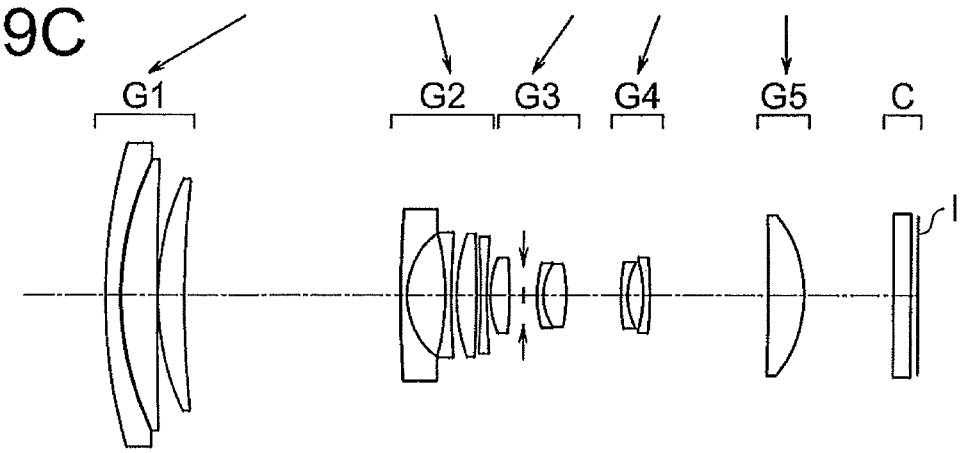

Next, a zoom lens according to an example 5 of the present invention will be described below. FIG. 9A, FIG. 9B, and FIG. 9C are cross-sectional views along an optical axis showing an optical arrangement at the time of infinite object point focusing of the zoom lens according to the example 5, and FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the zoom lens according to the example 5.

The zoom lens according to the example 5, as shown in FIG. 9A, FIG. 9B, and FIG. 9C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, a biconcave negative lens L5, a biconvex positive lens L6, and a biconcave negative lens L7.

The third lens unit G3 includes a biconvex positive lens L8, the aperture stop S, a negative meniscus lens L9 having a convex surface directed toward the object side, and a biconvex positive lens L10. Here, the negative meniscus lens L9 and the biconvex positive lens L10 are cemented.

The fourth lens unit G4 includes a negative meniscus lens L11 having a convex surface directed toward the object side and a negative meniscus lens L12 having a convex surface directed toward an image side.

The fifth lens unit G5 includes a positive meniscus lens L13 having a convex surface directed toward the image side.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed (stationary).

An aspheric surface is provided to a total of three surfaces namely, both surfaces of the biconvex positive lens L8, and an object-side surface of the negative meniscus lens L12.

Figure 11A:
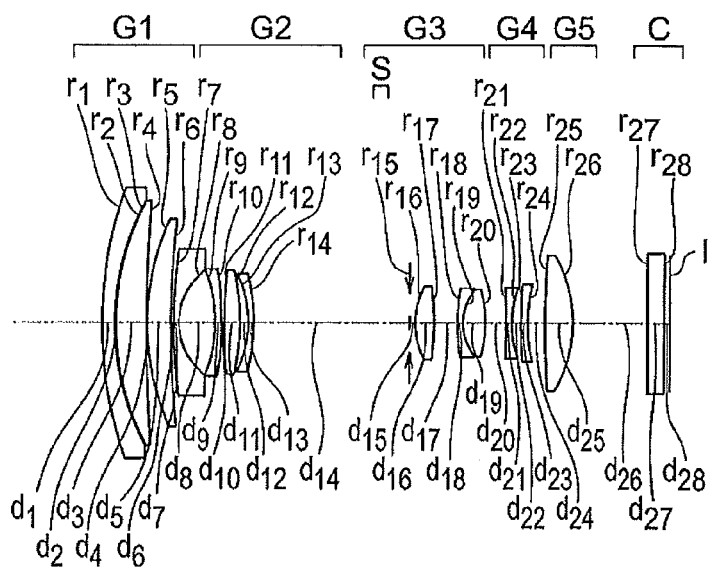
FIG. 11A, FIG. 11B, FIG. 11C are cross-sectional views along an optical axis showing an optical arrangement at the time of infinite object point focusing of a zoom lens according to an example 6 of the present invention, where.
Figure 11B:
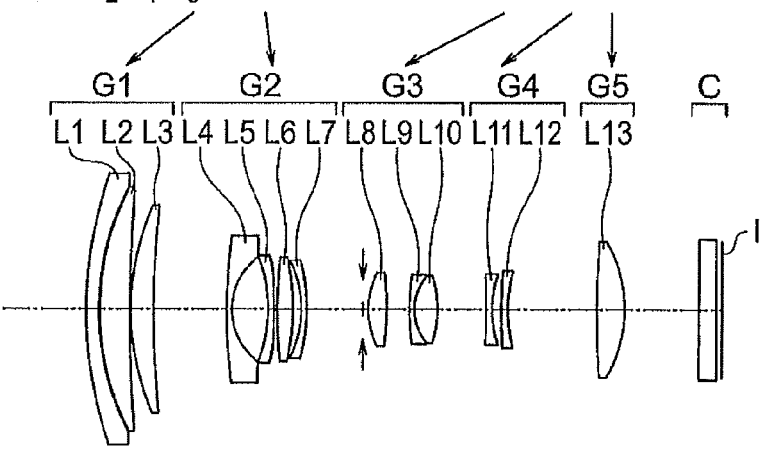
Figure 11C:
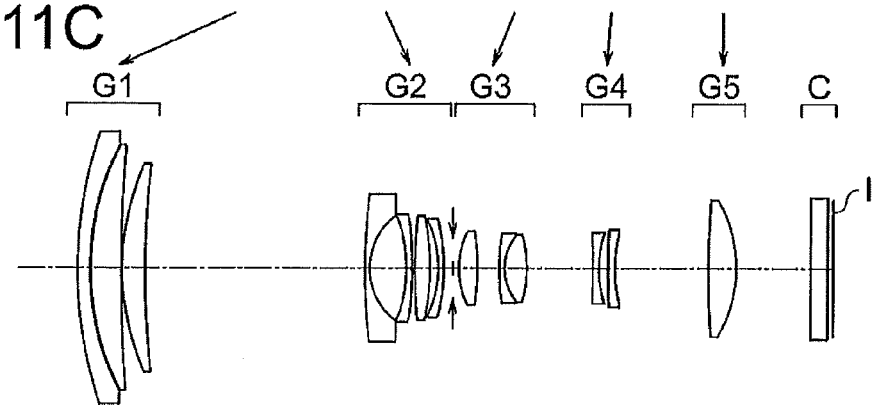

Next, a zoom lens according to an example 6 of the present invention will be described below. FIG. 11A, FIG. 11B, and FIG. 11C are cross-sectional views along an optical axis showing an optical arrangement at the time of infinite object point focusing of the zoom lens according to the example 6, and FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the zoom lens according to the example 6.

The zoom lens according to the example 6, as shown in FIG. 11A, FIG. 11B, and FIG. 11C, includes in order from an object side, a first lens unit G1 having a positive refractive power, a second lens unit G2 having a negative refractive power, a third lens unit G3 having a positive refractive power, a fourth lens unit G4 having negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, negative meniscus lens L5 having a convex surface directed toward an image side, a biconvex positive lens L6, and a negative meniscus lens L7 having a convex surface directed toward the image side.

The third lens unit G3 includes the aperture stop S, the biconvex positive lens L8, a negative meniscus lens L9 having a convex surface directed toward the object side, and a biconvex positive lens L10. The negative meniscus lens L9 and the biconvex positive lens L10 are cemented.

The fourth lens unit G4 includes a biconcave negative lens L11 and a negative meniscus lens L12 having a convex surface directed toward the object side.

The fifth lens unit G5 includes a biconvex positive lens L13.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed (stationary).

An aspheric surface is provided to a total of five surfaces namely, both surfaces of the negative meniscus lens L5, both surfaces of the biconvex positive lens L8, and an object-side surface of the negative meniscus lens L12.

Figure 13A:
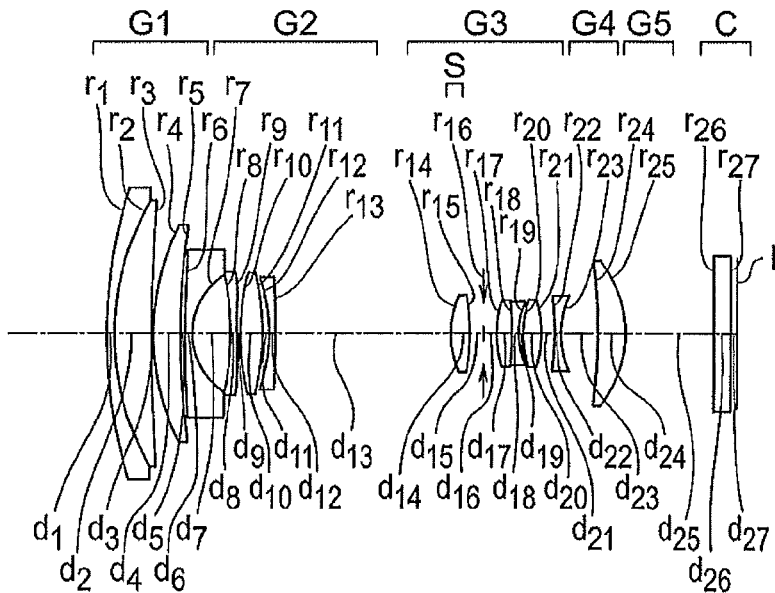
FIG. 13A, FIG. 13B, FIG. 13C are cross-sectional views along an optical axis showing an optical arrangement at the time of infinite object point focusing of a zoom lens according to an example 7 of the present invention, where.
Figure 13B:
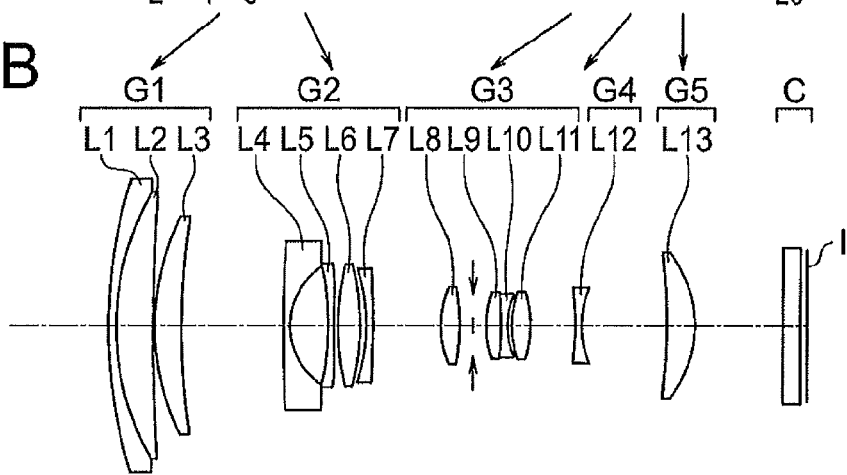
Figure 13C:
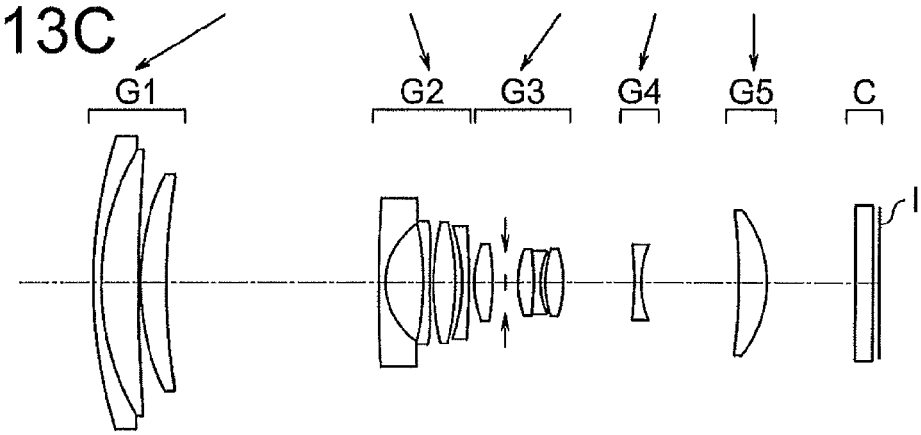

Next, a zoom lens according to an example 7 of the present invention will be described below. FIG. 13A, FIG. 13B, and FIG. 13C are cross-sectional views along an optical axis showing an optical arrangement at the time of infinite object point focusing of the zoom lens according to the example 7, and FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of infinite object point focusing of the zoom lens according to the example 7.

The zoom lens according to the example 7, as shown in FIG. 13A, FIG. 13B, and FIG. 13C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, the aperture stop S, a biconvex positive lens L9, a biconcave negative lens L10, and a biconvex positive lens L11. Here, the biconvex positive lens L9 and the biconcave negative lens L10 are cemented.

The fourth lens unit G4 includes a biconcave negative lens L12.

The fifth lens unit G5 includes a positive meniscus lens L13 having a convex surface directed toward the image side.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed (stationary).

An aspheric surface is provided to a total of seven surfaces namely, both surfaces of the biconcave negative lens L5, both surfaces of the biconvex positive lens L8, both surfaces of the biconvex positive lens L11, and an image-side surface of the biconcave negative lens L12.

Figure 15A:
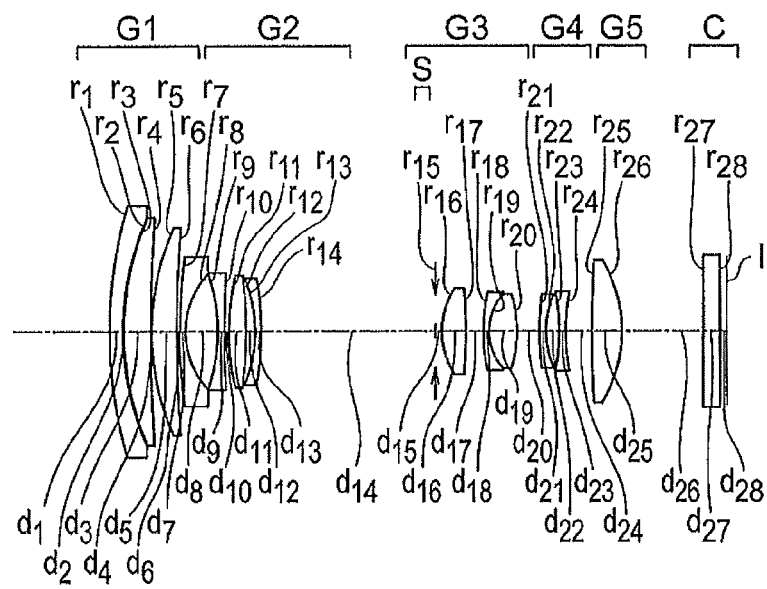
FIG. 15A, FIG. 15B, FIG. 15C are cross-sectional views along an optical axis showing an optical arrangement at the time of infinite object point focusing of a zoom lens according to an example 8 of the present invention, where.
Figure 15B:
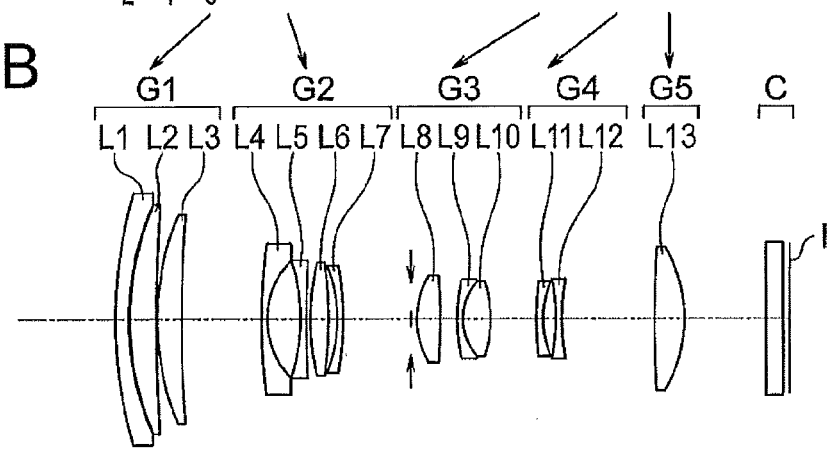
Figure 15C:
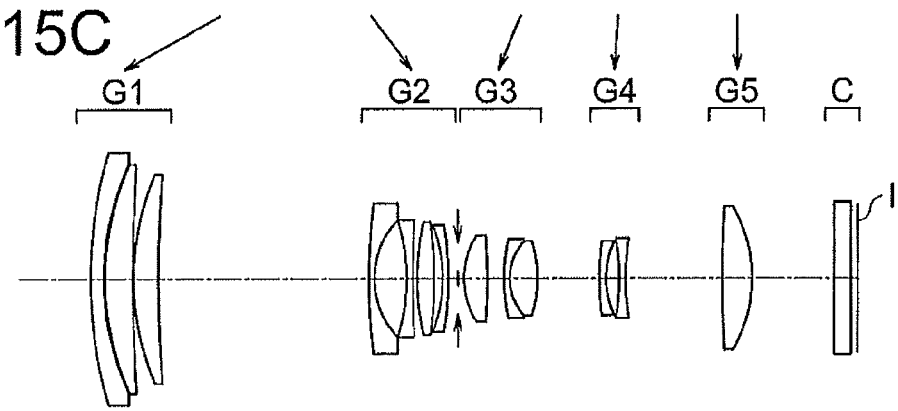

Next, a zoom lens according to an example 8 of the present invention will be described below. FIG. 15A, FIG. 15B, and FIG. 15C are cross-sectional views along an optical axis showing an optical arrangement at the time of infinite object point focusing of the zoom lens according to the example 8, and FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of infinite object point focusing of the zoom lens according to the example 8.

The zoom lens according to the example 8, as shown in FIG. 15A, FIG. 15B, and FIG. 15C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes the aperture stop S, a biconvex positive lens L8, a negative meniscus lens L9 having a convex surface directed toward the object side, and a biconvex positive lens L10. Here, the negative meniscus lens L9 and the biconvex positive lens L10 are cemented.

The fourth lens unit G4 includes a negative meniscus lens L11 having a convex surface directed toward the object side and a biconcave negative lens L12.

The fifth lens unit G5 includes a biconvex positive lens L13.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed (stationary).

An aspheric surface is provided to a total of five surfaces namely, both surfaces of the biconcave negative lens L5, both surfaces of the biconvex positive lens L8, and an object-side surface of the biconcave negative lens L12.

Figure 17A:
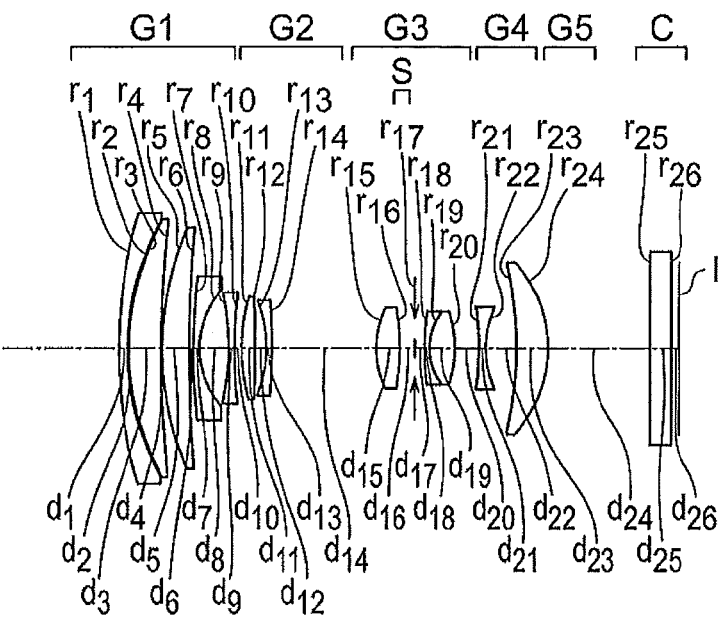
FIG. 17A, FIG. 17B, and FIG. 17C are cross-sectional views along an optical axis showing an optical arrangement at the time of infinite object point focusing of a zoom lens according to an example 9 of the present invention, where.
Figure 17B:
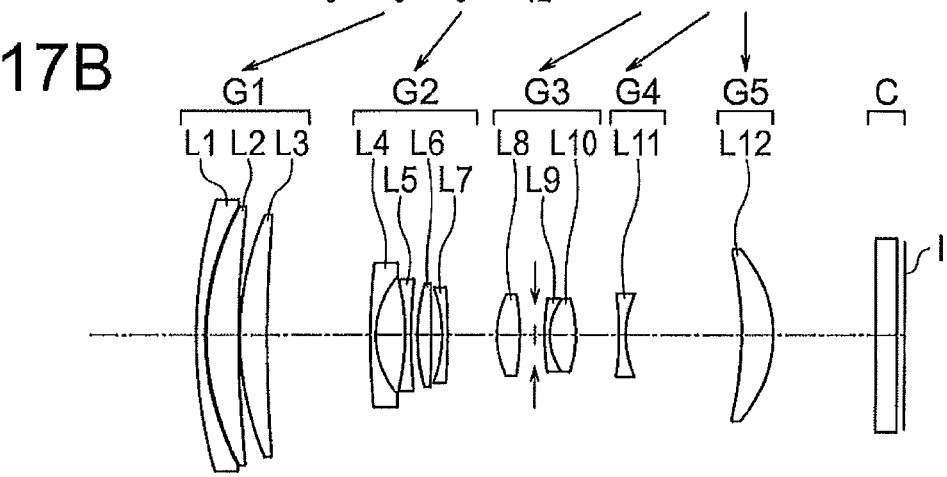
Figure 17C:
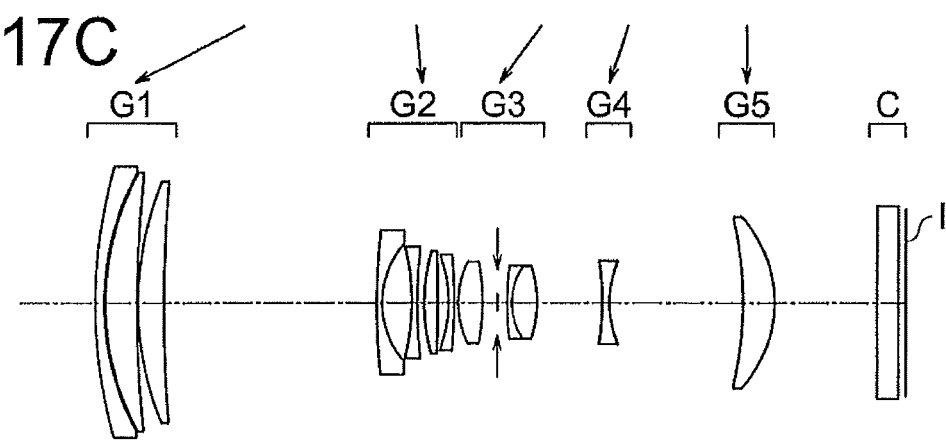

Next, a zoom lens according to an example 9 of the present invention will be described below. FIG. 17A, FIG. 17B, and FIG. 17C are cross-sectional views along an optical axis showing an optical arrangement at the time of infinite object point focusing of the zoom lens according to the example 9, and FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of infinite object point focusing of the zoom lens according to the example 9.

The zoom lens according to the example 9, as shown in FIG. 17A, FIG. 17B, and FIG. 17C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, the aperture stop S, a negative meniscus lens L9 having a convex surface directed toward the object side, and a biconvex positive lens L10. Here, the negative meniscus lens L9 and the biconvex positive lens L10 are cemented.

The fourth lens unit G4 includes a biconcave negative lens L11.

The fifth lens unit G5 includes a positive meniscus lens L12 having a convex surface directed toward the image side.

At the time of zooming from a wide angle end to a telephoto end, the first lens unit G1 moves toward the object side, the second lens unit G2, after moving toward the object side, moves toward the image side, the third lens unit G3 moves toward the object side, the fourth lens unit G4 moves toward the object side, and the fifth lens unit G5 is fixed (stationary).

An aspheric surface is provided to a total of four surfaces namely, both surfaces of the biconvex positive lens L8 and both surfaces of the biconcave negative lens L11.

Figure 19A:
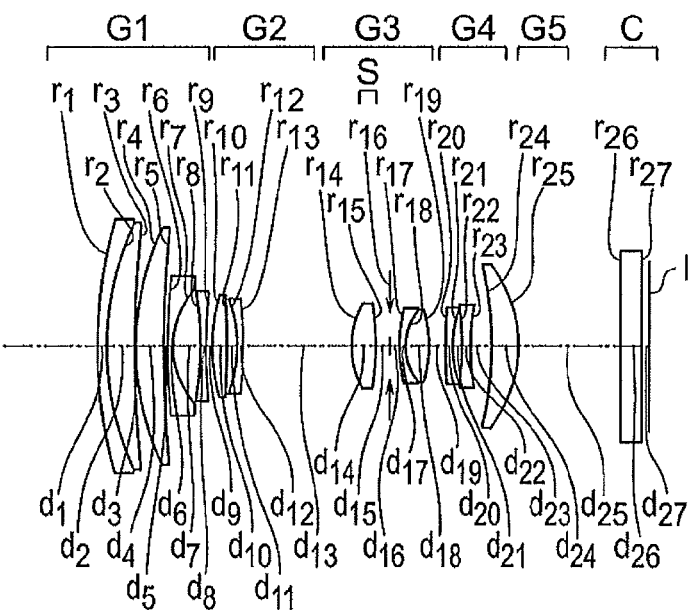
FIG. 19A, FIG. 19B, and FIG. 19C are cross-sectional views along an optical axis showing an optical arrangement at the time of infinite object point focusing of a zoom lens according to an example 10 of the present invention, where.
Figure 19B:
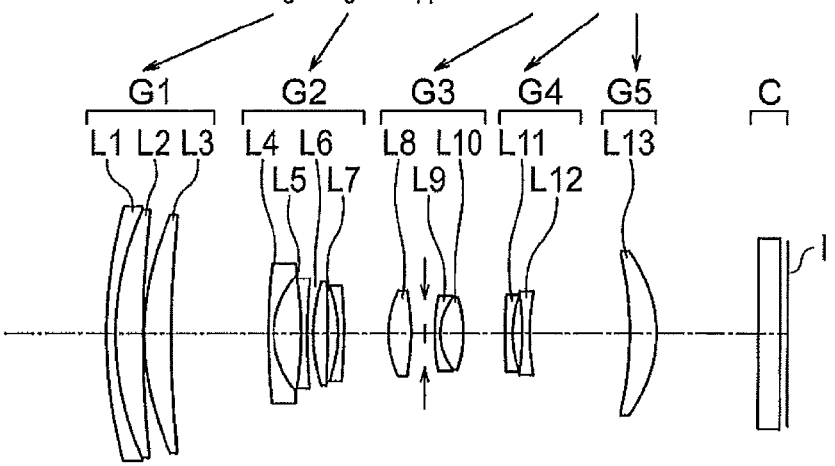
Figure 19C:
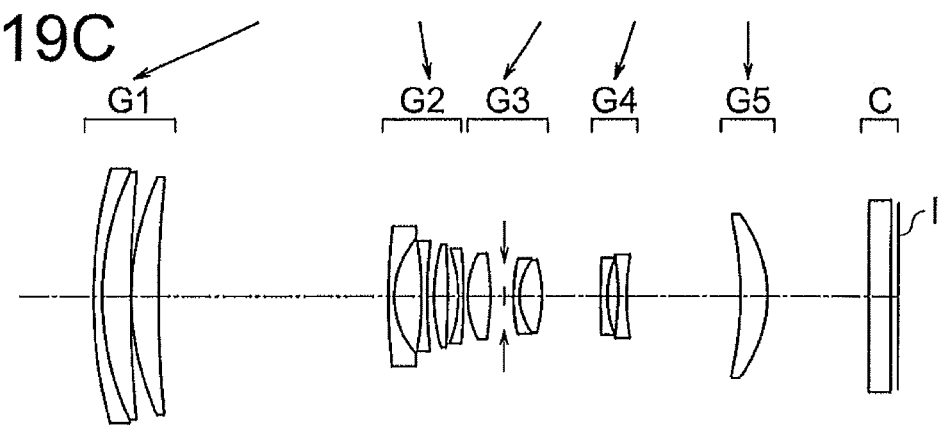

Next, a zoom lens according to an example 10 of the present invention will be described below. FIG. 19A, FIG. 19B, and FIG. 19C are cross-sectional views along an optical axis showing an optical arrangement at the time of infinite object point focusing of the zoom lens according to the example 10, and FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams at the time of infinite object point focusing of the zoom lens according to the example 10.

The zoom lens according to the example 10, as shown in FIG. 19A, FIG. 19B, and FIG. 19C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, the aperture stop S, a negative meniscus lens L9 having a convex surface directed toward the object side, and a biconvex positive lens L10. Here, the negative meniscus lens L9 and the biconvex positive lens L10 are cemented.

The fourth lens unit G4 includes a negative meniscus lens L11 having a convex surface directed toward the object side and a biconcave negative lens L12.

The fifth lens unit G5 includes a positive meniscus lens L13 having a convex surface directed toward the image side.

At the time of zooming from a wide angle end to a telephoto end, the first lens unit G1 moves toward the object side, the second lens unit G2, after moving toward the object side, moves toward the image side, the third lens unit G3 moves toward the object side, the fourth lens unit G4 moves toward the object side, and the fifth lens unit G5 is fixed (stationary).

An aspheric surface is provided to a total of five surfaces namely, both surfaces of the biconvex positive lens L8, an image-side surface of the negative meniscus lens L11, and both surfaces of the biconcave negative lens L12.

Figure 21A:
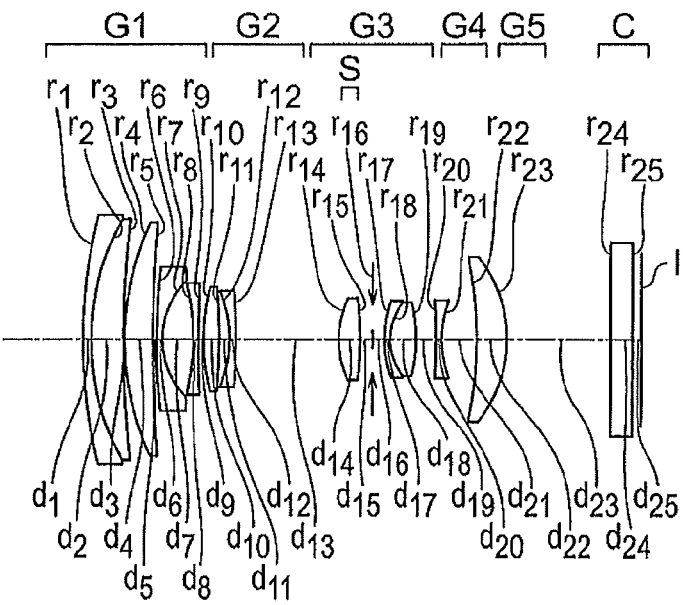
FIG. 21A, FIG. 21B, and FIG. 21C are cross-sectional views along an optical axis showing an optical arrangement at the time of infinite object point focusing of a zoom lens according to an example 11 of the present invention, where.
Figure 21B:
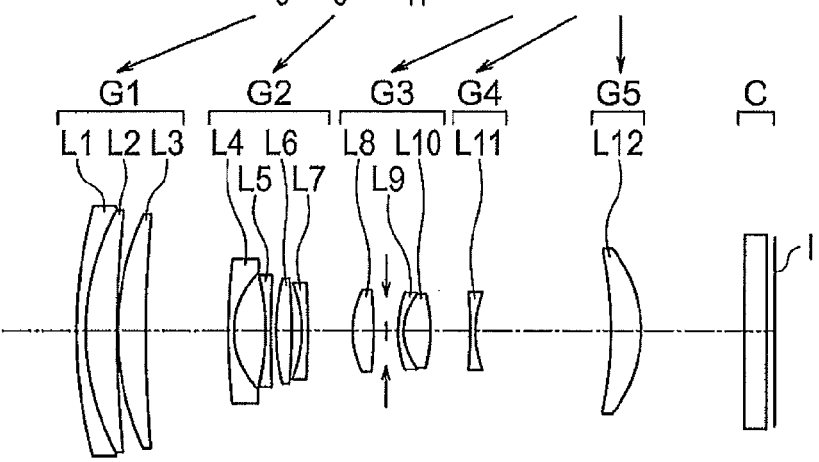
Figure 21C:
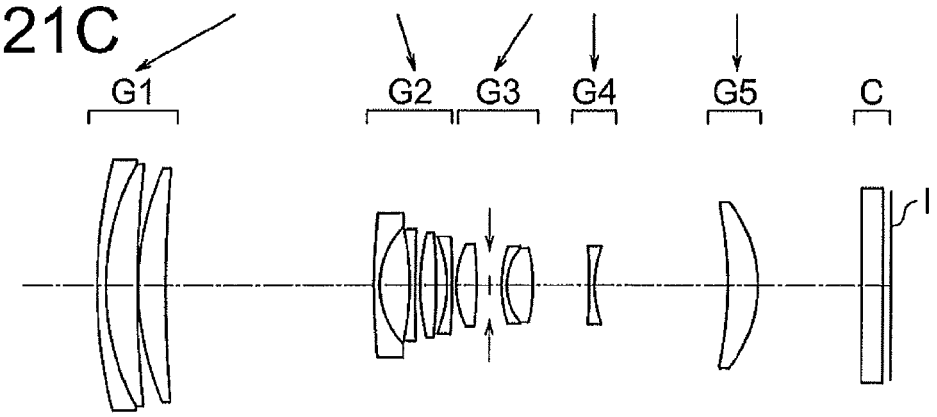

Next, a zoom lens according to an example 11 of the present invention will be described below. FIG. 21A, FIG. 21B, and FIG. 21C are cross-sectional views along an optical axis showing an optical arrangement at the time of infinite object point focusing of the zoom lens according to the example 11, and FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams at the time of infinite object point focusing of the zoom lens according to the example 11.

The zoom lens according to the example 11, as shown in FIG. 21A, FIG. 21B, and FIG. 21C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, the aperture stop S, a negative meniscus lens L9 having a convex surface directed toward the object side, and a biconvex positive lens L10. Here, the negative meniscus lens L9 and the biconvex positive lens L10 are cemented.

The fourth lens unit G4 includes a biconcave negative lens L11.

The fifth lens unit G5 includes a positive meniscus lens L12 having a convex surface directed toward the image side.

At the time of zooming from a wide angle end to a telephoto end, the first lens unit G1 moves toward the object side, the second lens unit G2, after moving toward the object side, moves toward the image side, the third lens unit G3 moves toward the object side, the fourth lens unit G4 moves toward the object side, and the fifth lens unit G5 is fixed (stationary).

An aspheric surface is provided to a total of seven surfaces namely, both surfaces of the negative meniscus lens L7, both surfaces of the biconvex positive lens L8, an image-side surface of the biconvex positive lens L10, and both surfaces of the biconcave negative lens L11.

Figure 23A:
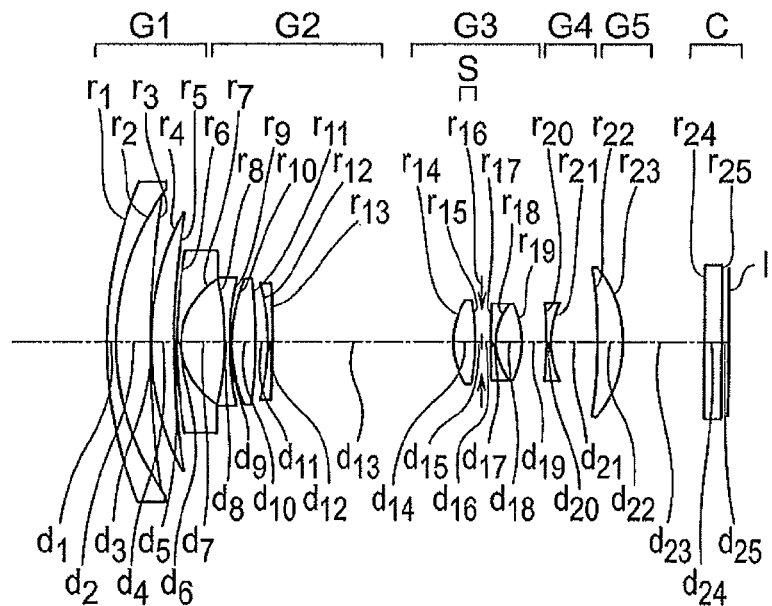
FIG. 23A, FIG. 23B, and FIG. 23C are cross-sectional views along an optical axis showing an optical arrangement at the time of infinite object point focusing of a zoom lens according to an example 12 of the present invention, where.
Figure 23B:
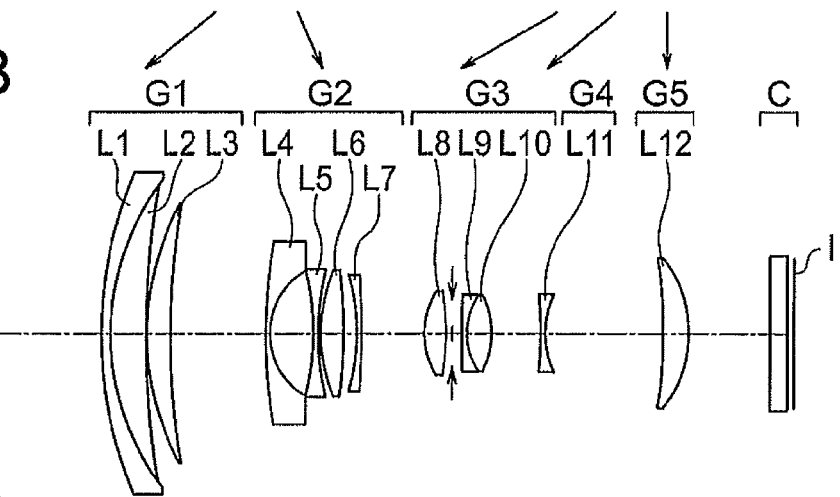
Figure 23C:
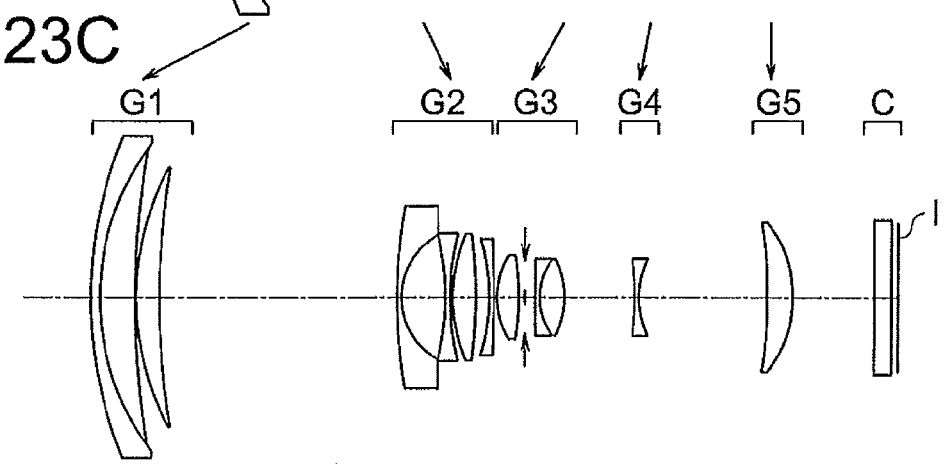

Next, a zoom lens according to an example 12 of the present invention will be described below. FIG. 23A, FIG. 23B, and FIG. 23C are cross-sectional views along an optical axis showing an optical arrangement at the time of infinite object point focusing of the zoom lens according to the example 12, and FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams at the time of infinite object point focusing of the zoom lens according to the example 12.

The zoom lens according to the example 12, as shown in FIG. 23A, FIG. 23B, and FIG. 23C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, the aperture stop S, a negative meniscus lens L9 having a convex surface directed toward the object side, and a biconvex positive lens L10. Here, the negative meniscus lens L9 and the biconvex positive lens L10 are cemented.

The fourth lens unit G4 includes a biconcave negative lens L11.

The fifth lens unit G5 includes a positive meniscus lens L12 having a convex surface directed toward the image side.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed (stationary).

An aspheric surface is provided to a total of four surfaces namely, both surfaces of the biconvex positive lens L8 and both surfaces of the positive meniscus lens L12.

Figure 25A:
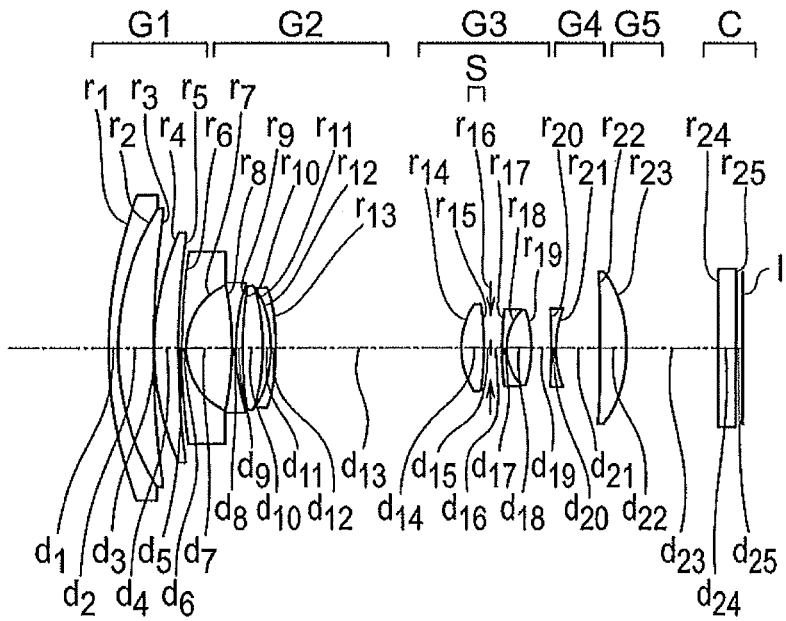
FIG. 25A, FIG. 25B, and FIG. 25C are cross-sectional views along an optical axis showing an optical arrangement at the time of infinite object point focusing of a zoom lens according to an example 13 of the present invention, where.
Figure 25B:
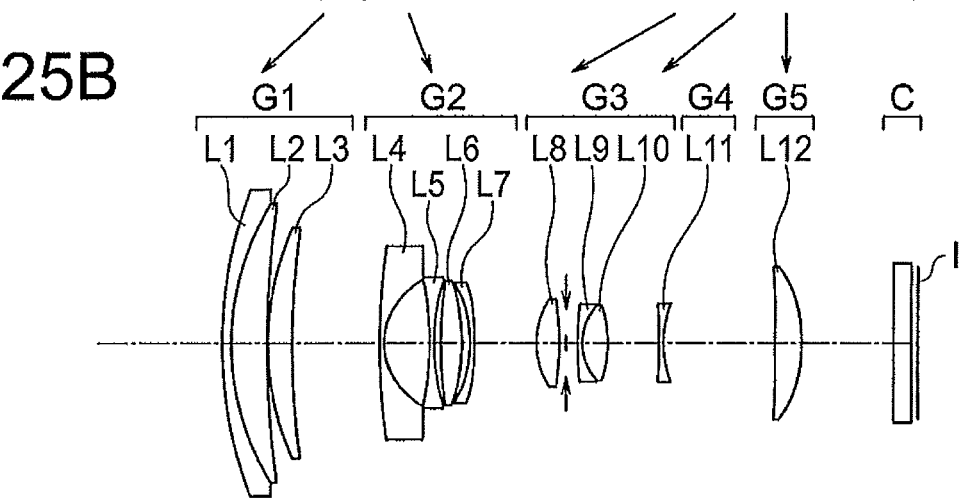
Figure 25C:
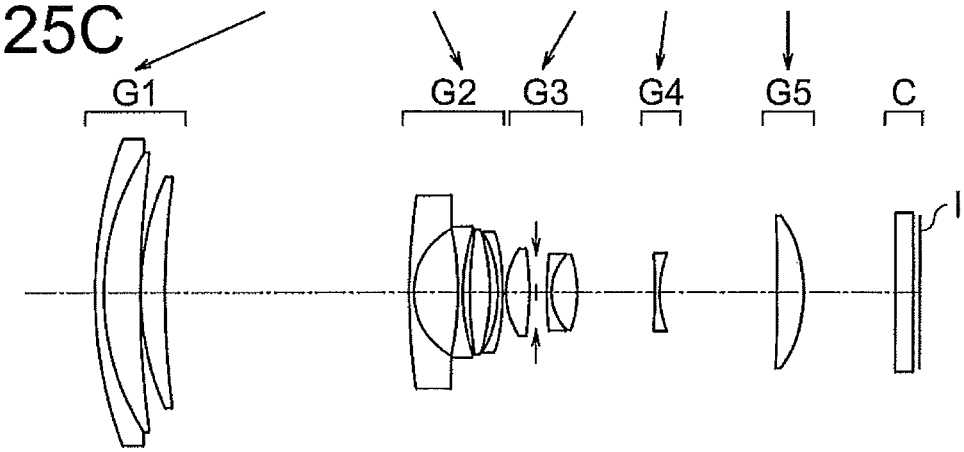

Next, a zoom lens according to an example 13 of the present invention will be described below. FIG. 25A, FIG. 25B, and FIG. 25C are cross-sectional views along an optical axis showing an optical arrangement at the time of infinite object point focusing of the zoom lens according to the example 13, and FIG. 26A, FIG. 26B, FIG. 26C, FIG. 26D, FIG. 26E, FIG. 26F, FIG. 26G, FIG. 26H, FIG. 26I, FIG. 26J, FIG. 26K, and FIG. 26L are aberration diagrams at the time of infinite object point focusing of the zoom lens according to the example 13.

The zoom lens according to the example 13, as shown in FIG. 25A, FIG. 25B, and FIG. 25C, includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. Moreover, an aperture stop S is disposed in the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, the aperture stop S, a negative meniscus lens L9 having a convex surface directed toward the object side, and a biconvex positive lens L10. Here, the negative meniscus lens L9 and the biconvex positive lens L10 are cemented.

The fourth lens unit G4 includes a biconcave negative lens L11.

The fifth lens unit G5 includes a biconvex positive lens L12.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed (stationary).

An aspheric surface is provided to a total of eight surfaces namely, an object-side surface of the biconcave negative lens L5, an image-side surface of the biconvex positive lens L6, both surfaces of the negative meniscus lens L7, both surfaces of the biconvex positive lens L8, and both surfaces of the biconvex positive lens L12.

Next, numerical data of optical components comprising the zoom lens of each above example are shown. In numerical data of each example, r1, r2, . . . stands for a curvature radius of each lens surface, d1, d2, . . . stands for a thickness of each lens or an air distance between adjacent lens surfaces, nd1, nd2, . . . stands for a refractive index of each lens for d-line, v1, vd2, . . . stands for an Abbe number of each lens, * stands for an aspheric surface. Further, in the zoom data, intermediate denotes a intermediate focal length state, a focal length denotes a focal length of the entire system of the zoom lens, FNO. denotes an F number, ω denotes a half angle of view, image height denotes a maximum image height, fb denotes a back focus, and each of f1, f2. . . is a focal length of each lens unit. Note that the entire length is a length which is obtained by adding a back focus to a distance from a lens forefront surface up to a lens backmost surface. Further, back focus is a unit which is expressed upon air conversion of a distance from the lens backmost surface to a paraxial image surface.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e–n' (where, n is an integral number) indicates '$10^{-n}$'. Moreover, these symbols are commonly used in the following numerical data for each example.

EXAMPLE 1

| Unit mm | | | | |
|---|---|---|---|---|
| Surface data | | | | |
| Surface no. | r | d | nd | vd |
| Object plane | ∞ | ∞ | | |
| 1 | 70.000 | 1.20 | 1.80518 | 25.42 |
| 2 | 41.946 | 5.69 | 1.49700 | 81.61 |
| 3 | 394.498 | 0.29 | | |
| 4 | 36.955 | 4.08 | 1.72916 | 54.68 |
| 5 | 96.144 | (Variable) | | |
| 6 | 158.252 | 1.00 | 1.91082 | 35.25 |
| 7 | 10.322 | 5.49 | | |
| 8* | −36.151 | 1.00 | 1.88202 | 37.22 |
| 9* | 111.381 | 0.61 | | |
| 10 | 39.405 | 3.31 | 1.94595 | 17.98 |

-continued

Unit mm

| | | | | |
|---|---|---|---|---|
| 11 | −31.318 | 0.95 | | |
| 12 | −22.000 | 1.00 | 2.00100 | 29.14 |
| 13 | −59.444 | (Variable) | | |
| 14* | 13.134 | 2.93 | 1.58313 | 59.38 |
| 15* | −42.869 | 2.00 | | |
| 16(Stop) | ∞ | 2.00 | | |
| 17 | 24.943 | 1.00 | 1.90366 | 31.32 |
| 18 | 8.272 | 3.33 | 1.49700 | 81.61 |
| 19 | −24.256 | (Variable) | | |
| 20 | −42.337 | 1.00 | 1.58313 | 59.38 |
| 21* | 17.379 | (Variable) | | |
| 22 | −156.382 | 3.75 | 1.61881 | 63.85 |
| 23 | −21.762 | 13.76 | | |
| 24 | ∞ | 2.66 | 1.51633 | 64.14 |
| 25 | ∞ | 1.00 | | |
| Image plane(image pickup surface) ∞ | | | | |

Aspherical surface data

8th surface k = 0.000
A4 = −7.12036e−07,   A6 = −1.71159e−07,   A8 = −1.97238e−09

9th surface k = 0.000
A4 = −2.79307e−05,   A6 = −2.70047e−07,   A8 = −1.73748e−09

14th surface k = −1.266
A4 = 2.64892e−05,   A6 = 3.12929e−08

15th surface k = 0.000
A4 = 4.69689e−05,   A6 = −1.28520e−07

21th surface k = −1.371
A4 = 5.13610e−05,   A6 = −5.40004e−07,   A8 = 5.51568e−10

Zoom data

| Zoom ratio | 8.00 | | |
|---|---|---|---|
| | wide | intermediate | tele |
| Focal length | 12.62 | 35.64 | 100.96 |
| Fno. | 4.00 | 5.87 | 6.89 |
| Angle of view 2ω | 91.50 | 34.20 | 12.33 |
| Image height | 11.15 | 11.15 | 11.15 |
| fb(in air) | 16.50 | 16.48 | 16.49 |
| Lens total length (in air) | 91.49 | 104.22 | 119.07 |
| d5 | 0.88 | 15.02 | 33.00 |
| d13 | 23.99 | 9.08 | 0.50 |
| d19 | 3.27 | 8.20 | 12.07 |
| d21 | 6.21 | 14.80 | 16.37 |

Unit focal length f1 = 65.67   f2 = −11.28   f3 = 16.38   f4 = −21.00   f5 = 40.42

EXAMPLE 2

Unit mm

Surface data

| Surface no. | r | d | nd | vd |
|---|---|---|---|---|
| Object plane | ∞ | ∞ | | |
| 1 | 70.000 | 2.10 | 1.80518 | 25.42 |
| 2 | 41.091 | 0.20 | | |
| 3 | 40.884 | 5.71 | 1.49700 | 81.61 |
| 4 | 376.252 | 0.15 | | |

-continued

Unit mm

| | | | | |
|---|---|---|---|---|
| 5 | 39.039 | 3.69 | 1.72916 | 54.68 |
| 6 | 121.180 | (Variable) | | |
| 7 | 106.652 | 0.90 | 1.91082 | 35.25 |
| 8 | 10.827 | 6.25 | | |
| 9* | −25.875 | 1.00 | 1.88202 | 37.22 |
| 10* | −702.716 | 0.59 | | |
| 11 | 94.327 | 2.91 | 1.94595 | 17.98 |
| 12 | −30.243 | 1.46 | | |
| 13 | −16.564 | 0.90 | 1.88300 | 40.76 |
| 14 | −26.625 | (Variable) | | |
| 15* | 12.852 | 2.85 | 1.58313 | 59.38 |
| 16* | −35.669 | 2.00 | | |
| 17(Stop) | ∞ | 2.00 | | |
| 18 | 34.009 | 0.90 | 1.90366 | 31.32 |
| 19 | 8.665 | 3.35 | 1.48749 | 70.23 |
| 20 | −18.743 | (Variable) | | |
| 21 | −60.367 | 0.90 | 1.69680 | 55.53 |
| 22 | 15.107 | 2.27 | | |
| 23* | 68.537 | 1.44 | 1.52542 | 55.78 |
| 24 | 83.721 | (Variable) | | |
| 25 | 161.561 | 4.82 | 1.49700 | 81.61 |
| 26 | −22.366 | 12.84 | | |
| 27 | ∞ | 2.66 | 1.51633 | 64.14 |
| 28 | ∞ | 1.00 | | |
| Image plane(image pickup surface) ∞ | | | | |

Aspherical surface data

9th surface k = −0.430
A4 = −1.55333e−05,   A6 = −1.62525e−07,   A8 = −6.81520e−10

10th surface k = 0.000
A4 = −4.21583e−05,   A6 = −1.96327e−07,   A8 = −4.65483e−10

15th surface k = −1.196
A4 = 2.52448e−05,   A6 = 1.41837e−07,   A8 = −7.39130e−10

16th surface k = 0.000
A4 = 7.11443e−05,   A6 = −1.39829e−07,   A8 = −4.58246e−10

23th surface k = 0.000
A4 = 2.16824e−06,   A6 = 3.54736e−07,   A8 = 2.34083e−09

Zoom data

| Zoom ratio | 8.00 | | |
|---|---|---|---|
| | wide | intermediate | tele |
| Focal length | 12.61 | 35.69 | 100.94 |
| Fno. | 3.90 | 5.76 | 6.60 |
| Angle of view 2ω | 90.55 | 34.02 | 12.21 |
| Image height | 11.15 | 11.15 | 11.15 |
| fb(in air) | 15.58 | 15.57 | 15.57 |
| Lens total length (in air) | 95.58 | 106.27 | 119.07 |
| d6 | 0.50 | 13.42 | 31.89 |
| d14 | 26.61 | 9.97 | 0.50 |
| d20 | 3.51 | 7.75 | 11.34 |
| d24 | 2.99 | 13.17 | 13.38 |

Unit focal length f1 = 64.63   f2 = −11.53   f3 = 16.26   f4 = −17.65   f5 = 39.88

EXAMPLE 3

Unit mm

Surface data

| Surface no. | r | d | nd | vd |
|---|---|---|---|---|
| Object plane | ∞ | ∞ | | |
| 1 | 100.000 | 1.20 | 2.00069 | 25.46 |
| 2 | 50.930 | 3.15 | 1.49700 | 81.61 |
| 3 | 78.946 | 0.29 | | |
| 4 | 61.534 | 3.81 | 1.72916 | 54.68 |
| 5 | 383.781 | 0.30 | | |
| 6 | 45.278 | 3.70 | 1.65160 | 58.55 |
| 7 | 143.253 | (Variable) | | |
| 8* | 588.995 | 1.00 | 1.88202 | 37.22 |
| 9* | 10.902 | 5.02 | | |
| 10 | −30.000 | 1.00 | 1.88300 | 40.76 |
| 11 | −174.262 | 0.30 | | |
| 12 | 68.293 | 2.86 | 1.94595 | 17.98 |
| 13 | −33.400 | 0.68 | | |
| 14 | −23.000 | 1.00 | 1.88202 | 37.22 |
| 15* | −63.425 | (Variable) | | |
| 16* | 12.933 | 3.18 | 1.58313 | 59.38 |
| 17* | −65.666 | 1.00 | | |
| 18(Stop) | ∞ | 2.00 | | |
| 19 | 19.661 | 1.00 | 1.90366 | 31.32 |
| 20 | 8.278 | 3.83 | 1.48749 | 70.23 |
| 21 | −30.597 | (Variable) | | |
| 22* | 431.714 | 1.00 | 1.52542 | 55.78 |
| 23* | 12.418 | Variable | | |
| 24 | −56.046 | 3.56 | 1.49700 | 81.61 |
| 25 | −19.695 | 0.30 | | |
| 26 | −82.936 | 1.00 | 1.90366 | 31.32 |
| 27 | 989.114 | 3.04 | 1.49700 | 81.61 |
| 28 | −40.000 | 12.34 | | |
| 29 | ∞ | 2.66 | 1.51633 | 64.14 |
| 30 | ∞ | 1.00 | | |
| Image plane(image pickup surface) | ∞ | | | |

Aspherical surface data

8th surface k = 0.000
A4 = 1.74904e−05, A6 = −9.35426e−08, A8 = 1.48532e−10

9th surface k = 0.080
A4 = 5.18402e−07, A6 = −2.49219e−08, A8 = −9.25312e−10

15th surface k = 0.000
A4 = −1.60054e−05, A6 = −4.62673e−08, A8 = −5.56590e−10

16th surface k = −1.035
A4 = 2.54138e−05, A6 = 1.62408e−07, A8 = 1.26002e−10

17th surface k = 0.000
A4 = 4.37606e−05

22th surface k = 0.000
A4 = −1.31531e−04

23th surface k = 0.000
A4 = −9.70573e−05, A6 = −6.06344e−07

Zoom data

| Zoom ratio | | 9.65 | |
|---|---|---|---|
| | wide | intermediate | tele |
| Focal length | 12.62 | 39.20 | 121.77 |
| Fno. | 4.01 | 5.27 | 6.36 |
| Angle of view 2ω | 91.38 | 31.14 | 10.24 |
| Image height | 11.15 | 11.15 | 11.15 |
| fb(in air) | 15.00 | 15.17 | 15.06 |
| Lens total length (in air) | 94.51 | 114.67 | 132.06 |
| d7 | 0.88 | 19.10 | 36.95 |
| d15 | 25.48 | 10.68 | 0.30 |
| d21 | 2.83 | 6.29 | 13.52 |
| d23 | 6.09 | 19.19 | 22.00 |

Unit focal length f1 = 73.02    f2 = −11.63    f3 = 16.31    f4 = −24.35    f5 = 55.99

EXAMPLE 4

Unit mm

Surface data

| Surface no. | r | d | nd | vd |
|---|---|---|---|---|
| Object plane | ∞ | ∞ | | |
| 1 | 100.000 | 1.20 | 2.00069 | 25.46 |
| 2 | 51.208 | 3.47 | 1.49700 | 81.61 |
| 3 | 93.167 | 0.29 | | |
| 4 | 58.951 | 3.74 | 1.72916 | 54.68 |
| 5 | 299.583 | 0.30 | | |
| 6 | 42.295 | 3.41 | 1.65160 | 58.55 |
| 7 | 116.703 | (Variable) | | |
| 8* | 1191.958 | 1.00 | 1.88202 | 37.22 |
| 9* | 10.778 | 4.99 | | |
| 10 | −30.000 | 1.00 | 1.88300 | 40.76 |
| 11 | −389.403 | 0.30 | | |
| 12 | 75.913 | 3.29 | 1.94595 | 17.98 |
| 13 | −33.721 | 0.69 | | |
| 14 | −23.000 | 1.00 | 1.88202 | 37.22 |
| 15* | −46.754 | (Variable) | | |
| 16* | 12.817 | 3.16 | 1.58313 | 59.38 |
| 17* | −67.624 | 1.00 | | |
| 18(Stop) | ∞ | 2.00 | | |
| 19 | 19.745 | 1.00 | 1.90366 | 31.32 |
| 20 | 8.219 | 3.65 | 1.48749 | 70.23 |
| 21 | −28.313 | (Variable) | | |
| 22* | 3160.225 | 1.00 | 1.52542 | 55.78 |
| 23* | 12.400 | (Variable) | | |
| 24 | −68.064 | 3.71 | 1.49700 | 81.61 |
| 25 | −19.501 | 0.30 | | |
| 26 | −63.326 | 1.00 | 1.90366 | 31.32 |
| 27 | −250.270 | 2.73 | 1.49700 | 81.61 |
| 28 | −40.000 | 12.34 | | |
| 29 | ∞ | 2.66 | 1.51633 | 64.14 |
| 30 | ∞ | 1.00 | | |
| Image plane(image pickup surface) | ∞ | | | |

Aspherical surface data

8th surface k = 0.000
A4 = 2.48501e−05, A6 = −1.48446e−07, A8 = 2.77348e−10

9th surface k = 0.039
A4 = 1.23777e−05, A6 = 3.51940e−08, A8 = −5.62210e−10

15th surface k = 0.000
A4 = −1.61200e−05, A6 = −5.64022e−08, A8 = −5.89993e−10

16th surface k = −1.018
A4 = 2.66707e−05, A6 = 1.75697e−07, A8 = 2.04443e−0

-continued

Unit mm

17th surface k = 0.000
A4 = 4.71687e−05
22th surface k = 0.000
A4 = −1.33323e−04
23th surface k = 0.000
A4 = −9.95392e−05,    A6 = −6.58570e−07

Zoom data

| Zoom ratio | | 8.00 | |
|---|---|---|---|
| | wide | intermediate | tele |
| Focal length | 12.62 | 35.69 | 100.93 |
| Fno. | 4.04 | 5.22 | 6.38 |
| Angle of view 2ω | 91.40 | 34.09 | 12.34 |
| Image height | 11.15 | 11.15 | 11.15 |
| fb(in air) | 15.0.1 | 15.14 | 15.07 |
| Lens total length (in air) | 109.60 | 124.07 | |
| d7 | 0.88 | 16.27 | 31.74 |
| d15 | 25.20 | 10.67 | 0.50 |
| d21 | 2.63 | 5.77 | 11.91 |
| d23 | 6.27 | 17.51 | 20.60 |

Unit focal length f1 = 68.09   f2 = −11.70   f3 = 16.51   f4 = −23.70   f5 = 54.77

EXAMPLE 5

Unit mm

Surface data

| Surface no. | r | d | nd | νd |
|---|---|---|---|---|
| Object plane | ∞ | ∞ | | |
| 1 | 81.355 | 2.10 | 1.80518 | 25.42 |
| 2 | 44.575 | 0.20 | | |
| 3 | 45.076 | 5.31 | 1.49700 | 81.61 |
| 4 | 698.216 | 0.15 | | |
| 5 | 40.534 | 3.90 | 1.72916 | 54.68 |
| 6 | 145.355 | (Variable) | | |
| 7 | 193.795 | 0.90 | 1.88300 | 40.80 |
| 8 | 11.397 | 5.66 | | |
| 9 | −34.539 | 0.90 | 1.88300 | 40.80 |
| 10 | 111.611 | 0.82 | | |
| 11 | 26.561 | 2.93 | 1.94595 | 17.98 |
| 12 | −218.721 | 0.56 | | |
| 13 | −150.173 | 0.90 | 2.00100 | 29.14 |
| 14 | 93.211 | (Variable) | | |
| 15* | 13.485 | 2.86 | 1.58313 | 59.38 |
| 16* | −47.246 | 2.00 | | |
| 17(Stop) | ∞ | 2.00 | | |
| 18 | 18.144 | 0.90 | 1.90366 | 31.32 |
| 19 | 8.091 | 3.37 | 1.49700 | 81.61 |
| 20 | −22.660 | (Variable) | | |
| 21 | 32.071 | 0.90 | 1.59522 | 67.74 |
| 22 | 9.810 | 2.39 | | |
| 23* | −17.577 | 1.00 | 1.52542 | 55.78 |
| 24 | −52.918 | (Variable) | | |
| 25 | −386.955 | 5.24 | 1.49700 | 81.61 |
| 26 | −19.170 | 12.84 | | |
| 27 | ∞ | 2.66 | 1.51633 | 64.14 |
| 28 | ∞ | 1.00 | | |
| Image plane(image pickup surface) | ∞ | | | |

-continued

Unit mm

Aspherical surface data

15th surface k = −1.285
A4 = 2.45565e−05,   A6 = 1.02426e−07,   A8 = −5.38572e−10
16th surface k = 0.000
A4 = 5.69837e−05,   A6 = −7.80434e−08,   A8 = −4.44652e−10
23th surface k = 0.000
A4 = −3.10105e−05,   A6 = 1.69209e−07,   A8 = 2.39462e−08

Zoom data

| Zoom ratio | | 8.00 | |
|---|---|---|---|
| | wide | intermediate | tele |
| Focal length | 12.62 | 36.35 | 100.96 |
| Fno. | 4.13 | 6.02 | 7.27 |
| Angle of view 2ω | 91.29 | 33.51 | 12.43 |
| Image height | 11.15 | 11.15 | 11.15 |
| fb(in air) | 15.43 | 15.53 | 15.29 |
| Lens total length (in air) | 92.15 | 103.68 | 117.88 |
| d6 | 0.50 | 14.85 | 31.75 |
| d14 | 25.37 | 9.45 | 0.50 |
| d20 | 1.53 | 4.93 | 8.05 |
| d24 | 4.32 | 13.91 | 17.29 |

Unit focal length f1 = 65.84   f2 = −11.45   f3 = 14.68   f4 = −15.94   f5 = 40.39

EXAMPLE 6

Unit mm

Surface data

| Surface no. | r | d | nd | νd |
|---|---|---|---|---|
| Object plane | ∞ | ∞ | | |
| 1 | 70.000 | 2.10 | 1.80518 | 25.42 |
| 2 | 45.071 | 0.20 | | |
| 3 | 45.614 | 5.10 | 1.49700 | 81.61 |
| 4 | 271.987 | 0.15 | | |
| 5 | 43.289 | 3.91 | 1.64000 | 60.08 |
| 6 | 159.860 | (Variable) | | |
| 7 | 98.029 | 0.90 | 1.91082 | 35.25 |
| 8 | 11.330 | 6.12 | | |
| 9* | −27.731 | 1.00 | 1.85135 | 40.10 |
| 10* | −151.182 | 0.50 | | |
| 11 | 80.927 | 2.64 | 1.94595 | 17.98 |
| 12 | −40.912 | 1.47 | | |
| 13 | −18.168 | 0.90 | 1.81600 | 46.62 |
| 14 | −33.480 | (Variable) | | |
| 15(Stop) | ∞ | 1.00 | | |
| 16* | 13.060 | 3.20 | 1.58313 | 59.38 |
| 17* | −36.965 | 3.80 | | |
| 18 | 39.969 | 0.90 | 1.90366 | 31.32 |
| 19 | 8.912 | 3.80 | 1.51823 | 58.90 |
| 20 | −20.173 | (Variable) | | |
| 21 | −157.178 | 1.00 | 1.69680 | 55.53 |
| 22 | 19.408 | 1.50 | | |
| 23* | 91.034 | 1.12 | 1.52542 | 55.78 |
| 24 | 26.894 | (Variable) | | |
| 25 | 179.631 | 4.74 | 1.49700 | 81.61 |
| 26 | −22.953 | 12.84 | | |

-continued

Unit mm

| | | | | |
|---|---|---|---|---|
| 27 | ∞ | 2.66 | 1.51633 | 64.14 |
| 28 | ∞ | 1.00 | | |
| Image plane(image pickup surface) | ∞ | | | |

Aspherical surface data

9th surface k = 0.153
A4 = −2.10594e−05, A6 = −2.68527e−07, A8 = 3.31699e−10

10th surface k = 0.000
A4 = −4.55193e−05, A6 = −2.80310e−07, A8 = 7.62992e−10

16th surface k = −1.195
A4 = 2.63742e−05, A6 = 2.92325e−07, A8 = 5.80409e−10

17th surface k = 0.000
A4 = 6.91830e−05, A6 = 7.25599e−08, A8 = 3.68520e−10

23th surface k = 0.000
A4 = −2.50218e−05, A6 = 1.97337e−07, A8 = 2.71250e−09

Zoom data

| Zoom ratio | 8.00 | | |
|---|---|---|---|
| | wide | intermediate | tele |
| Focal length | 12.62 | 35.14 | 100.95 |
| Fno. | 3.93 | 5.89 | 6.52 |
| Angle of view 2ω | 91.54 | 34.54 | 12.18 |
| Image height | 11.15 | 11.15 | 11.15 |
| fb(in air) | 15.66 | 15.59 | 15.60 |
| Lens total length (in air) | 95.16 | 106.69 | 127.10 |
| d6 | 0.50 | 12.28 | 37.07 |
| d14 | 26.45 | 9.59 | 1.50 |
| d20 | 3.50 | 8.17 | 11.07 |
| d24 | 3.00 | 15.01 | 15.80 |

Unit focal length f1 = 74.06    f2 = −11.93    f3 = 16.64    f4 = −18.00    f5 = 41.27

EXAMPLE 7

Unit mm

Surface data

| Surface no. | r | d | nd | vd |
|---|---|---|---|---|
| Object plane | ∞ | ∞ | | |
| 1 | 75.000 | 1.20 | 1.80518 | 25.42 |
| 2 | 41.201 | 5.66 | 1.55332 | 71.68 |
| 3 | 277.713 | 0.29 | | |
| 4 | 38.037 | 4.07 | 1.74264 | 50.00 |
| 5 | 103.863 | (Variable) | | |
| 6 | 250.308 | 1.00 | 1.91082 | 35.25 |
| 7 | 10.862 | 5.78 | | |
| 8* | −52.001 | 1.00 | 1.88202 | 37.22 |
| 9* | 137.953 | 0.56 | | |
| 10 | 39.159 | 3.39 | 1.94595 | 17.98 |
| 11 | −37.205 | 1.00 | | |
| 12 | −26.598 | 1.00 | 1.95060 | 32.85 |
| 13 | −169.156 | (Variable) | | |
| 14* | 14.895 | 2.83 | 1.58313 | 59.38 |
| 15* | −31.596 | 2.00 | | |
| 16(Stop) | ∞ | 2.00 | | |
| 17 | 16.127 | 2.36 | 1.54244 | 59.25 |
| 18 | −45.326 | 1.00 | 1.90366 | 31.32 |

-continued

Unit mm

| | | | | |
|---|---|---|---|---|
| 19 | 11.394 | 0.74 | | |
| 20* | 16.691 | 2.71 | 1.49700 | 81.61 |
| 21* | −18.315 | (Variable) | | |
| 22 | −48.404 | 1.00 | 1.58313 | 59.38 |
| 23* | 15.326 | (Variable) | | |
| 24 | −90.768 | 4.30 | 1.54946 | 47.66 |
| 25 | −17.710 | 13.41 | | |
| 26 | ∞ | 2.66 | 1.51633 | 64.14 |
| 27 | ∞ | 1.00 | | |
| Image plane(image pickup surface) | ∞ | | | |

Aspherical surface data

8th surface k = 0.000
A4 = −3.51589e−05, A6 = 4.40664e−07, A8 = −4.97029e−09

9th surface k = 0.000
A4 = 5.94813e−05, A6 = 3.43562e−07, A8 = −5.36428e−09

14th surface k = −1.346
A4 = 1.41523e−05, A6 = 8.88868e−08

15th surface k = 0.000
A4 = 3.87382e−05

20th surface k = 0.000
A4 = −9.93538e−06, A6 = 2.73987e−07, A8 = −1.76471e−08

21st surface k = 0.000
A4 = 2.05111e−07, A6 = 3.94701e−07, A8 = −2.18233e−08

23th surface k = 0.000
A4 = 3.14862e−05, A6 = −6.13567e−07

Zoom data
Zoom ratio 8.00

| | wide | intermediate | tele |
|---|---|---|---|
| Focal length | 12.62 | 35.69 | 100.96 |
| Fno. | 3.74 | 5.33 | 6.37 |
| Angle of view 2ω | 90.95 | 34.01 | 12.34 |
| Image height | 11.15 | 11.15 | 11.15 |
| fb(in air) | 16.16 | 16.12 | 16.16 |
| Lens total length(in air) | 95.21 | 105.63 | 119.09 |
| d5 | 0.88 | 15.60 | 32.56 |
| d13 | 26.84 | 10.43 | 0.80 |
| d21 | 2.00 | 6.78 | 10.90 |
| d23 | 5.44 | 12.81 | 14.78 |

Unit focal length f1 = 66.00 f2 = −11.75 f3 = 16.80 f4 = −19.85 f5 = 39.23

Example 8

Unit mm

Surface data

| Surface no. | r | d | nd | vd |
|---|---|---|---|---|
| Object plane | ∞ | ∞ | | |
| 1 | 70.000 | 2.10 | 1.80518 | 25.42 |
| 2 | 44.180 | 0.20 | | |
| 3 | 45.003 | 4.21 | 1.49700 | 81.61 |

-continued

Unit mm

| | | | | |
|---|---|---|---|---|
| 4 | 263.429 | 0.15 | | |
| 5 | 41.819 | 3.84 | 1.61881 | 63.85 |
| 6 | 193.548 | (Variable) | | |
| 7 | 92.165 | 0.90 | 1.91082 | 35.25 |
| 8 | 13.438 | 5.06 | | |
| 9* | −30.582 | 1.00 | 1.85135 | 40.10 |
| 10* | 193.611 | 0.64 | | |
| 11 | 39.445 | 2.78 | 1.94595 | 17.98 |
| 12 | −62.827 | 1.39 | | |
| 13 | −22.308 | 0.90 | 1.88300 | 40.76 |
| 14 | −50.340 | (Variable) | | |
| 15(Stop) | ∞ | 1.00 | | |
| 16* | 12.757 | 3.69 | 1.58313 | 59.38 |
| 17* | −54.689 | 2.63 | | |
| 18 | 29.232 | 0.90 | 1.90366 | 31.32 |
| 19 | 8.814 | 4.31 | 1.51823 | 58.90 |
| 20 | −19.860 | (Variable) | | |
| 21 | 52.043 | 1.00 | 1.69680 | 55.53 |
| 22 | 14.546 | 2.00 | | |
| 23* | −36.050 | 1.00 | 1.52542 | 55.78 |
| 24 | 35.150 | (Variable) | | |
| 25 | 192.208 | 4.65 | 1.49700 | 81.61 |
| 26 | −22.536 | 12.84 | | |
| 27 | ∞ | 2.66 | 1.51633 | 64.14 |
| 28 | ∞ | 1.00 | | |
| Image plane(image pickup surface) | ∞ | | | |

Aspherical surface data

9th surface k = −0.754
A4 = −1.41359e−05, A6 = −8.94723e−08, A8 = 1.52539e−09

10th surface k = 0.000
A4 = −1.24592e−05, A6 = −6.29341e−08, A8 = 1.66805e−09

16th surface k = −1.072
A4 = 3.33779e−05, A6 = 3.26090e−07, A8 = 7.26265e−11

17th surface k = 0.000
A4 = 8.03146e−05, A6 = 1.081676−07, A8 = −8.234206−10,
A10 = −3.11297e−12

23th surface k = 0.000
A4 = −4.36405e−05, A6 = 7.30537e−08, A8 = 5.12113e−09

Zoom data
Zoom ratio 6.86

| | wide | intermediate | tele |
|---|---|---|---|
| Focal length | 14.72 | 38.56 | 100.99 |
| Fno. | 3.72 | 5.22 | 5.75 |
| Angle of view 2ω | 82.75 | 31.67 | 12.13 |
| Image height | 11.15 | 11.15 | 11.15 |
| fb(in air) | 15.59 | 15.59 | 15.55 |
| Lens total length(in air) | 95.59 | 104.65 | 119.05 |
| d6 | 0.50 | 12.55 | 33.02 |
| d14 | 27.54 | 10.82 | 1.50 |
| d20 | 3.50 | 7.06 | 9.67 |
| d24 | 4.10 | 14.29 | 14.96 |

Unit focal length f1 = 71.27  f2 = −13.06  f3 = 16.04  f4 = −15.17  f5 = 40.88

EXAMPLE 9

Unit mm

Surface data

| Surface no. | r | d | nd | vd |
|---|---|---|---|---|
| Object plane | ∞ | ∞ | | |
| 1 | 60.000 | 1.10 | 2.00069 | 25.46 |
| 2 | 32.697 | 0.20 | | |
| 3 | 32.754 | 3.97 | 1.74100 | 52.64 |
| 4 | 144.902 | 0.15 | | |
| 5 | 38.443 | 3.27 | 1.72916 | 54.68 |
| 6 | 176.544 | (Variable) | | |
| 7 | 82.861 | 0.70 | 1.83481 | 42.71 |
| 8 | 10.825 | 3.66 | | |
| 9 | −30.677 | 0.70 | 1.77250 | 49.60 |
| 10 | 60.221 | 0.83 | | |
| 11 | 24.497 | 1.62 | 1.94595 | 17.98 |
| 12 | −213.236 | 1.39 | | |
| 13 | −16.012 | 0.70 | 1.81600 | 46.62 |
| 14 | −67.513 | (Variable) | | |
| 15* | 11.004 | 2.93 | 1.59201 | 67.02 |
| 16* | −23.395 | 1.80 | | |
| 17(Stop) | ∞ | 1.20 | | |
| 18 | 31.846 | 0.65 | 1.90366 | 31.32 |
| 19 | 7.861 | 3.09 | 1.51823 | 58.90 |
| 20 | −15.403 | (Variable) | | |
| 21* | −79.786 | 0.90 | 1.52542 | 55.78 |
| 22* | 11.017 | (Variable) | | |
| 23 | −45.414 | 3.88 | 1.51742 | 52.43 |
| 24 | −15.876 | 12.64 | | |
| 25 | ∞ | 2.66 | 1.51633 | 64.14 |
| 26 | ∞ | 1.00 | | |
| Image plane(image pickup surface) | ∞ | | | |

Aspherical surface data

15th surface k = −1.360
A4 = 3.34664e−05, A6 = 6.49603e−07

16th surface k = 0.000
A4 = 1.48580e−04

21th surface k = 0.000
A4 = −2.75069e−04

22th surface k = 0.000
A4 = −2.85405e−04

Zoom data
Zoom ratio 6.86

| | wide | intermediate | tele |
|---|---|---|---|
| Focal length | 14.28 | 37.40 | 97.91 |
| Fno. | 4.10 | 5.78 | 6.49 |
| Angle of view 2ω | 83.51 | 32.32 | 12.58 |
| Image height | 11.15 | 11.15 | 11.15 |
| fb(in air) | 15.45 | 15.39 | 15.34 |
| Lens total length(in air) | 67.94 | 86.11 | 99.04 |
| d6 | 0.50 | 12.71 | 26.29 |
| d14 | 12.80 | 5.96 | 0.50 |
| d20 | 2.79 | 5.33 | 7.97 |
| d22 | 3.69 | 14.00 | 16.22 |

Unit focal length f1 = 54.17  f2 = −8.87  f3 = 12.28  f4 = −18.36  f5 = 45.15

EXAMPLE 10

Unit mm

Surface data

| Surface no. | r | d | nd | vd |
|---|---|---|---|---|
| Object plane | ∞ | ∞ | | |
| 1 | 60.000 | 1.10 | 2.00069 | 25.46 |
| 2 | 36.809 | 3.45 | 1.72916 | 54.68 |
| 3 | 144.561 | 0.15 | | |
| 4 | 35.266 | 3.40 | 1.59522 | 67.74 |
| 5 | 141.357 | (Variable) | | |
| 6 | 78.673 | 0.70 | 1.88300 | 40.80 |
| 7 | 10.727 | 3.41 | | |
| 8 | −41.048 | 0.70 | 1.88300 | 40.80 |
| 9 | 60.729 | 0.82 | | |
| 10 | 22.369 | 1.76 | 1.94595 | 17.98 |
| 11 | −148.960 | 1.32 | | |
| 12 | −16.433 | 0.70 | 1.88300 | 40.80 |
| 13 | −66.701 | (Variable) | | |
| 14* | 11.148 | 2.83 | 1.59201 | 67.02 |
| 15* | −25.795 | 1.80 | | |
| 16(Stop) | ∞ | 1.20 | | |
| 17 | 22.976 | 0.70 | 1.90366 | 31.32 |
| 18 | 7.320 | 2.87 | 1.52249 | 59.84 |
| 19 | −16.185 | (Variable) | | |
| 20 | 88.719 | 0.90 | 1.52542 | 55.78 |
| 21* | 13.985 | 1.20 | | |
| 22* | −34.420 | 1.00 | 1.52542 | 55.78 |
| 23* | 30.026 | (Variable) | | |
| 24 | −44.861 | 3.39 | 1.58267 | 46.42 |
| 25 | −16.531 | 12.64 | | |
| 26 | ∞ | 2.66 | 1.51633 | 64.14 |
| 27 | ∞ | 1.00 | | |
| Image plane(image pickup surface) | ∞ | | | |

Aspherical surface data

14th surface k = −0.369
A4 = −5.25719e−05, A6 = 4.91052e−07

15th surface k = 0.000
A4 = 1.39451e−04

21th surface k = 0.000
A4 = −1.57512e−05, A6 = 2.21582e−06

22th surface k = 0.000
A4 = 4.71344e−05, A6 = −1.58201e−06

23th surface k = 0.000
A4 = 1.44685e−04, A6 = −4.10160e−06

Zoom data
Zoom ratio 6.85

| | wide | intermediate | tele |
|---|---|---|---|
| Focal length | 14.30 | 37.40 | 97.86 |
| Fno. | 3.70 | 5.60 | 6.43 |
| Angle of view 2ω | 84.08 | 32.33 | 12.50 |
| Image height | 11.15 | 11.15 | 11.15 |
| fb(in air) | 15.44 | 15.39 | 15.31 |
| Lens total length(in air) | 67.64 | 83.70 | 99.01 |
| d5 | 0.50 | 11.95 | 28.50 |
| d13 | 13.67 | 5.63 | 0.50 |
| d19 | 1.98 | 5.08 | 7.23 |
| d23 | 2.62 | 12.22 | 14.05 |

Unit mm

Unit focal length f1 = 58.97  f2 = −9.22  f3 = 11.92  f4 = −15.16  f5 = 43.03

EXAMPLE 11

Unit mm

Surface data

| Surface no. | r | d | nd | vd |
|---|---|---|---|---|
| Object plane | ∞ | ∞ | | |
| 1 | 60.087 | 1.10 | 2.00069 | 25.46 |
| 2 | 31.000 | 3.81 | 1.72916 | 54.68 |
| 3 | 130.072 | 0.15 | | |
| 4 | 34.318 | 3.43 | 1.73400 | 51.47 |
| 5 | 163.747 | (Variable) | | |
| 6 | 80.474 | 0.70 | 1.88300 | 40.80 |
| 7 | 10.253 | 3.71 | | |
| 8 | −30.113 | 0.70 | 1.83481 | 42.71 |
| 9 | 182.961 | 0.61 | | |
| 10 | 26.395 | 1.94 | 1.95906 | 17.47 |
| 11 | −74.362 | 1.26 | | |
| 12* | −15.370 | 0.70 | 1.85135 | 40.10 |
| 13* | −117.084 | (Variable) | | |
| 14* | 11.144 | 2.57 | 1.59201 | 67.02 |
| 15* | −36.516 | 1.50 | | |
| 16(Stop) | ∞ | 1.50 | | |
| 17 | 14.789 | 0.65 | 1.90366 | 31.32 |
| 18 | 6.977 | 3.20 | 1.51633 | 64.14 |
| 19* | −18.162 | (Variable) | | |
| 20* | −150.324 | 0.70 | 1.72903 | 54.04 |
| 21* | 11.716 | (Variable) | | |
| 22 | −47.206 | 3.63 | 1.49700 | 81.61 |
| 23 | −16.557 | 12.64 | | |
| 24 | ∞ | 2.66 | 1.51633 | 64.14 |
| 25 | ∞ | 1.00 | | |
| Image plane(image pickup surface) | ∞ | | | |

Aspherical surface data

12th surface k = −0.012

13th surface k = 0.000
A4 = −1.48570e−05

14th surface k = −1.076
A4 = 4.13203e−05, A6 = 5.55153e−07

15th surface k = 0.000
A4 = 1.20138e−04

19th surface k = 0.000
A4 = 7.89666e−05

20th surface k = 0.000
A4 = −2.03794e−04, A6 = −2.33959e−07

21th surface k = 0.000
A4 = −2.15303e−04, A6 = −9.23223e−07

| Unit mm | | | |
|---|---|---|---|
| Zoom data Zoom ratio 6.85 | | | |
| | wide | intermediate | tele |
| Focal length | 14.29 | 37.41 | 97.89 |
| Fno. | 3.90 | 5.94 | 6.46 |
| Angle of view 2ω | 83.75 | 32.71 | 12.45 |
| Image height | 11.15 | 11.15 | 11.15 |
| fb(in air) | 15.45 | 15.42 | 15.33 |
| Lens total length(in air) | 67.15 | 84.24 | 96.03 |
| d5 | 0.50 | 10.08 | 25.35 |
| d13 | 12.57 | 5.54 | 0.50 |
| d19 | 2.49 | 4.79 | 6.72 |
| d21 | 4.26 | 16.54 | 16.25 |

| Unit focal length |
|---|
| f1 = 52.16 f2 = −8.38 f3 = 11.27 f4 = −14.88 f5 = 49.37 |

EXAMPLE 12

| Unit mm | | | | |
|---|---|---|---|---|
| Surface data | | | | |
| Surface no. | r | d | nd | vd |
| Object plane | ∞ | ∞ | | |
| 1 | 65.234 | 1.40 | 1.84666 | 23.78 |
| 2 | 40.000 | 5.38 | 1.49700 | 81.61 |
| 3 | 142.112 | 0.15 | | |
| 4 | 42.739 | 3.61 | 1.81600 | 46.62 |
| 5 | 120.000 | (Variable) | | |
| 6 | 81.029 | 0.70 | 1.83481 | 42.71 |
| 7 | 11.149 | 6.88 | | |
| 8 | −40.379 | 0.70 | 1.88300 | 40.76 |
| 9 | 41.920 | 0.40 | | |
| 10 | 25.071 | 3.64 | 1.84666 | 23.78 |
| 11 | −77.219 | 2.03 | | |
| 12 | −31.741 | 0.70 | 1.49700 | 81.61 |
| 13 | −187.786 | (Variable) | | |
| 14* | 12.230 | 3.38 | 1.58313 | 59.38 |
| 15* | −28.618 | 1.00 | | |
| 16(Stop) | ∞ | 1.50 | | |
| 17 | 390.900 | 0.70 | 1.88300 | 40.80 |
| 18 | 9.900 | 3.90 | 1.49700 | 81.61 |
| 19 | −13.461 | (Variable) | | |
| 20 | −58.613 | 0.70 | 1.59551 | 39.24 |
| 21 | 14.000 | (Variable) | | |
| 22* | −164.630 | 4.00 | 1.52542 | 55.78 |
| 23* | −21.689 | 12.74 | | |
| 24 | ∞ | 2.66 | 1.51633 | 64.14 |
| 25 | ∞ | 1.00 | | |
| Image plane(image pickup surface) | ∞ | | | |

| Aspherical surface data |
|---|
| 14th surface |
| k = −1.026 A4 = 1.82483e−05, A6 = 4.12514e−07, A8 = −4.47490e−10 |
| 15th surface |
| k = 0.000 A4 = 1.19324e−04, A6 = 6.23383e−08, A8 = −1.85963e−09 |
| 22th surface |
| k = 0.000 A4 = −4.12741e−05, A6 = 1.17815e−07 |
| 23th surface |
| k = 0.000 A4 = −4.15253e−05, A6 = 5.36222e−08 |

| Unit mm | | | |
|---|---|---|---|
| Zoom data Zoom ratio 8.00 | | | |
| | wide | intermediate | tele |
| Focal length | 12.37 | 35.58 | 98.97 |
| Fno. | 3.61 | 5.33 | 5.83 |
| Angle of view 2ω | 92.55 | 34.80 | 12.77 |
| Image height | 11.15 | 11.15 | 11.15 |
| fb(in air) | 15.51 | 15.50 | 15.52 |
| Lens total length(in air) | 95.61 | 106.53 | 124.12 |
| d5 | 0.50 | 14.98 | 36.91 |
| d13 | 27.98 | 9.75 | 0.50 |
| d19 | 3.85 | 7.53 | 10.80 |
| d21 | 6.99 | 18.01 | 19.62 |

| Unit focal length |
|---|
| f1 = 76.00 f2 = −12.48 f3 = 16.05 f4 = −18.91 f5 = 47.09 |

EXAMPLE 13

| Unit mm | | | | |
|---|---|---|---|---|
| Surface data | | | | |
| Surface no. | r | d | nd | vd |
| Object plane | ∞ | ∞ | | |
| 1 | 65.000 | 1.40 | 1.84666 | 23.78 |
| 2 | 40.408 | 5.39 | 1.49700 | 81.61 |
| 3 | 148.519 | 0.15 | | |
| 4 | 43.367 | 3.64 | 1.77250 | 49.60 |
| 5 | 129.806 | (Variable) | | |
| 6 | 102.120 | 0.70 | 1.72916 | 54.68 |
| 7 | 10.740 | 6.87 | | |
| 8* | −53.754 | 0.70 | 1.52542 | 55.78 |
| 9 | 30.828 | 1.06 | | |
| 10 | 62.171 | 3.12 | 1.63493 | 23.90 |
| 11* | −33.760 | 1.24 | | |
| 12* | −20.508 | 0.70 | 1.52542 | 55.78 |
| 13* | −59.369 | (Variable) | | |
| 14* | 11.493 | 3.48 | 1.58313 | 59.38 |
| 15* | −36.204 | 1.00 | | |
| 16(Stop) | ∞ | 1.68 | | |
| 17 | 53.701 | 0.70 | 1.88300 | 40.80 |
| 18 | 8.323 | 3.82 | 1.49700 | 81.61 |
| 19 | −17.545 | (Variable) | | |
| 20 | −100.992 | 0.70 | 1.66998 | 39.27 |
| 21 | 15.797 | (Variable) | | |
| 22* | 333.250 | 4.00 | 1.52542 | 55.78 |
| 23* | −25.969 | 13.84 | | |
| 24 | ∞ | 2.66 | 1.51633 | 64.14 |
| 25 | ∞ | 1.00 | | |
| Image plane(image pickup surface) | ∞ | | | |

| Aspherical surface data |
|---|
| 8th surface |
| k = 0.000 A4 = −3.79054e−06, A6 = −9.01129e−08 |
| 11th surface |
| k = 0.000 A4 = 1.12212e−05, A6 = −3.20380e−07 |
| 12th surface |
| k = 0.000 A4 = −4.60448e−06, A6 = −4.83434e−07 |
| 13th surface |
| k = 0.000 A4 = −6.22804e−05, A6 = −2.22730e−07 |

-continued

Unit mm

14th surface k = −0.960
A4 = 2.48978e−05, A6 = 3.24628e−07, A8 = −2.51670e−09
15th surface k = 0.000
A4 = 9.22200e−05, A6 = −1.15938e−07, A8 = −3.13306e−09
22th surface k = 0.000
A4 = −3.48589e−05, A6 = 7.14848e−08
23th surface k = 0.000
A4 = −3.97779e−05, A6 = 1.67389e−08

Zoom data
Zoom ratio 8.00

|  | wide | intermediate | tele |
|---|---|---|---|
| Focal length | 12.37 | 34.89 | 98.97 |
| Fno. | 3.66 | 5.36 | 5.88 |
| Angle of view 2ω | 92.56 | 35.44 | 12.75 |
| Image height | 11.15 | 11.15 | 11.15 |
| fb(in air) | 16.60 | 16.59 | 16.59 |
| Lens total length(in air) | 95.07 | 104.49 | 124.09 |
| d5 | 0.50 | 13.39 | 37.05 |
| d13 | 27.90 | 9.41 | 0.50 |
| d19 | 2.94 | 7.69 | 11.65 |
| d21 | 6.77 | 17.04 | 17.94 |

Unit focal length f1 = 77.06 f2 = −12.44 f3 = 16.35 f4 = −20.34 f5 = 46.03

Next, values of conditional expressions (1) to (14) in each example are given below. '-' (hyphen) indicates that there is no corresponding arrangement.

| Conditional expressions | Ex. 1 | Ex. 2 | Ex. 3 | Ex. 4 | Ex. 5 | Ex. 6 | Ex. 7 |
|---|---|---|---|---|---|---|---|
| (1) $\beta_{2t}$ | −0.72 | −0.74 | −0.69 | −0.60 | −0.59 | −0.67 | −0.64 |
| (2) $\beta_{3t}$ | −1.11 | −0.98 | −0.84 | −1.29 | −1.17 | −0.92 | −0.98 |
| (3) $\beta_{2t}/\beta_{3t}$ | 0.65 | 0.75 | 0.82 | 0.46 | 0.50 | 0.73 | 0.65 |
| (4) $L_t/f_t$ | 1.19 | 1.19 | 1.19 | 1.09 | 1.24 | 1.18 | 1.27 |
| (5) $\beta_{2w}$ | −0.24 | −0.25 | −0.25 | −0.21 | −0.23 | −0.24 | −0.22 |
| (6) $f_{1G}/L_t$ | 0.55 | 0.54 | 0.59 | 0.55 | 0.54 | 0.55 | 0.58 |
| (7) $(r_{11F} + r_{11R})/(r_{11F} − r_{11R})$ | −6.35 | −3.74 | −5.62 | −12.97 | −3.54 | −2.56 | −6.20 |
| (9) $(r_{21F} + r_{21R})/(r_{21F} − r_{21R})$ | −2.18 | −4.29 | −2.14 | −2.94 | 0.23 | −3.37 | −1.37 |
| (10) $\beta$ | — | — | — | — | — | — | — |
| (11) $Nd_p$ | — | — | — | — | — | — | — |
| (12) $vd_p$ | 17.98 | 17.98 | 17.98 | 17.98 | 17.98 | 17.98 | 17.98 |
| (13) $Nd_n$ | — | — | — | — | — | — | — |
| (14) $vd_n$ | — | — | — | — | — | — | — |

| Conditional expressions | Ex. 8 | Ex. 9 | Ex. 10 | Ex. 11 | Ex. 12 | Ex. 13 |
|---|---|---|---|---|---|---|
| (1) $\beta_{2t}$ | −0.74 | −0.68 | −0.61 | −0.67 | −0.62 | −0.59 |
| (2) $\beta_{3t}$ | −1.06 | −1.21 | −1.12 | −1.07 | −0.92 | −1.03 |
| (3) $\beta_{2t}/\beta_{3t}$ | 0.70 | 0.56 | 0.54 | 0.62 | 0.67 | 0.57 |
| (4) $L_t/f_t$ | 1.19 | 1.02 | 1.02 | 0.99 | 1.26 | 1.26 |
| (5) $\beta_{2w}$ | −0.25 | −0.23 | −0.21 | −0.22 | −0.22 | −0.22 |
| (6) $f_{1G}/L_t$ | 0.55 | 0.54 | 0.59 | 0.54 | 0.61 | 0.62 |
| (7) $(r_{11F} + r_{11R})/(r_{11F} − r_{11R})$ | −2.13 | −2.03 | −2.47 | −2.16 | −3.38 | −3.01 |
| (9) $(r_{21F} + r_{21R})/(r_{21F} − r_{21R})$ | −2.59 | −1.62 | −1.65 | −1.30 | −1.41 | −2.06 |
| (10) $\beta$ | — | — | — | — | — | 2.04123 |
| (11) $Nd_p$ | — | — | — | — | — | 1.63493 |
| (12) $vd_p$ | 17.98 | 17.98 | 17.98 | 17.47 | 23.78 | 23.9 |
| (13) $Nd_n$ | — | — | — | — | — | 1.52542 |
| (14) $vd_n$ | — | 48.11 | — | — | 61.185 | 55.78 |

Figure 27:
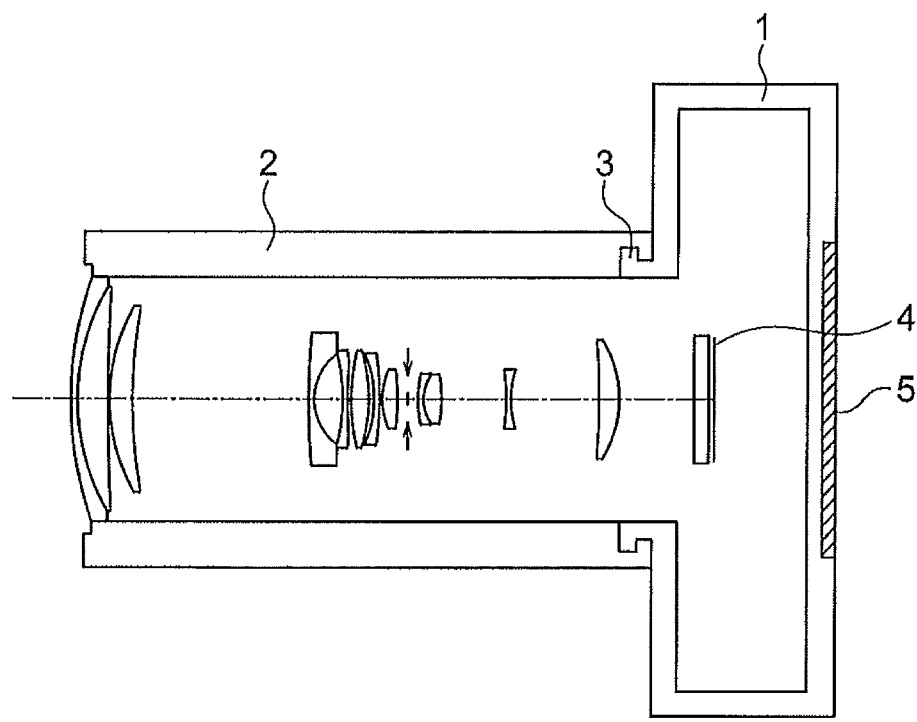
FIG. 27 is a cross-sectional view of an interchangeable lens camera in which, the zoom lens according to the present examples is used as an interchangeable lens.

FIG. 27 is a cross-sectional view of a single-lens mirrorless camera as an electronic image pickup apparatus. In FIG. 27, a taking lens system 2 is disposed inside a lens barrel of a single-lens mirrorless camera 1. Amount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the zoom lens described in any one of the examples from the first example to the thirteenth example is to be used.

Figure 28:
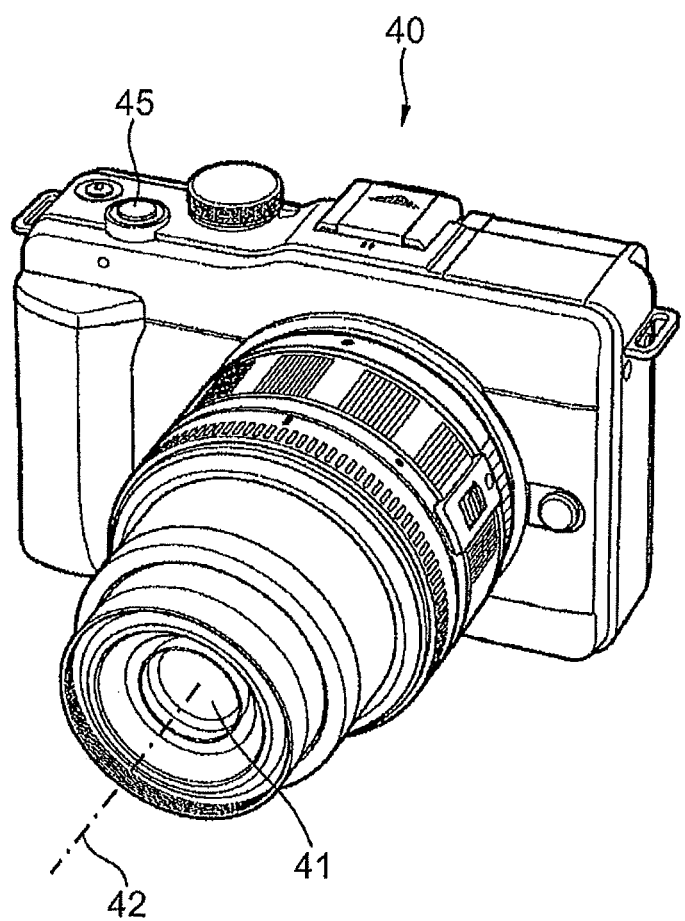
FIG. 28 is a front perspective view showing an appearance of the interchangeable lens camera according to the present examples.
Figure 29:
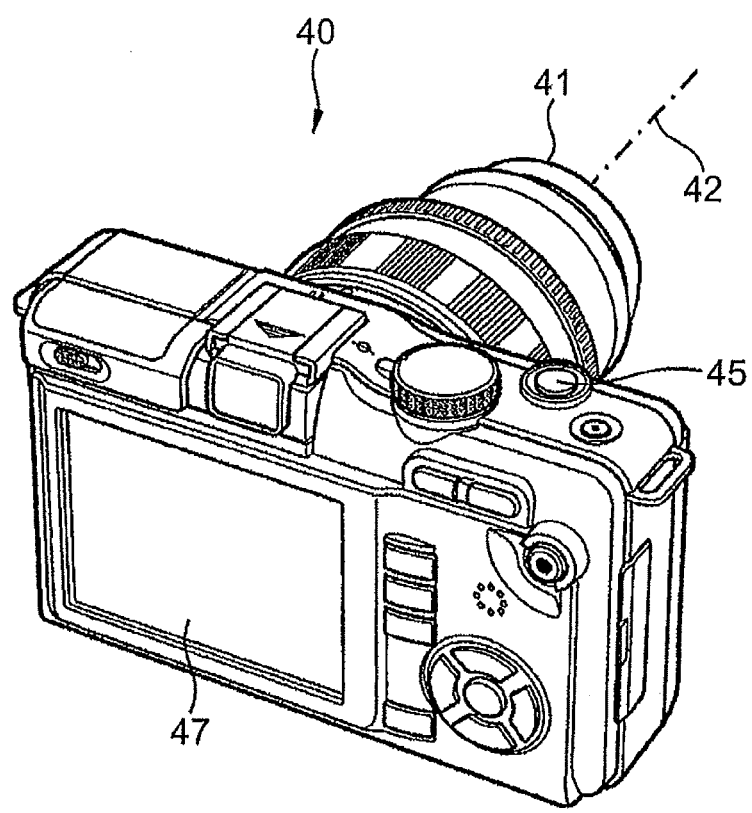
FIG. 29 is a rear perspective view of the interchangeable lens camera in FIG. 28.

FIG. 28 and FIG. 29 are conceptual diagrams of an arrangement of the image pickup apparatus according to the present example. FIG. 28 is a front perspective view showing an appearance of a digital camera 40 as the image pickup apparatus, and FIG. 29 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 30:
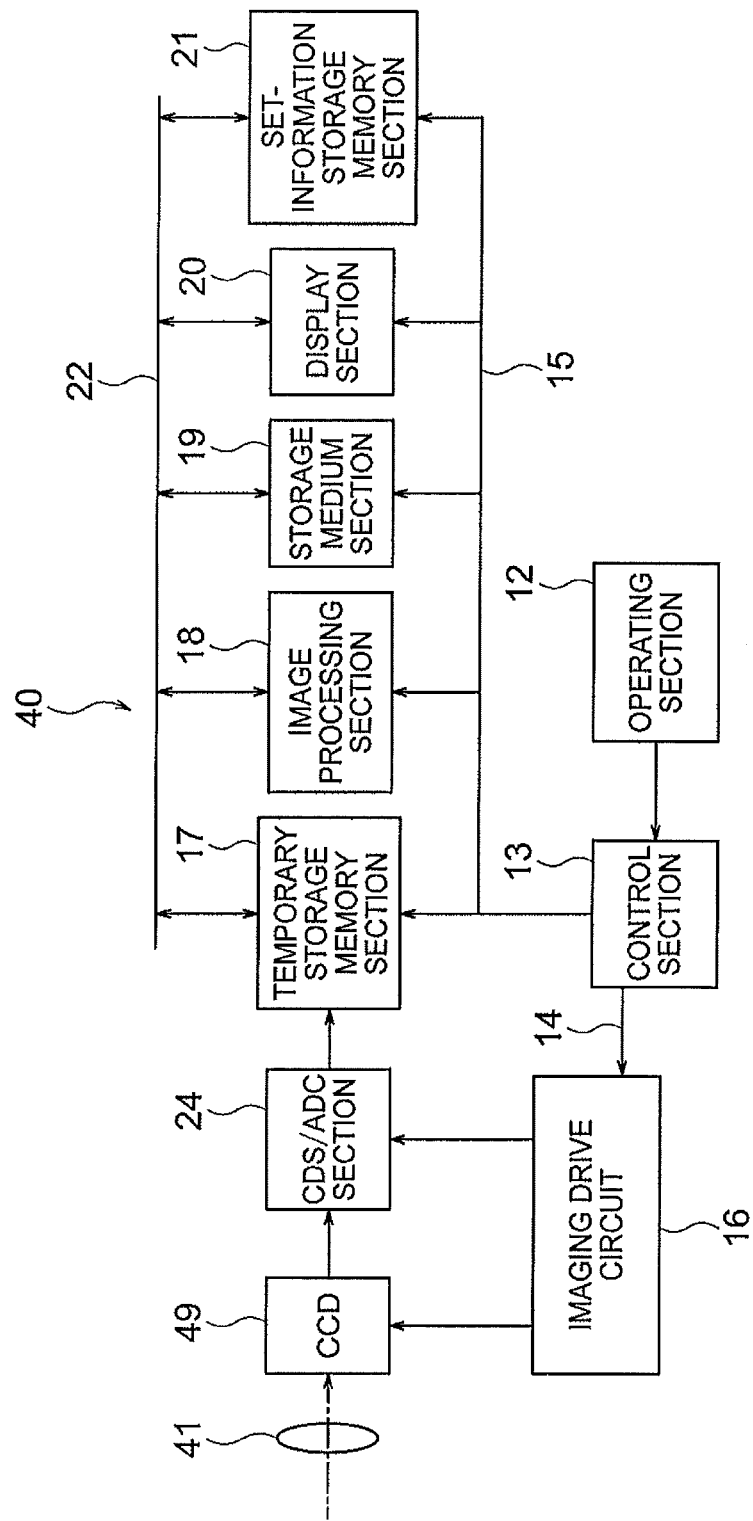
FIG. 30 is a functional block diagram of an internal circuit of main components of the interchangeable lens camera in FIG. 28.

FIG. 30 is a structural block diagram of an internal circuit of main components of the digital camera 40. In the following description, the processing means described above includes for instance, a CDS/ADC section 24, a temporary storage memory 17, and an image processing section 18, and a storage means consists of a storage medium section 19 for example.

As shown in FIG. 30, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 140 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

By using the zoom lens according to the present invention as the photographic optical system 41, it is possible to let the digital camera 40 configured in such manner to be an image pickup apparatus which is advantageous for achieving a high-resolution image without degradation of image quality while being wide angle of view and small-sized.

According to the present invention, it is possible to provide a zoom lens which is small-size and thin with a wide angle of view, a back focus of a desired length and a high imaging performance, and an image pickup apparatus using the zoom lens.

The present invention can have various modified examples without departing from the scope of the invention. Moreover, shapes of lenses and the number of lenses are not restricted to the shapes of lenses and the number of lenses indicated by each example. In each of the abovementioned examples, the cover glass C may not be disposed necessarily. A lens which is not shown in the diagrams of the examples described heretofore, and which essentially has no refractive power may be disposed in a lens unit or outside a lens unit.

As described heretofore, the present invention is suitable for a small-size and thin zoom lens which has a wide angle of view and a back focus of a desired length, and which has a high imaging performance, and for an image pickup apparatus using the zoom lens.

What is claimed is:

1. A zoom lens comprising in order from an object side to an image side:
   a first lens unit having a positive refractive power;
   a second lens unit having a negative refractive power;
   a third lens unit having a positive refractive power;
   a fourth lens unit having a negative refractive power; and
   a fifth lens unit having a positive refractive power, wherein
   at the time of zooming from a wide angle end to a telephoto end,
   a distance between the first lens unit and the second lens unit widens,
   a distance between the second lens unit and the third lens unit narrows,
   a distance between the third lens unit and the fourth lens unit fluctuates, and
   a distance between the fourth lens unit and the fifth lens unit fluctuates, and
   a position of the fifth lens unit is fixed at the time of zooming from the wide angle end to the telephoto end, and
   the zoom lens has an aperture stop, which is disposed between a surface nearest to an image plane side of the second lens unit and a surface nearest to the image plane side of the third lens unit, and
   at the time of zooming, the aperture stop moves together with the third lens unit, and
   the zoom lens has at least a negative lens and a positive lens in the second lens unit, and
   the zoom lens has at least one aspheric surface in the second lens unit, and
   in a rectangular coordinate system in which, a horizontal axis is let to be Nd and a vertical axis is let to be vd, when a straight line expressed by $Nd_p = \alpha \times vd_p + \beta$, where $\alpha = -0.017$, is set, the positive lens in the second lens unit is included in an intersection of (i) an area determined between the straight line at a lower limit value of a range of the following conditional expression (10) and the straight line at an upper limit value of the range of the following conditional expression (10), and (ii) an area determined between respective ranges of the following conditional expressions (11) and (12), and the zoom lens has a negative lens nearest to the object side in the second lens unit, and negative lenses other than the negative lens nearest to the object side in the second lens unit satisfy the following conditional expressions (13) and (14):

$$1.45 < \beta < 2.15 \quad (10)$$

$$1.50 < Nd_p < 1.70 \quad (11)$$

$$5 < vd_p < 40 \quad (12)$$

$$1.4 < Nd_n < 1.65 \quad (13)$$

$$45 < vd_n < 95 \quad (14)$$

where, $Nd_p$ denotes an average of refractive indices of positive lenses in the second lens unit, $vd_p$ denotes an average of Abbe numbers for positive lenses in the second lens unit, $Nd_n$ denotes an average of refractive indices of the negative lenses other than the negative lens nearest to the object side in the second lens unit, and $vd_n$ denotes an average of Abbe numbers for the negative lenses other than the negative lens nearest to the object side in the second lens unit.

2. The zoom lens according to claim 1, wherein the following conditional expression (4) is satisfied:

$$0.9 < L_t/f_t < 1.30 \quad (4)$$

where, $L_t$ denotes an overall optical length of the zoom lens at the telephoto end, and is an overall optical length at the time of infinite object point focusing, and $f_t$ denotes a focal length of the overall zoom lens system at the telephoto end.

3. The zoom lens according to claim 2, wherein the following conditional expression (5) is satisfied:

$$-0.27 < \beta_{2w} < -0.18 \quad (5)$$

where, $\beta_{2w}$ denotes a magnification of the second lens unit at the wide angle end, and is a magnification at the time of infinite object point focusing.

4. The zoom lens according to claim 2, wherein the following conditional expression (6) is satisfied:

$$0.35 < f_{1G}/L_t < 0.75 \quad (6)$$

where, $L_t$ denotes the overall optical length of the zoom lens at the telephoto end, and is the overall optical length at the time of infinite object point focusing, and $f_{1G}$ denotes a focal length of the first lens unit.

5. The zoom lens according to claim 2, wherein the fourth lens unit includes at least one aspheric surface.

6. The zoom lens according to claim 2, wherein the following conditional expression (7) is satisfied:

$$-14 < (r_{11F} + r_{11R})/(r_{11F} - r_{11R}) < -1.5 \quad (7)$$

where, $r_{11F}$ denotes a radius of curvature of a surface nearest to the object side of the first lens unit, and $r_{11R}$ denotes a radius of curvature of a surface nearest to the image plane side of the first lens unit.

7. The zoom lens according to claim 1, wherein the following conditional expression (5) is satisfied:

$$-0.27 < \beta_{2w} < -0.18 \quad (5)$$

where, $\beta_{2w}$ denotes a magnification of the second lens unit at the wide angle end, and is a magnification at the time of infinite object point focusing.

8. The zoom lens according to claim 1, wherein the following conditional expression (6) is satisfied:

$$0.35 < f_{1G}/L_t < 0.75 \quad (6)$$

where, $L_t$ denotes the overall optical length of the zoom lens at the telephoto end, and is the overall optical length at the time of infinite object point focusing, and $f_{1G}$ denotes a focal length of the first lens unit.

9. The zoom lens according to claim 1, wherein the fourth lens unit includes at least one aspheric surface.

10. The zoom lens according to claim 1, wherein the following conditional expression (7) is satisfied:

$$-14 < (r_{11F} + r_{11R})/(r_{11F} - r_{11R}) < -1.5 \quad (7)$$

where, $r_{11F}$ denotes a radius of curvature of a surface nearest to the object side of the first lens unit, and $r_{11R}$ denotes a radius of curvature of a surface nearest to the image plane side of the first lens unit.

11. An image pickup apparatus comprising:

a zoom lens according to claim 1; and an image pickup element which has an image pickup surface.

* * * * *